US012115107B2

(12) United States Patent
Lane et al.

(10) Patent No.: US 12,115,107 B2
(45) Date of Patent: Oct. 15, 2024

(54) ADJUSTABLE RESTRAINT STRAP FOR A LIMB REST

(71) Applicant: Allen Medical Systems, Inc., Batesville, IN (US)

(72) Inventors: Timothy A. Lane, Greensburg, IN (US); Joshua J. Moriarty, South Attleboro, MA (US); David C. Newkirk, Lawrenceburg, IN (US); Neal Wiggermann, Batesville, IN (US); David J. Hitchcock, Westford, MA (US); Zachary S. Theoharidis, Watertown, MA (US); Jessica Pimental, Mansfield, MA (US); Michael Diodato, Methuen, MA (US); Michael Nordling, Hopkinton, MA (US); Hung Nguyen, Worcester, MA (US); Martin Haenel, Saalfeld (DE)

(73) Assignee: Allen Medical Systems, Inc., Batesville, IN (US)

( * ) Notice: Subject to any disclaimer, the term of this patent is extended or adjusted under 35 U.S.C. 154(b) by 154 days.

(21) Appl. No.: 17/588,494

(22) Filed: Jan. 31, 2022

(65) Prior Publication Data

US 2022/0151855 A1 May 19, 2022

Related U.S. Application Data

(63) Continuation of application No. 16/279,399, filed on Feb. 19, 2019, now Pat. No. 11,234,885.

(Continued)

(51) Int. Cl.

| | |
|---|---|
| ***A61G 13/12*** | (2006.01) |
| ***A61G 13/00*** | (2006.01) |
| ***A61G 13/10*** | (2006.01) |

(52) U.S. Cl.

CPC ..... *A61G 13/1245* (2013.01); *A61G 13/0081* (2016.11); *A61G 13/101* (2013.01);

(Continued)

(58) Field of Classification Search

CPC ............ A61G 13/1245; A61G 13/0081; A61G 13/101; A61G 13/1235; A61G 13/125;

(Continued)

(56) References Cited

U.S. PATENT DOCUMENTS 542,390 A 7/1895 Linn
553,219 A * 1/1896 Blascow .................. B62C 9/00 280/183

(Continued)

FOREIGN PATENT DOCUMENTS

EP 3017801 A1 5/2016

OTHER PUBLICATIONS

Official Action in related EP application EP20209799.4A (Publication EP3804685A1), Jan. 20, 2023, 7 pages.

*Primary Examiner* — Justin C Mikowski
*Assistant Examiner* — Luke Hall
(74) *Attorney, Agent, or Firm* — Barnes & Thornburg LLP

(57) ABSTRACT

A limb support comprises a spar, a limb rest, and a coupler. The spar is configured to be supported from a patient support apparatus and adjustable relative to the patient support and has a longitudinal axis. The coupler includes a release that is actuable between a first position permitting movement of the coupler relative to the patient support and a second position preventing movement of the coupler relative to the patient support.

20 Claims, 55 Drawing Sheets

Related U.S. Application Data

(60) Provisional application No. 62/688,100, filed on Jun. 21, 2018, provisional application No. 62/632,828, filed on Feb. 20, 2018.

(52) U.S. Cl.
CPC ....... *A61G 13/1235* (2013.01); *A61G 13/125* (2013.01); *A61G 13/1295* (2013.01); *A61G 13/0036* (2013.01)

(58) Field of Classification Search
CPC ............ A61G 13/1295; A61G 13/0036; A61G 13/126
USPC .............................................................. 5/648
See application file for complete search history.

(56) References Cited

U.S. PATENT DOCUMENTS

| | | | | | |
|---|---|---|---|---|---|
| 2,622,831 | A | | 12/1952 | Fullwood | |
| 2,801,142 | A | | 7/1957 | Adams | |
| 2,932,867 | A | | 4/1960 | Douglass, Jr. | |
| 2,932,873 | A | | 4/1960 | Reichert | |
| 2,998,954 | A | | 9/1961 | Douglass, Jr. | |
| 3,046,072 | A | | 7/1962 | Douglass, Jr. et al. | |
| 3,221,743 | A | | 12/1965 | Thompson et al. | |
| 3,982,742 | A | | 9/1976 | Ford | |
| 4,018,412 | A | | 4/1977 | Kees, Jr. et al. | |
| 4,180,254 | A | | 12/1979 | Lee et al. | |
| 4,185,813 | A | | 1/1980 | Spann | |
| 4,252,306 | A | | 2/1981 | Johnson et al. | |
| 4,367,869 | A | | 1/1983 | Dailey et al. | |
| 4,373,709 | A | | 2/1983 | Whitt | |
| 4,383,351 | A | | 5/1983 | Fenwick | |
| 4,407,277 | A | * | 10/1983 | Ellison | A61F 5/04 378/208 |
| 4,418,900 | A | | 12/1983 | Ricke | |
| 4,426,071 | A | | 1/1984 | Klevstad | |
| 4,428,571 | A | | 1/1984 | Sugarman | |
| 4,443,005 | A | | 4/1984 | Sugarman et al. | |
| 4,444,381 | A | | 4/1984 | Wayne | |
| 4,471,952 | A | | 9/1984 | Spann | |
| 4,487,523 | A | | 12/1984 | Monroe | |
| 4,526,355 | A | | 7/1985 | Moore et al. | |
| 4,545,573 | A | | 10/1985 | Murphy | |
| 4,547,092 | A | | 10/1985 | Vetter et al. | |
| 4,564,164 | A | * | 1/1986 | Allen | A61G 13/12 5/624 |
| 4,579,324 | A | | 4/1986 | Mcconnell | |
| 4,615,516 | A | | 10/1986 | Stulberg et al. | |
| 4,620,698 | A | | 11/1986 | Reed et al. | |
| 4,681,309 | A | | 7/1987 | Lechner | |
| 4,708,510 | A | | 11/1987 | Mcconnell et al. | |
| 4,732,145 | A | | 3/1988 | Latham | |
| 4,766,892 | A | | 8/1988 | Kreitman | |
| 4,782,827 | A | | 11/1988 | Paratte | |
| 4,802,464 | A | | 2/1989 | Deprez | |
| 4,809,687 | A | * | 3/1989 | Allen | A61G 13/12 5/624 |
| 4,827,496 | A | | 5/1989 | Cheney | |
| 4,854,015 | A | * | 8/1989 | Shaull | B65D 63/16 24/306 |
| 4,886,258 | A | * | 12/1989 | Scott | A61G 13/12 5/624 |
| 4,913,413 | A | * | 4/1990 | Raab | A61G 13/12 5/624 |
| 4,940,218 | A | | 7/1990 | Akcelrod | |
| 5,000,163 | A | | 3/1991 | Ray et al. | |
| 5,001,739 | A | | 3/1991 | Fischer | |
| 5,027,799 | A | | 7/1991 | Laico et al. | |
| 5,042,508 | A | | 8/1991 | Richard | |
| 5,056,535 | A | | 10/1991 | Bonnell | |
| 5,062,184 | A | * | 11/1991 | Rowland | H02G 11/00 24/30.5 R |
| 5,093,964 | A | * | 3/1992 | Rowland | B65H 75/366 24/17 AP |
| 5,097,847 | A | | 3/1992 | Mikhail et al. | |
| 5,177,823 | A | | 1/1993 | Riach | |
| 5,222,701 | A | * | 6/1993 | Rowland | H02G 11/00 248/316.1 |
| 5,290,220 | A | | 3/1994 | Guhl | |
| 5,462,551 | A | * | 10/1995 | Bailey | A61B 90/50 606/88 |
| 5,514,143 | A | | 5/1996 | Bonutti et al. | |
| 5,515,562 | A | | 5/1996 | Miller et al. | |
| 5,538,215 | A | | 7/1996 | Hosey | |
| 5,560,577 | A | | 10/1996 | Keselman | |
| 5,564,663 | A | | 10/1996 | Cook et al. | |
| 5,582,379 | A | | 12/1996 | Keselman et al. | |
| 5,608,934 | A | | 3/1997 | Torrie et al. | |
| 5,645,079 | A | * | 7/1997 | Zahiri | A61F 5/3769 5/624 |
| 5,681,018 | A | | 10/1997 | Hoftman | |
| 5,738,675 | A | | 4/1998 | Botimer | |
| 5,799,349 | A | | 9/1998 | Petersen | |
| 5,806,117 | A | | 9/1998 | Gotfried | |
| 5,918,330 | A | | 7/1999 | Navarro et al. | |
| 5,957,445 | A | | 9/1999 | Hagman et al. | |
| 6,058,534 | A | | 5/2000 | Navarro et al. | |
| 6,108,841 | A | | 8/2000 | Cameron et al. | |
| 6,289,537 | B1 | | 9/2001 | Hopper et al. | |
| 6,315,260 | B1 | | 11/2001 | Lees | |
| 6,421,854 | B1 | | 7/2002 | Heimbrock | |
| 7,337,483 | B2 | * | 3/2008 | Boucher | A61G 13/12 5/624 |
| 7,669,262 | B2 | | 3/2010 | Skripps et al. | |
| 7,882,583 | B2 | | 2/2011 | Skripps | |
| 8,087,626 | B1 | | 1/2012 | Weeden | |
| 8,322,342 | B2 | * | 12/2012 | Soto | A61G 13/0072 128/845 |
| 8,607,378 | B2 | | 12/2013 | Moriarity et al. | |
| 9,161,875 | B2 | | 10/2015 | Clark et al. | |
| 9,333,142 | B2 | | 5/2016 | Schuerch, Jr. | |
| 9,381,130 | B2 | * | 7/2016 | Keith-Lucas | A61G 13/125 |
| 9,480,614 | B2 | | 11/2016 | Torrie et al. | |
| 9,655,764 | B2 | * | 5/2017 | Keith-Lucas | A61G 13/125 |
| 9,730,851 | B2 | | 8/2017 | Clark et al. | |
| 9,801,771 | B2 | | 10/2017 | Schuerch, Jr. | |
| 9,951,904 | B2 | * | 4/2018 | Perez | A61G 13/1245 |
| 10,188,573 | B2 | | 1/2019 | Moriarty et al. | |
| 10,478,364 | B2 | * | 11/2019 | Fossez | A61G 13/1245 |
| D878,836 | S | | 3/2020 | Kaiser et al. | |
| 10,828,218 | B2 | | 11/2020 | Shandas et al. | |
| 10,835,440 | B2 | | 11/2020 | Lane, II et al. | |
| 10,842,700 | B2 | | 11/2020 | Schuerch, Jr. | |
| 10,869,801 | B1 | | 12/2020 | Skripps et al. | |
| 2001/0039680 | A1 | | 11/2001 | Boucher et al. | |
| 2007/0265635 | A1 | | 11/2007 | Torrie et al. | |
| 2010/0031446 | A1 | | 2/2010 | Wyslucha | |
| 2011/0101192 | A1 | | 5/2011 | Lee et al. | |
| 2011/0113558 | A1 | | 5/2011 | Olszewski | |
| 2011/0185506 | A1 | | 8/2011 | Broens | |
| 2011/0191958 | A1 | | 8/2011 | Fan | |
| 2012/0240938 | A1 | | 9/2012 | Pamichev | |
| 2013/0019883 | A1 | | 1/2013 | Worm et al. | |
| 2013/0112059 | A1 | | 5/2013 | Jungeberg et al. | |
| 2013/0163978 | A1 | | 6/2013 | Carlesso | |
| 2014/0068864 | A1 | | 3/2014 | Clark et al. | |
| 2014/0068866 | A1 | | 3/2014 | Catacchio et al. | |
| 2014/0130260 | A1 | | 5/2014 | Kreuzer et al. | |
| 2015/0250672 | A1 | | 9/2015 | Fossez et al. | |
| 2016/0213543 | A1 | | 7/2016 | Hafner et al. | |
| 2016/0287237 | A1 | | 10/2016 | Demayo et al. | |
| 2016/0324701 | A1 | | 11/2016 | Cambridge et al. | |
| 2017/0165143 | A1 | | 6/2017 | Schuerch, Jr. | |
| 2017/0281447 | A1 | | 10/2017 | Lane, II et al. | |
| 2017/0296417 | A1 | | 10/2017 | Schuerch, Jr. | |
| 2017/0326015 | A1 | | 11/2017 | Katzenstein | |
| 2019/0254905 | A1 | | 8/2019 | Haenel et al. | |

* cited by examiner

ADJUSTABLE RESTRAINT STRAP FOR A LIMB REST

PRIORITY CLAIM

This application is a continuation of U.S. application Ser. No. 16/279,399, filed Feb. 19, 2019, now U.S. Pat. No. 11,234,885, which claims priority under 35 U.S.C. § 119(e) to U.S. Provisional Application Nos. 62/632,828, filed Feb. 20, 2018, and 62/688,100, filed Jun. 21, 2018, each of which are expressly incorporated by reference herein.

TECHNICAL FIELD

The present disclosure is related to a support apparatus for supporting a patient. More particularly, the present disclosure relates to a support apparatus including a surgical table and a limb support coupled to the surgical table.

BACKGROUND

Often, when a patient is sedated for a surgery, the patient is supported by and secured to braces or supports coupled to a surgical table. Sometimes, unique supports are provided for a patient's extremities such as arm boards, leg supports, hand boards, stirrups, and boots.

Supports known in the art sometimes secure patients to resist patient movement. The position and orientation of supports is often adjusted during surgery to improve access to a surgical site or to move portions of the patient's body such as bones, muscles, tendons, and ligaments to evaluate the surgical results. In adjusting the positon of a limb, there may be a need to make adjustments with multiple degrees of freedom in order to locate the limb spatially and to adjust an orientation of the limb. It should be understood that movement and adjustment of a position and orientation of a limb may be used to provide access to the limb, or may be used to make adjustments to tissues that are connected to the limb to thereby better position bones, joints, ligaments, tendons and/or muscles for surgical access to any of those tissues or underlying tissues.

In one example, a lithotomy positioning device may be used to facilitate access to a patient's perineum, organs in the pelvic region, rectum, and genitals. In the lithotomy position, a patient is initially positioned in a supine position and the hips are flexed, the legs abducted, and knees flexed. Using a boot stirrup, placing the patient in the correct position requires movement of boot stirrup in abduction while raising the legs and moving the boot to cause flexure of the knees. There may also be a need to rotate the legs to cause movement of the hip joint. All of these positional adjustment are interdependent and movement of the legs to an abducted positon may result in other flexure throughout the leg and hip. As such, a need exists to make an adjustment with multiple degrees of freedom simultaneously to efficiently. However, there may also be times where a single degree of adjustment is appropriate without risk of having other adjustment positions lost so that adjustments of one degree of freedom can be used to achieve a particular adjustment during procedure. With some positioners, there is a need to support multiple components when a positioner is released for adjustment so that the single degree of adjustment is controlled. This can be cumbersome and require caregivers to support the weight of a limb to prevent unwanted movement during the adjustment.

SUMMARY

The present application discloses one or more of the features recited in the appended claims and/or the following features which, alone or in any combination, may comprise patentable subject matter:

According to a first aspect of the present disclosure, a limb support comprises a spar, a multi-axis coupler supporting the spar, a coupler supported on the spar, and a limb rest supported on the coupler. The multi-axis coupler is releasable to adjust the orientation of the spar relative to a patient support apparatus supporting the limb support. The coupler includes a receiver and a release that is movable relative to the spar. The release is operable to move between a first position wherein the receiver is fixed relative to the spar, second position wherein the receiver is movable relative to the spar about three-axes, and a third position wherein the coupler is movable along the length of the spar/The limb rest is supported on the receiver such that when the release is in the second position, the limb rest is movable relative to the spar to adjust the orientation of a patient's limb relative to the spar and, thereby, a patient support apparatus.

In some embodiments, the limb support further comprises a handle coupled to the release, the handle operable to cause the release to move between the first, second, and third positions.

In some embodiments, the release is biased to the first position.

In some embodiments, movement of the release from the first position reduces the frictional force applied to components within the coupler such that the movement of the release continuously reduces the force necessary to move the limb rest relative to the spar.

In some embodiments, movement of the release from the first position reduces the frictional force between the coupler and the spar such that movement of the release continuously reduces the force necessary to move the coupler relative to the spar.

In some embodiments, the release includes a bias structure that is loaded in the first position to urge components of the coupler together to frictionally lock the coupler with sufficient force to support a patient's limb.

In some embodiments, the release includes a first spar engaging portion and a second spar engaging portion which cooperate to grip the spar, and a bias member acting between the first spar engaging portion and the second spar engaging portion. The bias member may urge the first spar engaging portion and the second spar engaging portion apart. The bias structure of the release may be operable to overcome the bias member when the release is in the first position.

In some embodiments, the bias structure induces a tension load in a tension rod, the tension load acting on components of the coupler to secure the coupler.

In some embodiments, the force applied by the bias structure is reduced as the release is moved from the first position to the third position thereby reducing the tension load in the tension rod.

In some embodiments, the bias structure acts on a first driver urging the first driver toward a second driver, the bias structure urging the drivers together with a first spring force in the first position and the release continuously reducing the spring force to zero as the release is moved from the first position to the third position.

In some embodiments, the drivers are formed to include inclined surfaces that engage mating surfaces of two wedges. The spring force may push the inclined surface of the first driver against the wedges to urge the wedges apart.

The wedges may be constrained by second driver and the tension rod such that the spring force is transferred through the drivers and wedges to develop tension in a tension rod. The tension of the tension rod secures the components of the coupler against movement.

In some embodiments, the release further comprises a cam shaft coupled to the handle such that movement of the handle rotates the cam shaft about a longitudinal axis of the cam shaft to move a cam of the cam shaft from the first position to the third position, such that the cam overcomes the spring force of the bias structure in the third position.

In some embodiments, the cam reduces the spring force of the bias structure as the cam moves from the first to the third position. A second position, intermediate the first and third positions, may result in the reduction of the spring force sufficiently to allow a user to adjust the position of the limb rest relative to the coupler while maintaining the coupler in a secured position relative to the spar.

In some embodiments, the release includes a floating spacer that is engaged by the cam shaft. The floating spacer may move relative to the drivers. As the cam moves from the first position to the second position, the floating spacer may engage the bias structure to compress the bias structure. The floating spacer may engage the second driver to move the second driver away from the first driver to effect the release of the coupler by releasing the tension in the tension rod.

In some embodiments, the cam shaft engages a return spring. The return spring may bias the cam shaft to urge the cam shaft toward the first position. The force of the return spring may not act on the first driver so that the spring force of the return spring does not act upon the components of the coupler.

According to a second aspect of the present disclosure, a limb support comprises a spar, a multi-axis coupler supporting the spar, a coupler supported on the spar, and a limb rest supported on the coupler. The multi-axis coupler is releasable to adjust the orientation of the spar relative to a patient support apparatus supporting the limb support. The coupler includes a receiver and a release that is movable relative to the spar. The release is operable to move between a first position wherein the receiver is fixed relative to the spar and a second position wherein the receiver is movable relative to the spar about three-axes. The limb rest is supported on the receiver such that when the release is in the second position, the limb rest is movable relative to the spar to adjust the orientation of a patient's limb relative to the spar and, thereby, a patient support apparatus.

In some embodiments, the limb support further comprises a handle coupled to the release, the handle may be operable to cause the release to move between the first and second.

In some embodiments, the release may be biased to the first position.

In some embodiments, movement of the release from the first position may reduce the frictional force applied to components within the coupler such that the movement of the release continuously reduces the force necessary to move the limb rest relative to the spar.

In some embodiments, the release may include a bias structure that is loaded in the first position to urge components of the coupler together to frictionally lock the coupler with sufficient force to support a patient's limb.

In some embodiments, the bias structure may induce a tension load in tension rod, the tension load acting on components of the coupler to secure the coupler.

In some embodiments, a force applied by the bias structure may be reduced as the release is moved from the first position to the second position thereby reducing frictional force.

In some embodiments, the bias structure may act on a first driver urging the first driver toward a second driver. The bias structure may urge the drivers together with a first spring force in the first position and the release may continuously reduce the spring force to zero as the release is moved from the first position to the second position.

In some embodiments, the drivers may be formed to include inclined surfaces that engage mating surfaces of two wedges. The spring force may push the inclined surface of the first driver against the wedges to urge the wedges apart. The wedges may be constrained by the second driver and a tension rod such that the spring force is transferred through the drivers and wedges to develop tension in the tension rod.

In some embodiments, the release further comprises a cam shaft. The cam shaft may be coupled to the handle such that movement of the handle rotates the cam shaft about a longitudinal axis of the cam shaft to move a cam of the cam shaft from the first position to the second position such that the cam overcomes the spring force of the bias structure in the second position.

In some embodiments, the cam may reduce the spring force of the bias structure as the cam moves from the first to the second position reducing the spring force sufficiently to allow a user to adjust the position of the limb rest relative to the coupler.

In some embodiments, the release may include a floating spacer that is engaged by the cam shaft, the floating spacer moving relative to the drivers. As the cam moves from the first position to the second position, the floating spacer may engage the bias structure to compress the bias structure and may engage the second driver to move the second driver away from the first driver to effect the release of the coupler by releasing the tension in the tension rod.

In some embodiments, the cam shaft may engage a return spring, the return spring biasing the cam shaft to urge the cam shaft toward the first position, the force of the return spring not acting on the first driver so that the spring force of the return spring does not act upon the components of the coupler.

According to a third aspect of the present disclosure, a limb support comprises a spar, a coupler supported on the spar, a limb support supported on the coupler and a handle. The coupler has a release that is selectively actuable to permit movement of the coupler relative to the spar. The handle is coupled to the release of the coupler and positioned such that a user may simultaneously grip the handle and the limb rest. The handle is movable relative to the limb rest so that the user squeezes the handle and the limb rest to move the handle relative to the limb rest. Squeezing of the handle causes the handle to move between a first position wherein the release precludes movement of the coupler and the limb rest and a second position activating the release to permit the coupler to be moved relative to the spar to adjust the position of the limb rest relative to the spar.

In some embodiments, the release may be operable to move between a first position wherein the limb rest is fixed relative to the spar and a third position between the first and second positions wherein the limb rest is movable relative to the spar about three-axes, but the coupler is not movable relative to the spar.

In some embodiments, the release may be biased to the first position.

In some embodiments, movement of the release from the first position may reduce the frictional force applied to components within the coupler such that the movement of the release continuously reduces the force necessary to move the limb rest relative to the spar.

In some embodiments, movement of the release from the first position may reduce the frictional force between the coupler and the spar such that movement of the release continuously reduces the force necessary to move the coupler relative to the spar.

In some embodiments, the release may include a bias structure that is loaded in the first position to urge components of the coupler together to frictionally lock the coupler with sufficient force to support a patient's limb.

In some embodiments, the release may include a first spar engaging portion and a second spar engaging portion which cooperate to grip the spar. The release may also include a bias member acting between the first spar engaging portion and the second spar engaging portion. The bias member may urge the first spar engaging portion and the second spar engaging portion apart. The bias structure of the release may be operable to overcome the bias member when the release is in the first position.

In some embodiments, the bias structure may induce a tension load in a tension rod, the tension load acting on components of the coupler to secure the coupler.

In some embodiments, the force applied by the bias structure may be reduced as the release is moved from the first position to the third position thereby reducing the tension load in the tension rod.

In some embodiments, the bias structure may act on a first driver urging the first driver toward a second driver. The bias structure may also urge the drivers together with a first spring force in the first position and the release continuously reducing the spring force to zero as the release is moved from the first position to the second position.

In some embodiments, the drivers may be formed to include inclined surfaces that engage mating surfaces of two wedges. The spring force may push the inclined surface of the first driver against the wedges to urge the wedges apart. The wedges may be constrained by a second driver and the tension rod such that the spring force is transferred through the drivers and wedges to develop tension in a tension rod. The tension of the tension rod may secure the components of the coupler against movement.

In some embodiments, the release may further comprise a cam shaft, the cam shaft coupled to the handle such that movement of the handle rotates the cam shaft about a longitudinal axis of the cam shaft to move a cam of the cam shaft from the first position to the third position such that the cam overcomes the spring force of the bias structure in the third position.

In some embodiments, the cam reduces the spring force of the bias structure as the cam moves from the first to the third position. A second position, intermediate the first and third positions, may reduce the spring force sufficiently to allow a user to adjust the position of the limb rest relative to the coupler while maintaining the coupler in a secured position relative to the spar.

In some embodiments, the release may include a floating spacer that is engaged by the cam shaft. The floating spacer may move relative to the drivers. As the cam moves from the first position to the second position, the floating spacer may engage the bias structure to compress the bias structure and engage the second driver to move the second driver away from the first driver to effect the release of the coupler by releasing the tension in the tension rod.

In some embodiments, the cam shaft may engage a return spring, the return spring biasing the cam shaft to urge the cam shaft toward the first position. The force of the return spring may not act on the first driver so that the spring force of the return spring does not act upon the components of the coupler.

According to a fourth aspect of the present disclosure, a limb support comprises a spar, a coupler supported on the spar, a limb rest, a handle, pad positioned on the limb rest, and at least one restraint. The coupler has a release that is selectively actuable to permit movement of the coupler relative to the spar. The limb rest is supported on the coupler. The handle is coupled to the release of the coupler. The handle is positioned such that a user may simultaneously grip the handle and the limb rest. The handle is movable relative to the limb rest so that the user squeezes the handle and the limb rest to move the handle relative to the limb rest to activate the release to allow the limb rest position and orientation relative to the spar to be adjusted. The pad is secured to the limb rest. The at least one restraint is configured to engage a limb of a patient to secure the pad to the limb restraint.

In some embodiments, the restraint comprises a first end coupled to the limb rest by a frictional lock.

In some embodiments, the restraint comprises a second end secured by a directional snap.

In some embodiments, the restraint may comprise a second end secured by a hook and loop fastener.

In some embodiments, the restraint may comprise a second end secured by a buckle.

In some embodiments, the restraint may be secured to the buckle by a frictional lock.

In some embodiments, the restraint may comprise a second end secured by a snap assembly.

In some embodiments, the restraint may comprise a first end coupled to the limb rest by a retaining device secured to the restraint. The restraint may pass through an opening in a wall of the limb rest. The retaining device may be sized to prevent the retaining device from passing through the opening.

In some embodiments, the restraint may comprise a second end secured by a directional snap.

In some embodiments, the restraint may comprise a second end secured by a hook and loop fastener.

In some embodiments, the restraint may comprise a second end secured by a buckle.

In some embodiments, the restraint may be secured to the buckle by a frictional lock.

In some embodiments, the restraint may comprise a second end secured by a snap assembly.

In some embodiments, the second end of the restraining device may be secured to the limb rest by a bulbous protuberance formed in the restraining device. The bulbous protuberance may engage a slot in a wall of the limb rest.

In some embodiments, the restraint may be formed to include a plurality of spaced apart bulbous protuberances to allow for adjustment of the effective length of the restraint.

In some embodiments, the restraint may be resiliently elastic such that the restraint provides flexible engagement with the limb of the patient.

In some embodiments, the pad may be secured to the limb rest by a snap-fit.

In some embodiments, the pad may be secured to the limb rest by at least one pocket that slides over a portion of the limb rest.

In some embodiments, the pad may be secured to the limb rest by two pockets, each pocket sliding over a different portion of the limb rest.

In some embodiments, the pad may be secured to the limb rest by removable rivets.

In some embodiments, the limb rest may be formed to include guide structures for positioning a restraint on the limb rest.

In some embodiments, the mounting structure of the limb rest that engages the coupler may be arranged so that the longitudinal axis of the limb rest is positioned at an angle relative to the coupler.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
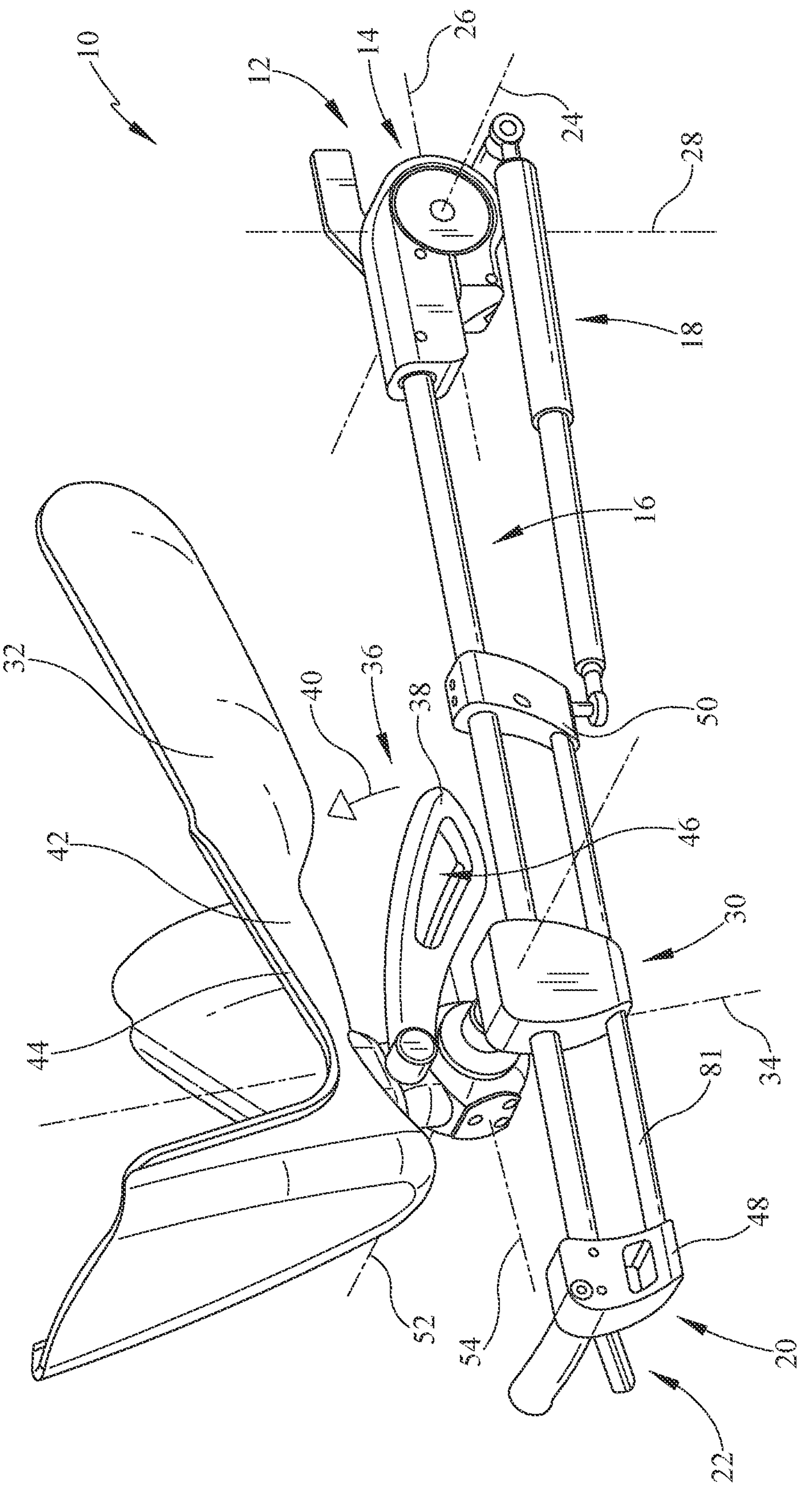
FIG. 1 is a perspective view of a limb support for use during surgery, the limb support configured to be mounted to a patient support apparatus.

A limb support configured as a leg support 10 mountable to a patient support apparatus (not shown) and for positioning the leg of a patient in a number of different positions is shown in FIG. 1. The leg support 10 includes a mount 12 for mounting the leg support 10 to a patient support apparatus as is known in the art. The mount 12 supports a lockable multi-axis coupler 14 that supports a spar 16 illustratively embodied as a rod and permits movement of the spar 16 relative to the mount 12 in a plurality of directions. An illustrative coupler suitable for use as coupler 14 is disclosed in U.S. Pat. No. RE41412E1, titled "LEG HOLDER SYSTEM FOR SIMULTANEOUS POSITIONING IN THE ABDUCTION AND LITHOTOMY DIMENSIONS" which is incorporated by reference herein for the subject matter related to the implementation of a lockable multi-axis coupler 14.

The spar 16 is supported relative to the mount 12 by a counterbalancing gas spring 18 which assists in supporting the weight of a patient's leg when the leg support 10 is in use or the position is being adjusted. A release handle 20 positioned on a distal end of the spar 16 relative to the mount 12 is configured to be used by a user to position the spar 16 and includes a release trigger 22 that, when gripped by a user, causes the a lockable multi-axis coupler 14 to be released to allow the spar 16 to move relative to the mount 12. Movement of the spar 16 relative to the mount 12 is facilitated in the pitch axis 24, roll axis 26, and yaw axis 28 as suggested in FIG. 1. In the illustrative embodiment, this permits abduction, adduction, and lithotomy adjustments of the patient's leg. In should be understood that the movement could be equally applicable to a patient's arm.

The illustrative leg support 10 is configured to support a patient's left leg. In many cases, a second leg support that is a mirror duplicate of the leg support 10 will be used to support the right leg of a patient. The present disclosure includes an adjustable coupler 30 that permits adjustment of the relative position and orientation of a limb rest 32 relative to the spar 16. As will be explained in further detail below, the adjustable coupler 30 permits discrete adjustment of the position of the limb rest 32 about the spar 16 that provides additional roll axis adjustment of the limb rest 32. Still further, the limb rest 32 may be rotated about an axis 34 shown in FIG. 1 to change the orientation of the limb rest 32 relative to the spar 16.

Figure 2:
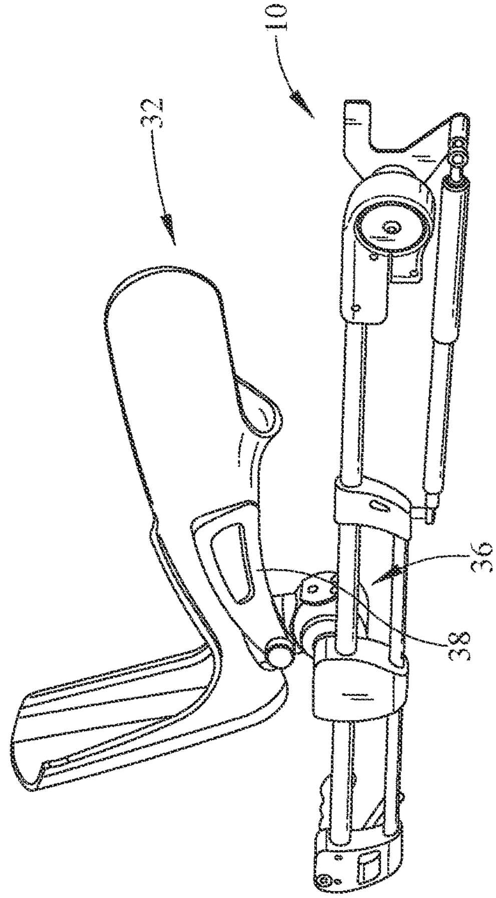
FIG. 2 is another perspective view of the limb support of FIG. 1.
Figure 3:
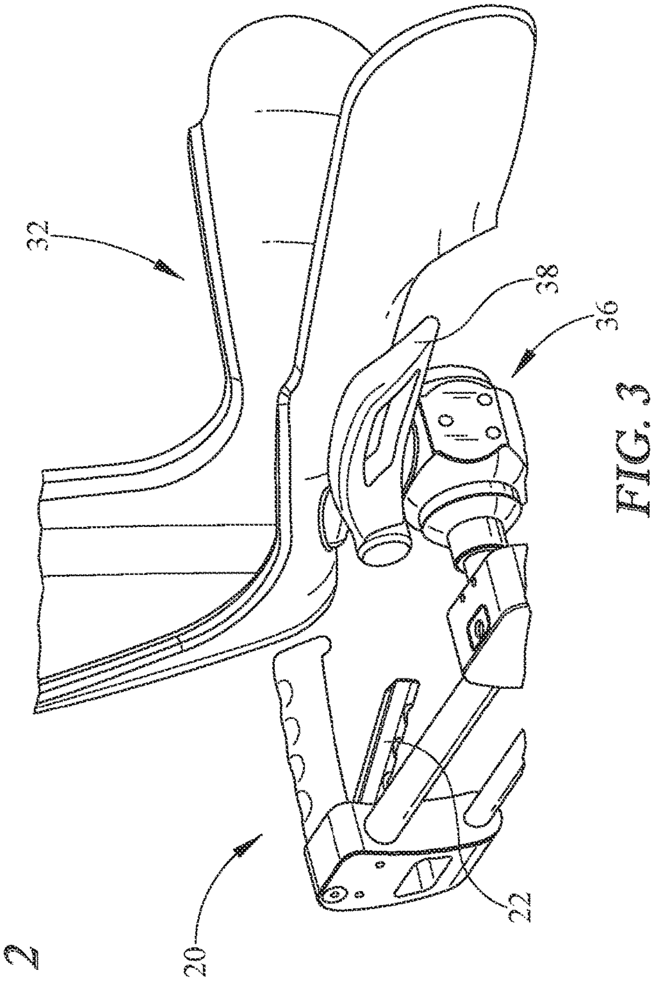
FIG. 3 is a partial perspective view of the limb support of FIG. 1.

Referring to FIG. 1, the adjustable coupler 30 includes a release 36 that includes a handle 38 that may be pulled in the direction of arrow 40 to move the release 36 in the direction of arrow 40 shown in FIG. 2. The operation of the release 36 will be discussed in further detail below. As the handle 38 is moved in the direction of arrow 40, the handle 38 moves to a position adjacent a surface 42 of the limb rest 32 as shown in FIGS. 2 and 3. A user may apply pressure to a flange 44 of the limb rest 32 with their thumb while inserting their fingers into a recess 46 formed on the handle 38. This allows the user to actuate the handle 38 while using a resistive force of their thumb against the flange 44 to brace against the resistance of the handle 38 and cause the release 36 to move to an unlocked position that allows adjustment of the limb rest 32 relative to the coupler 30, while simultaneously allowing the coupler 30, and, thereby, the limb rest 32 to be moved along the spar 16 between two stops 48 and 50 positioned on the spar 16. Activation of the release 36 allows the movement of the limb rest 32 about the axis 34 as described above, as well as some level of movement about a pitch axis 52 and a roll axis 54, while simultaneously allowing movement of the coupler 30 along the spar 16. Thus the limb rest 32 is adjustable with four degrees of freedom, relative to the spar 16. As will be discussed in further detail below, movement of the handle 38 releases the release 36 in two stages; the first stage releases the movement about the axes 34, 52, and 54 without releasing movement along the spar 16; and the second stage releases all four degrees of freedom.

Figure 5:
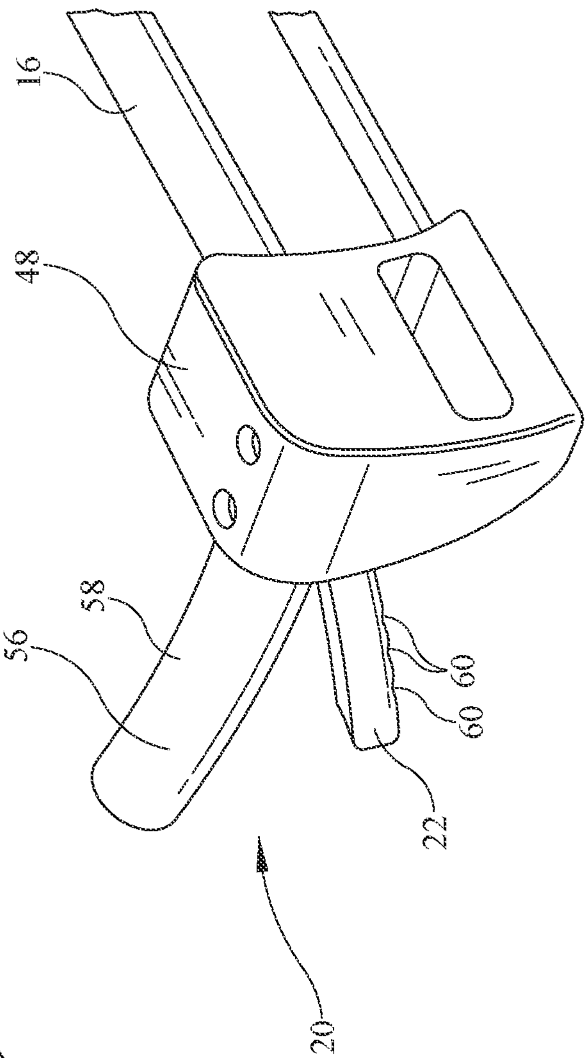
FIG. 5 is a partial perspective view similar to FIG. 4, the release handle in a position that causes the lockable multi-axis coupler to be locked.
Figure 4:
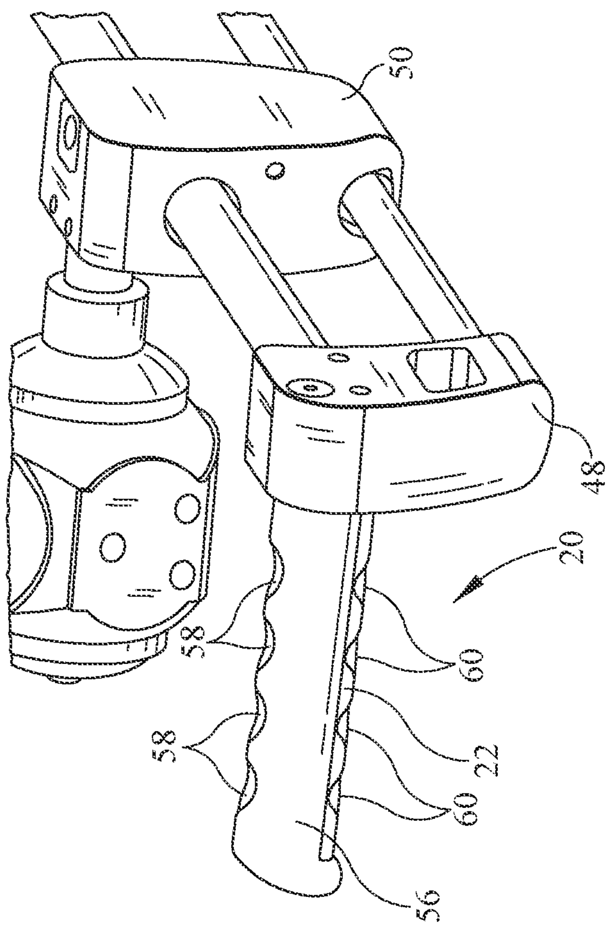
FIG. 4 is partial perspective views of an embodiment of a release handle for the limb support of FIG. 1, the handle in a release positon causing a lockable multi-axis coupler of the limb support to be released to permit movement of the limb support relative to the patient support apparatus.

As discussed above, additional adjustment of the leg support 10 includes adjustment of the spar 16 relative to the mount 12 through the activation of the release trigger 22 of the handle 20. Referring to FIG. 4, the release trigger 22 is movable relative to a grip 56 to a position where the release trigger 22 is positioned within a space formed in the grip 56 so that a user may use the grip 56 as a fixed component for leverage to activate the release trigger 22 into the position shown in FIG. 4. Thus, the release trigger 22 is movable between the locked position shown in FIG. 5 and the release position shown in FIG. 4. When released, the spar 16 is movable about the axes 24, 26, 28, as described above and as disclosed in the U.S. Pat. No. RE41412E1, titled "LEG HOLDER SYSTEM FOR SIMULTANEOUS POSITIONING IN THE ABDUCTION AND LITHOTOMY DIMENSIONS," disclosed and incorporated by reference above. The grip 56 is disclosed to include a number of finger channels 58 which permit a user to rest their fingers to better grasp the grip 56. Similarly, the release trigger 22 also includes finger channels 60.

Figure 7:
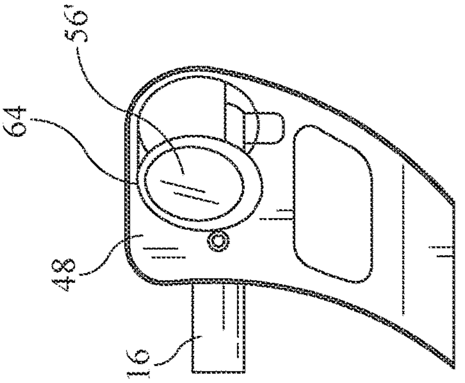
FIG. 7 is a side view of the release handle of FIG. 6 in a released positon.
Figure 6:
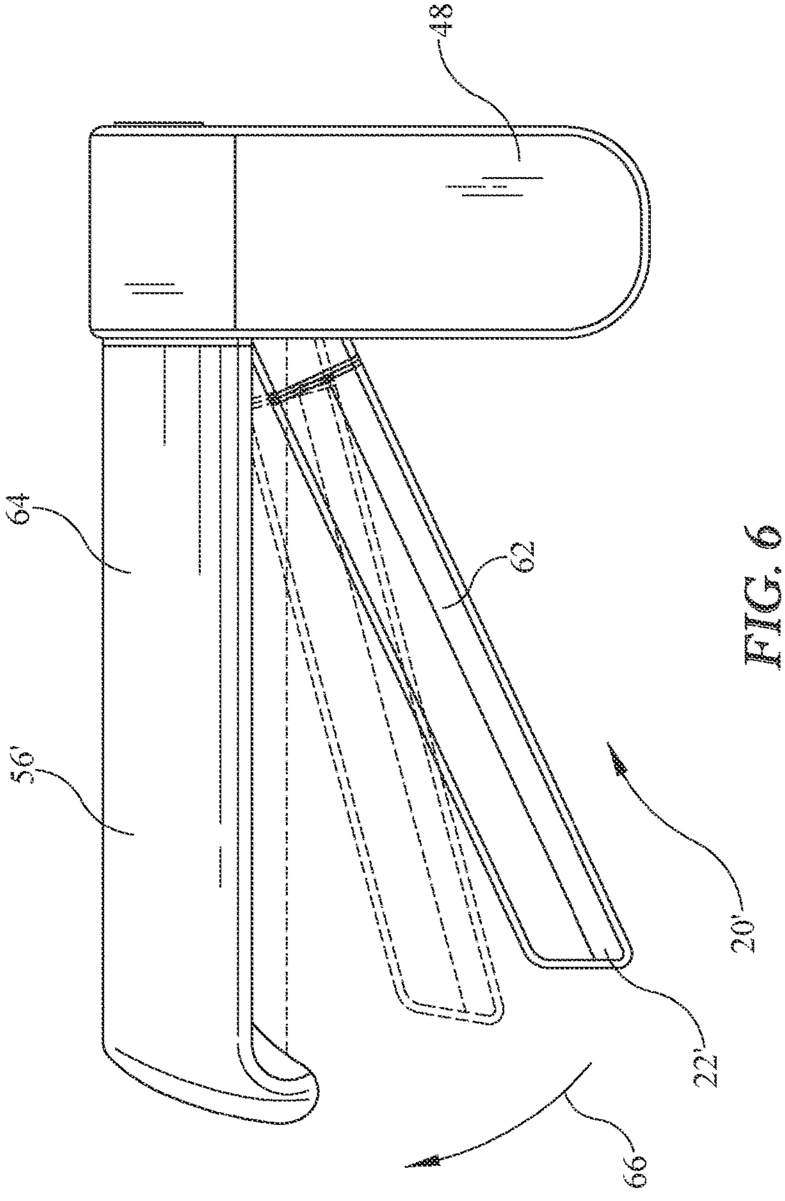
FIG. 6 is a view of another embodiment of release handle similar to the release handle of FIG. 4 and depicting the movement of a trigger release moving from a position that locks the lockable multi-axis coupler to a position that releases the lockable multi-axis coupler.

Referring now to FIGS. 6 and 7, another embodiment of handle 20' includes a grip 56' and a release trigger 22'. However, in the embodiment of FIGS. 6 and 7, the grip 56' and release trigger 22' are formed to include smooth surfaces 64 and 62, respectively. The surfaces 62 and 64 are generally smooth and permit a user's hand to move over the surfaces 62 and 64 as the spar 16 is moved about the axis 24. As shown in FIG. 7, the release trigger 22' is received into a space formed in the grip 56' when the release trigger 22' is moved in the direction of the arrow 66, shown in FIG. 6, to release the multi-axis coupler 14. This is similar to the way in which release trigger 22 is received in grip 56 in FIGS. 4 and 5. In both embodiments 20 and 20', activation of the respective release triggers 22 and 22' causes the multi-axis coupler 14 to be released by movement of the release triggers 22, 22' into the respective grips 56, 56'. As will be described in other embodiments below, the movement of the release triggers 22, 22' rotates a rod 17 positioned inside of the spar 16, the rod acting on the multi-axis coupler 14 to cause it to release, as described in U.S. Pat. No. RE41412E1.

Figure 8:
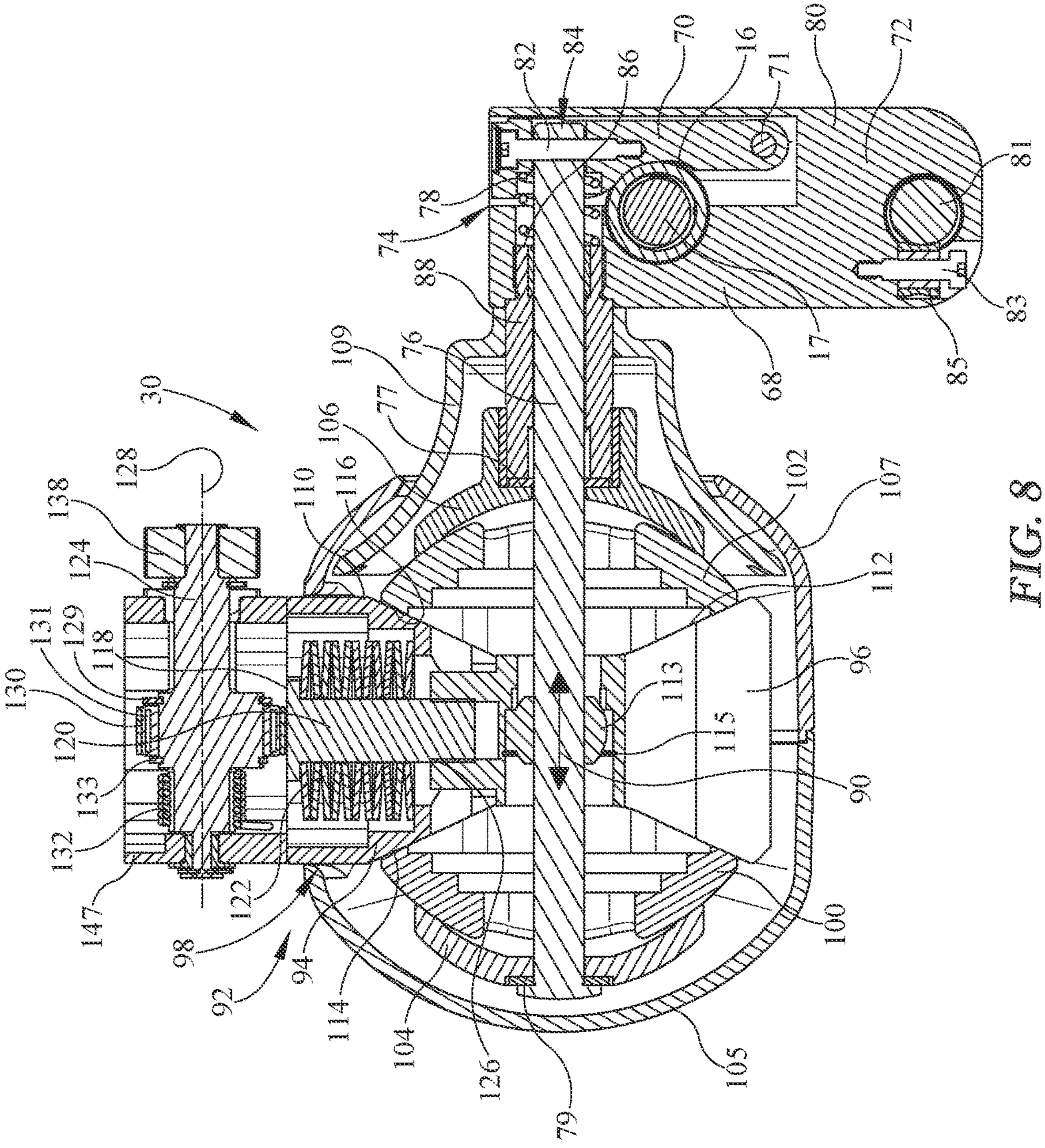
FIG. 8 is a cross-sectional view of a release mechanism for positioning a limb rest of the limb support of FIG. 1.
Figure 64:
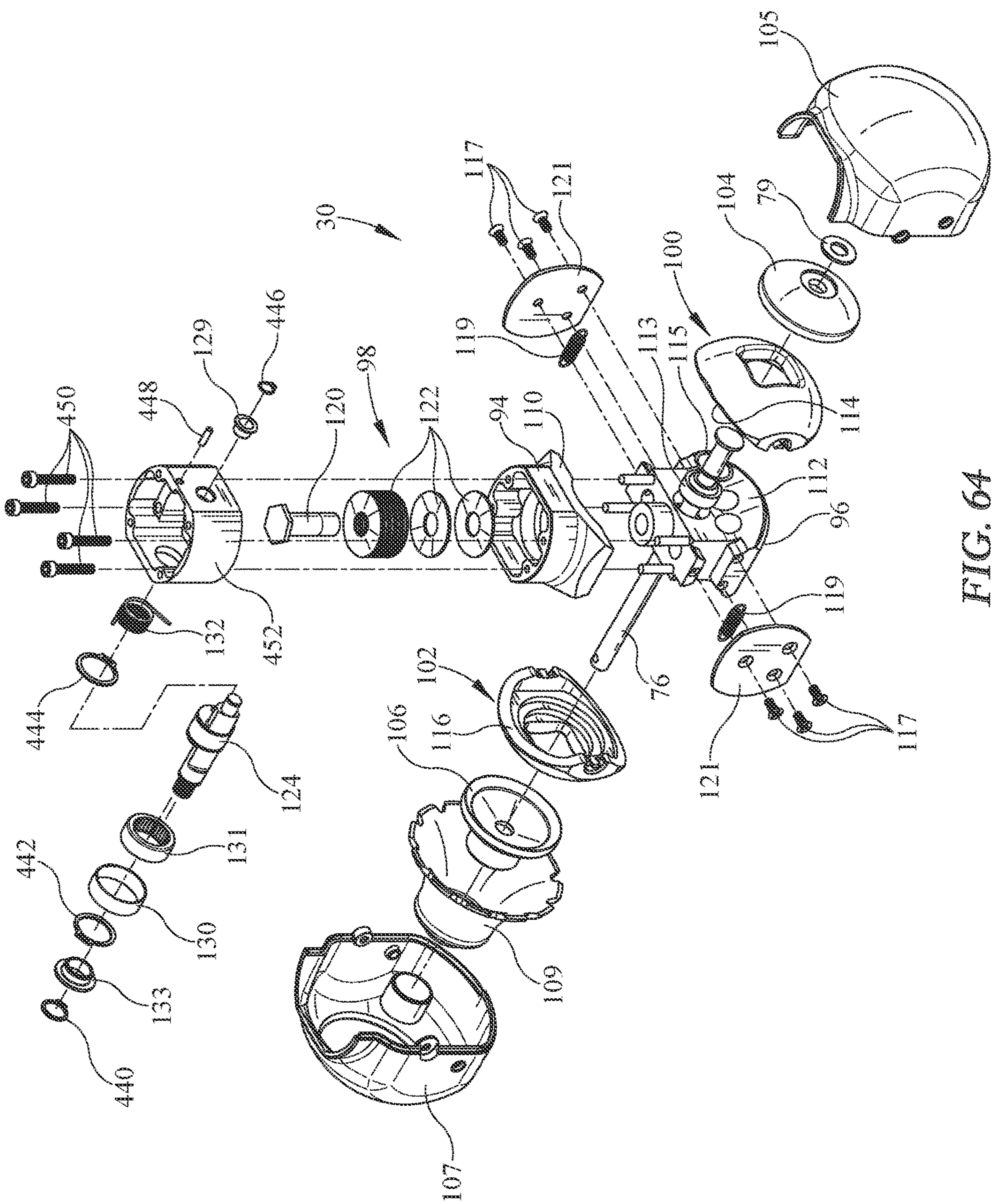
FIG. 64 is an exploded view of the coupler for the limb rest of FIG. 1.

The coupler 30 functions similarly to a coupler 430 shown in FIGS. 17-21 in U.S. Patent Publication No. 20170281447 titled "BOOT CARRIAGE FOR REPOSITIONING A SURGICAL BOOT ALONG A SUPPORT ROD," which is incorporated by reference for the disclosure of the coupler 430. However, the coupler 30 of the present disclosure is arranged differently as shown in FIG. 8 and FIG. 64. The coupler 30 includes a carriage 80 which is supported on the spar 16. The carriage 80 includes two arms 68, 70 which are separated but drawn together to clamp against the spar 16 when the coupler 30 is in a locked configuration. The lower portion of the carriage 80 is a base 72 from which the arms 68, 70 extend upwardly in FIG. 8. There is a gap 74 between the arms 68, 70 that provides clearance between the arms 68, 70 and the spar 16 when the coupler 30 is in a released state. Under normal conditions, the coupler 30 is biased to draw the arms 68, 70 together to grip the spar 16 to secure the carriage 80 relative to the spar 16.

To bias the arms 68, 70 together, a tension rod 76 is placed in tension to pull arm 70 toward arm 68. The tension 90 in tension rod 76 overcomes the spring force of a spring 78 that is positioned between the arms 68, 70 and acts to urge the arms 68, 70 apart. The tension rod 76 is secured to the arm 70 by a bolt 82 that is positioned through a hole 84 formed in the tension rod 76. The bolt 82 is threaded into the arm 70 to secure the tension rod 76 thereto. The spring 78 acts on the tension rod 76 and on a face 86 of a shaft 88 that engages the arm 68. When the tension rod 76 is loaded, as will be described in further detail below, the tension 90 pivots the arm 70 about a pivot 71 and urges the arm 70 against the spring 78, overcomes the force of the spring 78, and further urges the arm 68 against the shaft 88, which is effectively fixed relative to the arm 68 so that the load of the tension rod 76 causes the arms 68 and 70 to clamp onto the spar 16.

Referring now to FIG. 64, an exploded assembly view of the portion of the coupler 30 that provides the portion of the release 36 that permits movement of the limb rest 32 about the axes 34, 52, and 54 is provided. A top housing 452 is secured to a driver 94 by four screws 450. A floating spacer 120 is positioned through the housing 452 and the driver 94. The floating spacer 120 engages a bias structure 98 that includes a number of Belleville washers 122 that are stacked together. A driver 96 engages with the driver 94 to move relative to the driver 94 as will be described in further detail below. The tension rod 76 passes through the driver 96 and is supported relative to the driver 96 by spherical bearing 113 that is secured to the driver 96 by a snap ring 115. The spherical bearing 113 facilitates the movement of the driver 96, and thereby, the remainder of the spring-loaded wedge assembly 92 relative to the tension rod 76 in about the axes 54 and 34, when the release 36 is in a released state.

A pair of wedges 100, 102 are positioned adjacent the driver 94 and 96 and engaged by the drivers 94 and 96 as discussed below. The wedges 100, 102 are secured together by a pair of springs 119, 119 which are each trapped between the driver 96 by a pair of plates 121, 121 that are secured to the driver 96 by three screws 117. The tension rod 76 passes through openings in the wedges 100, 102.

A pair of retainers 104, 106 are positioned adjacent the respective wedges 100, 102 and are engaged with the tension rod 76 by a pair of thrust washers 77, 79 (see FIG. 8). A cover 109 overlies the retainer 106 and provides a dust cover for portions of the coupler 30. The release is enclosed by two housing members 105, 107.

The coupler 30 also includes a cam shaft 124 positioned in the top housing 452. The cam shaft 124 engages a needle bearing 131 which is covered by a crowned band 130 that acts on the floating spacer 120. It should be understood that the needle bearing 131 and crowned band 130 cooperate to reduce the friction required for the cam shaft 124 to engage with the floating spacer 120, thereby reducing an activation force for releasing the coupler 30 as described below. The needle bearing 131 and crowned band 130 are secured to the cam shaft 124 by snap-rings 442 and 444.

The cam shaft 124 is positioned in a bearing 129 that engages the top housing 452 to provide a bearing surface for rotation of the cam shaft 124. The cam shaft 124 is retained at the bearing 129 by a snap-ring 446. At the opposite end of the cam shaft 124, a return spring 132 engages the cam shaft 124 to provide a return force for returning the cam shaft 124 to a released position as shown in FIG. 1. The spring 132 engages the cam shaft 124 and the top housing 452 and is retained in place by a snap-ring 444. The cam shaft 124 is also supported by a bearing 133 that is secured to the housing 452 by a snap-ring 440. A stop 448 is positioned through the housing 452 to be engaged by a portion of the cam shaft 124 to provide a hard stop that limits the rotation of the cam shaft 124.

Referring again to FIG. 8, tension 90 is developed in the tension rod 76 by the interaction of several components of the spring-loaded wedge assembly 92 which includes the pair of drivers 94, 96 which are urged apart by a bias structure 98 such that they act on the of wedges 100, 102 to urge the wedges 100. 102 apart. The wedges 100, 102 then act on the retainers 104, 106, urging the retainers 104, 106 apart until they are constrained by the fixed length of the tension rod 76 which thereby secures the retainers 104, 106 to the wedges 100, 102 through the force transferred therethrough.

In use, the bias structure 98 urges the driver 94 away from the top plate 147 such that the inclined surface 110 acts on surfaces 114, 116 of the wedges 100, 102. As the drivers 94 is urged away from the top plate 147, the diameter of the inclined surface 110 acting on the wedges 100, 102 is forced into the wedges 100, 102 so that the wedges 100, 102 are urged apart. The second driver 96 constrains the wedges 100, 102 so that the wedges 100, 102 are urged apart. The bias structure 98 includes the stack of Belleville washers 122 that are constrained by a flange 118 of the floating spacer 120. The movement of the floating spacer 120 is constrained by the cam shaft 124. The floating spacer further includes a flange 126 formed on the end opposite the flange 118, the flange 126 engaging the driver 96. The driver 94 is engaged by the stack of Belleville washers 122 which act on the driver 94 to urge the driver 94 toward the driver 96, which it telescopically engages so that there may be relative movement between the drivers 94 and 96. As the driver 94 is driven toward the driver 96, the larger portions of the incline surfaces 110 and 112 act on the surfaces 114 and 116 urging the wedges 100, 102 apart so that they engage the retainers 104, 106 and develop the tension in the tension rod 76.

When the cam shaft 124 is rotated about its longitudinal axis 128, the surface of the crowned band 130 acts on the flange 118 of the floating spacer 120 and compresses the stack of Belleville washers 122 and effectively pushes the driver 96 away from the driver 94 to thereby release the pressure developed on the wedges 100, 102 As shown in FIG. 8 where the cam shaft 124 is moved to partially compress the bias structure 98 so that the drivers 94, 96 and wedges 100, 102 are in a neutral load. It should be understood that if the cam shaft 124 is rotated further in a first direction, the driver 96 will be pushed to disengage the wedges 100, 102. If the cam shaft 124 is rotated in a second direction, the floating spacer 120 will disengage the driver 96 and the full force of the bias structure 98 will be transferred through the driver 94 to the wedges 100, 102 and driver 96.

Movement in the first direction would release the tension in the tension rod 76, allowing the limb rest 32 to be adjusted about the axes 34, 52, and 54, as well as allowing the carriage 80 to move along the spar 16, thereby providing four degrees of freedom of adjustment of the limb rest 32. The cam shaft 124 is connected to and rotated by the handle 38 of the release 36, the release 36 including the handle 38 and the spring-loaded wedge assembly 92, as well as the carriage 80, such that the release 36 is operable to release the four degrees of freedom described above. The handle 38 is spring loaded and urged to the position of FIG. 1 by a spring 132, and, effectively, the stack of Belleville washers 122. Movement of the retainers 104, 106 relative to the tension rod 76 is facilitated by a pair of thrust washers 79, 77, respectively. It should be understood that the rotation of the cam shaft 124 may operate to allow movement of the elements of the spring-loaded wedge assembly 92 such that the coupler 30 can be adjusted relative to the axes 34, 52, 54 without releasing the tension in the tension rod 76 so that the coupler 30 is not free to move relative to the spar 16. Thus, the three degrees of freedom of axes 34, 52, 54 may be released without releasing the fourth degree of freedom of movement along the spar 16.

It should be understood that rotation of the carriage 80, and thereby, coupler 30 about the spar 16 is precluded by the carriage 80 being supported on a rail 81 that extends between the stops 48 and 50. The rail 81 is engaged by a bearing 85 which is secured to the base 72 by a bolt 83.

Figure 9:
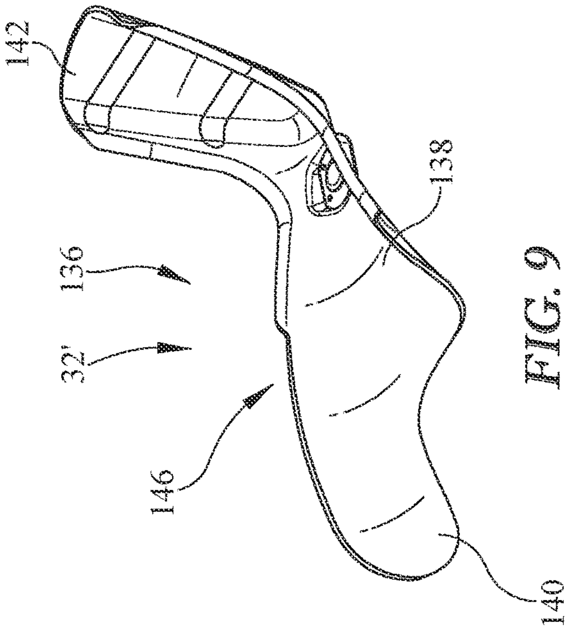
FIG. 9 is a perspective view of one embodiment of a limb rest of the present disclosure.
Figure 10:
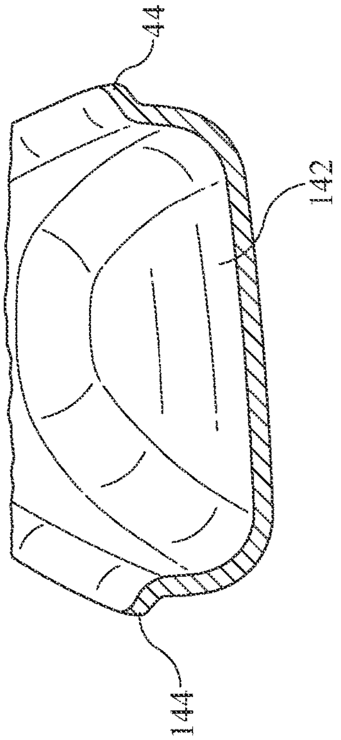
FIG. 10 is a perspective view of a portion of the limb rest of FIG. 9.

As shown in FIG. 9, another embodiment of limb rest 32' comprises a thermoformed boot/shell 136 formed as a single-walled part. The single-walled nature of the part offers the ability to adjust the flexibility of a calf section 138 and fin section 140 of the shell by adjusting the type and wall thickness of the thermoplastic stock used in the thermoforming process. This flexibility allows for the shell to flex/conform to large calves and lower pressure on the calf. As shown in detail in FIG. 10, the edge of the shell 136 from a toe 142 to the mid-calf region 146 includes flanges 44 and 144. The flanges 44, 144 serve to create a radiused edge to prevent pressure points on the calf of an occupant. The flanges 44, 144 also help to secure and guide straps to secure the occupant's limb, as discussed below. Throughout this disclosure, the term strap is used to refer to a restraint of the type that overlies a patient's limb and secures the patient's limb to the limb support structure.

Figure 11:
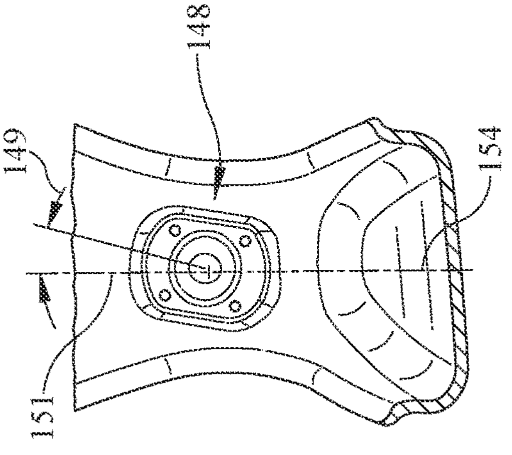
FIG. 11 is another perspective view of a portion of the limb rest of FIG. 9.
Figure 12:
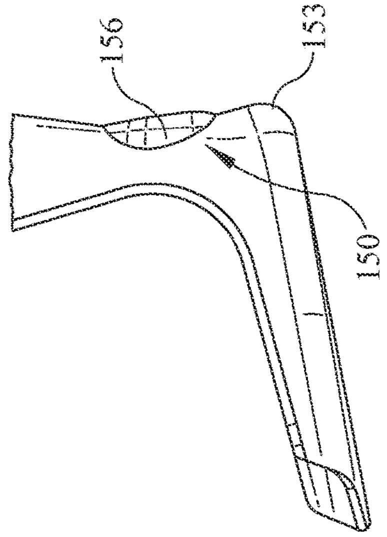
FIG. 12 is a side view of a portion of the limb rest of FIG. 9.

Referring now to FIGS. 11 and 12, a shell mount 148 serves as the attachment to a top plate 147 of the spring-loaded wedge assembly 92. A recess 150 located just forward of the heel 153 of the shell 136 forms a planar surface to interface with the top plate 147. The recess 150 consists of a four-hole bolt pattern timed at an offset angle 149. The offset angle in the illustrative embodiment is a 10 degree offset from the longitudinal axis 151 of the shell and a central raised protrusion 156. The yaw axis in the spring-loaded wedge assembly 92 has a symmetric +/−10 degree rotation with respect to the longitudinal axis of the spar 16. However, the shell 136 is required to rotate in yaw parallel to the spar 16 to plus 20 degrees inwards towards the centerline of the patient support the leg support 10 is mounted upon. The timing of the shell mount 148 at 10 degrees offset from the longitudinal axis of the shell 136 allows for a symmetric spring-loaded wedge assembly 92 on both the leg support 10 and another leg support that is a mirror image/right leg support, while meeting the −0/+20 degree required yaw rotation.

Figure 14:
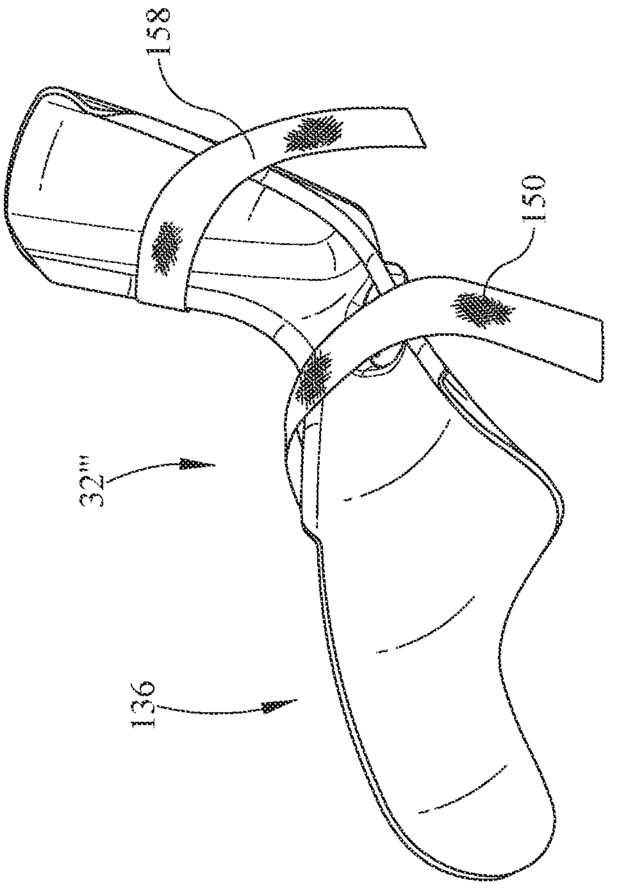
FIG. 14 is a perspective view of yet another embodiment of limb rest similar to the limb rest of FIG. 13, the limb rest of FIG. 14 including only two straps for securing a patient's limb.
Figure 13:
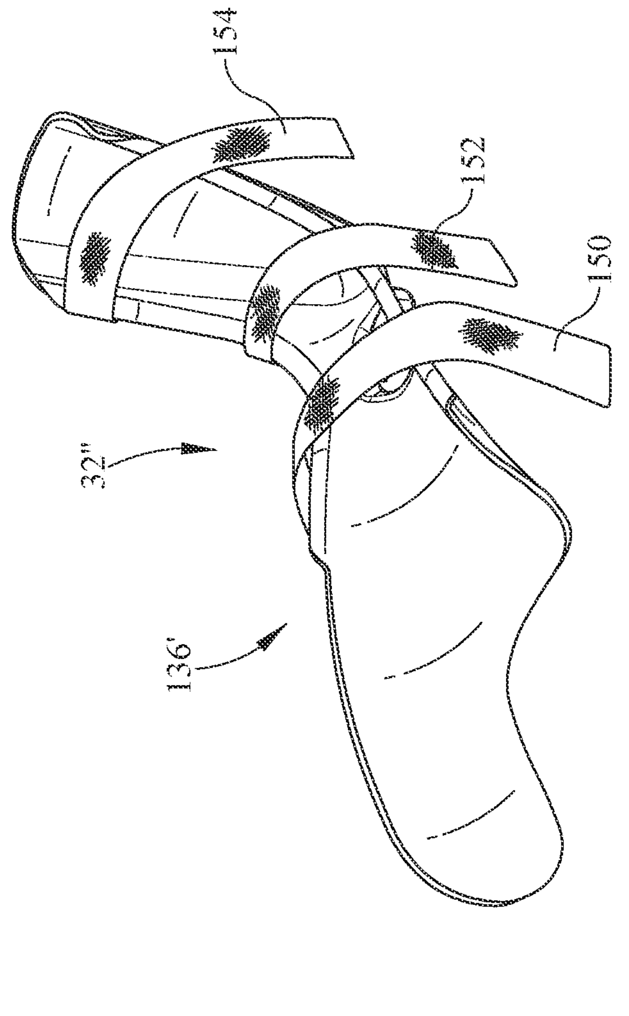
FIG. 13 is a perspective view of another embodiment of limb rest including three straps that may be used to secure a patient's limb to the limb rest.

As shown in FIG. 13, in another embodiment of limb rest 32", a shell 136' supports a patient's lower leg and foot may be restrained by a three-strap concept utilizes a first strap 150 at the farthest accessible region of the calf, a second strap 152 over the ankle and a third strap 154 the distal end of the patient's foot. The three-strap design is constraining but secure. Referring now to FIG. 14, in yet another embodiment of limb rest 32''', a two-strap concept utilizes the first strap 150 at the farthest accessible point on the calf, and a second strap 158 over the mid-foot region of the shell 136. The two-strap design is less constraining and more compliant to foot geometry than the three strap embodiment of FIG. 13. The straps 150, 152, 154, and 158 are constructed of a cleanable material. In some embodiments the material may include an elastomeric polyurethane rubber or similar elastomeric material or polyester webbing coated with thermoplastic polyurethane (TPU) or polyvinyl chloride (PVC).

Figure 15:
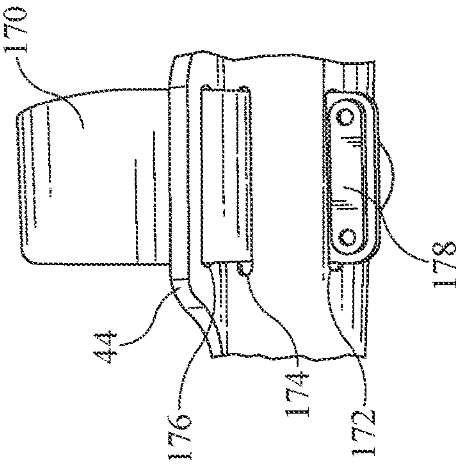
FIG. 15 is a partial perspective view of an outside limb rest including a fixed end of a strap secured to a body of the limb rest.
Figure 16:
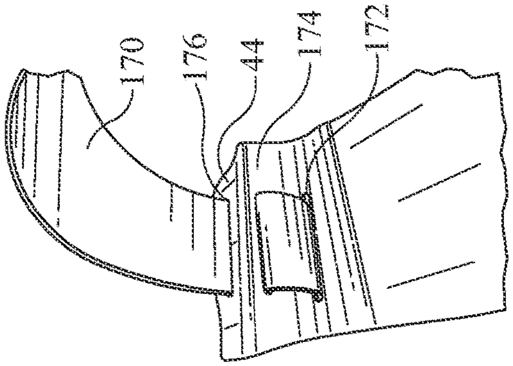
FIG. 16 is a partial view perspective view of the inside of the limb rest of FIG. 15.

FIGS. 15-27 show various embodiments of strap retention approaches that may be used with either the embodiment of FIG. 13, or the embodiment of FIG. 14. For example, FIGS. 15 and 16 show and embodiment of strap where the strap 170 is fed through three slots 172, 174, and 176 formed in the wall of the shell on the outboard side of the shell 136. The slot 176 is formed in the flange 44. Once fed through the slots 172, 174, and 176 a retaining device 178 is attached to the strap 170. Once the retaining device 178 is attached, the strap 170 cannot be pulled back though the slots 172, 174, and 176. The slot 176 on the flange 44 serves to maintain the position, orientation and visibility of the strap 170 when the strap 170 is not in use.

Figure 17:
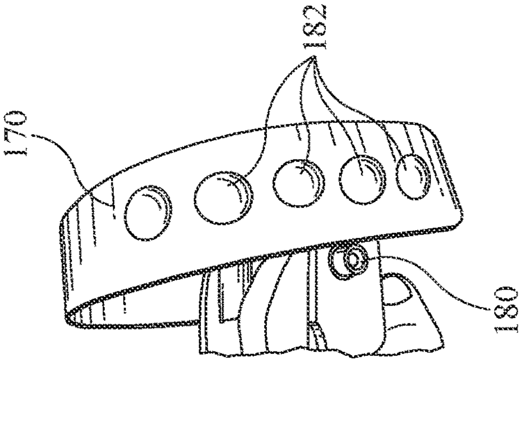
FIG. 17 is a partial perspective view of one embodiment of a free end of a strap showing that the free end may be secured to a limb rest by one of a plurality of snaps.
Figure 18:
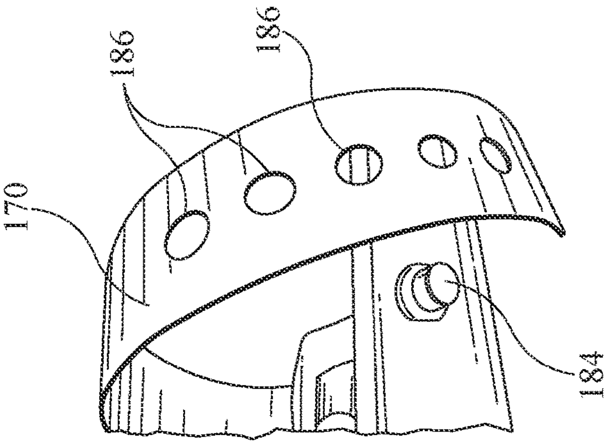
FIG. 18 is a partial perspective view of one embodiment of a free end of a strap showing that the free end may be secured to a limb rest by one of a plurality receivers that may be secured to a post.
Figure 20:
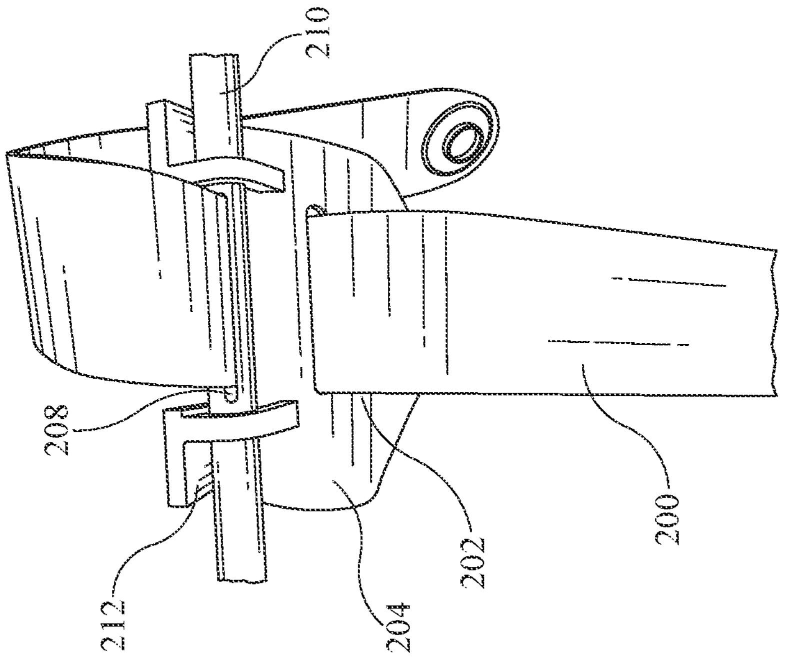
FIG. 20 is a partial perspective view of an outside of a limb rest with a free end that engages an adjustable tension lock and another free end that may be secured using a snap, the adjustable tension lock permitting the working length of the strap to be adjusted.

FIGS. 17 and 18 show alternative embodiments for how the free end of the strap 170 may be connected on the inboard sided of the shell 136. For example, FIG. 17 illustrates that the strap 170 has a temporary attachment including a male snap 180 attached to the shell 136 and multiple female snaps 182 spaced equally along the strap 170 for incremental adjustment of strap length. To attach the selected female snap 182 is pressed onto the male snap 180. In the embodiment of FIG. 18 a male directional hook 184 (hook upwards) is attached to the shell 136 and multiple holes 186 are punched thru the strap 170 and spaced equally along the strap 170 for incremental adjustment of strap length. To attach the strap 170 to the directional hook 184, the selected hole 186 is placed over the hook 184 and the strap 170 is pulled downwards.

Figure 19:
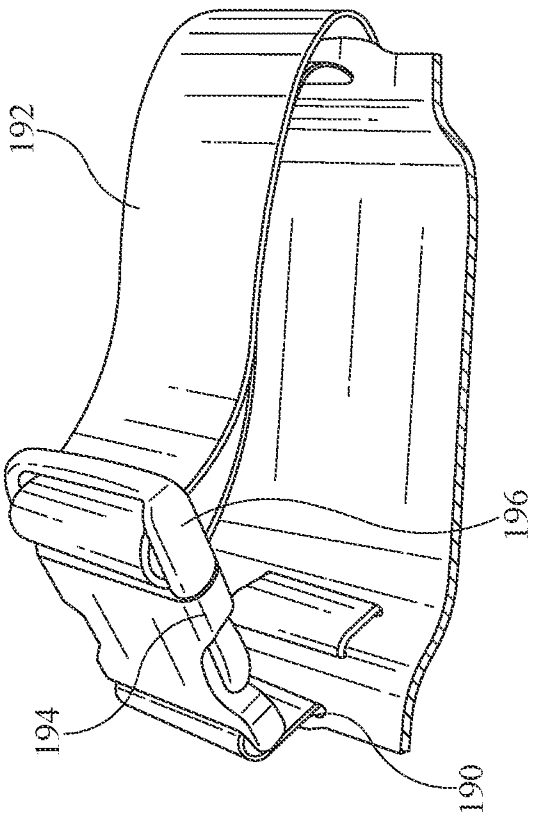
FIG. 19 is a partial perspective view of yet another embodiment of a pair of straps, each strap having a fixed end secured to a limb rest and a free end, the free ends of the straps connectable by mating portions of a buckle.
Figure 23:
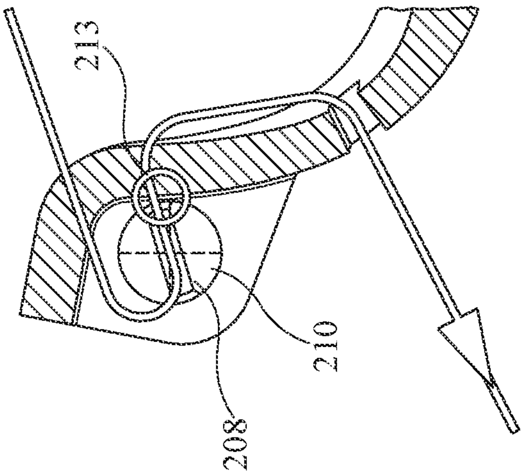
FIG. 23 is a diagrammatic representation of the second step of positioning the strap in the tension lock of FIG. 20.
Figure 22:
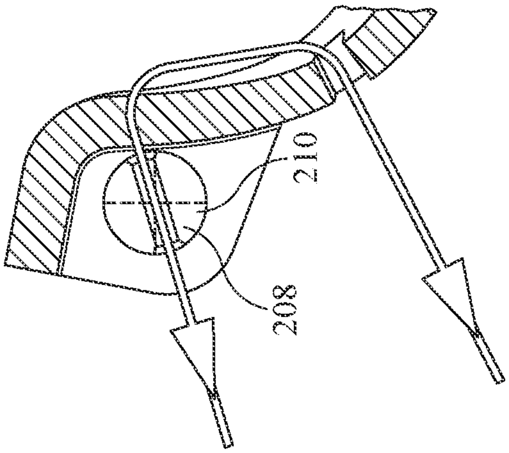
FIG. 22 is a diagrammatic representation of the first step of positioning the strap in the tension lock of FIG. 20.
Figure 21:
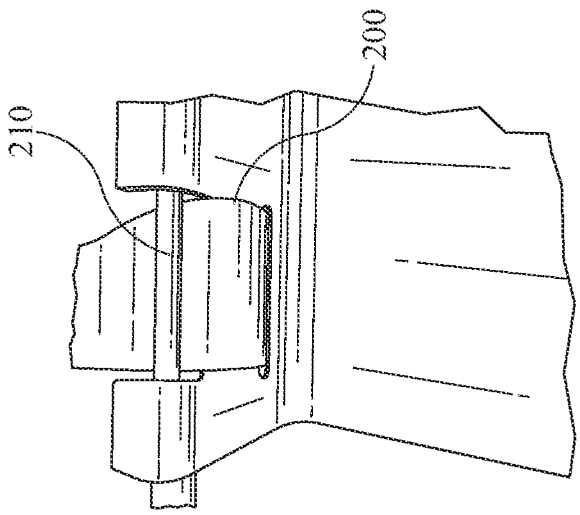
FIG. 21 is a partial perspective view of the inside of the limb support of FIG. 20.
Figure 24:
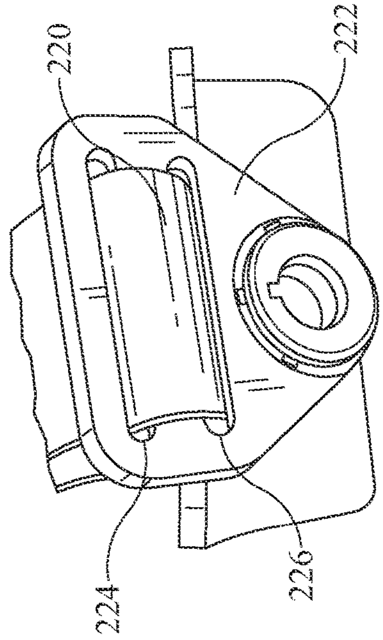
FIG. 24 is a perspective view of a free end of a strap that includes yet another embodiment of a fastening assembly for securing the free to a limb support.

In the embodiment of FIG. 19, separate straps 190 and 192 are secured to the inboard and outboard sides of the shell 136 in a manner similar to that used on the outboard side in the embodiment of FIGS. 15 and 16. The outboard strap 190 and inboard strap 192 are respectively attached to the female 194 and male 196 sides of a quick release buckle 198. To attach, the female 194 and male 196 sides of the quick release buckle 198 are attached. A portion of the strap 192 is pulled to tighten the straps 190, 192 as required.

In the embodiment of FIGS. 20-23, at the outboard side of the shell 136 a strap 200 is fed though one slot 202 in the wall 204 of the shell 136 and a retainer 206 is added with extra slack provided on the outboard side of the shell 136. On the inboard side of the shell 136 the strap 200 is looped around and fed through a slot 208 which passes radially through a pin 210. The pin 210 is located adjacent to the exterior wall 212 of the shell and interfaces with two holes which are integral to the shell wall 214. The strap 200 is free to be pulled in either direction when the strap 200 is orientated as shown in in FIG. 22. However, when the strap 200 is oriented as shown in in FIG. 23, the strap 200 will only move freely when pulled in the direction shown by the arrow. When pulled in the opposite direction the pin 210 is rotated (clockwise in FIG. 23) and pinches the strap 200 between the pin 210 and the shell 136 at the location indicated by a circle 213.

Figure 25:
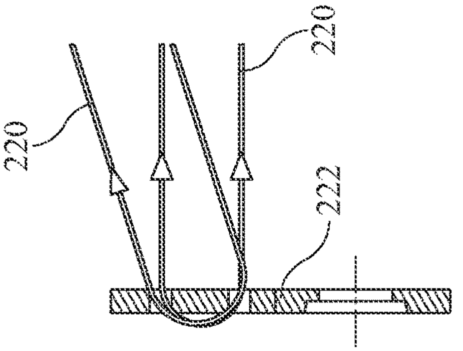
FIG. 25 is a diagrammatic representation of the manner in which the strap is tension locked to the fastening assembly of FIG. 24.
Figure 26:
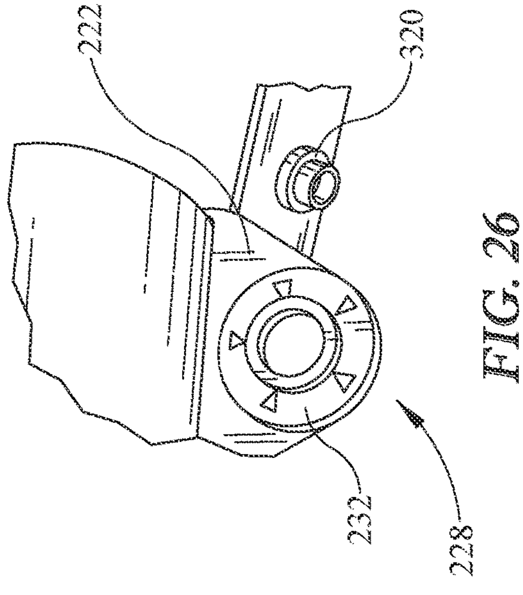
FIG. 26 is a partial perspective view of the structure of the fastening assembly of FIG. 24.
Figure 27:
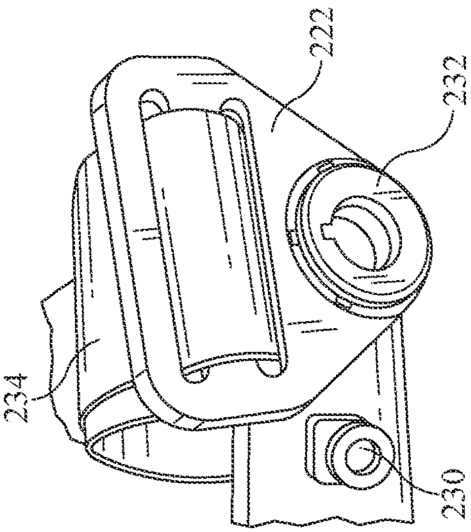
FIG. 27 is a partial perspective view of another embodiment of fastening assembly similar to FIG. 25.

Referring now to FIGS. 24-27, another embodiment of a strap for the leg support 10 includes a strap 220 that is secured to the outboard side of the shell 136 through a buckle 222. The strap 220 is fed through two slots 224, 226 in the buckle 222. The buckle 222 includes a friction lock similar to the pin 210. As shown in FIG. 25, the strap 220 is free to be pulled in either direction when the strap 220 is orientated perpendicularly relative to the buckle 222. However, when the strap 220 is angled as shown in the alternative, the strap 220 will only move freely when pulled in the direction shown by the arrow. The buckle 222 has a temporary attachment assembly 228 to the inboard side of the shell 136. The temporary attachment assembly 228 includes a male directional hook 230 (hook down) attached to the shell 136. A single female receptacle 232 for the directional snap is present on the buckle 222. To attach, the female receptacle 232 is placed over the hook 230 and the buckle 222 is tilted upwards to secure the buckle to the hook 230. A top loop 234 of the strap 220 is pulled to tighten the strap 220 as required.

Figure 29:
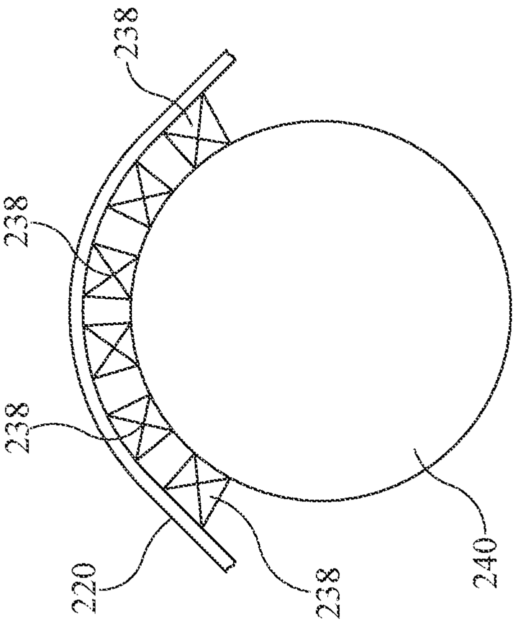
FIG. 29 is a side view of yet another embodiment of a cushioning structure that is attached the strap to distribute the load of the strap over a patient's limb.
Figure 28:
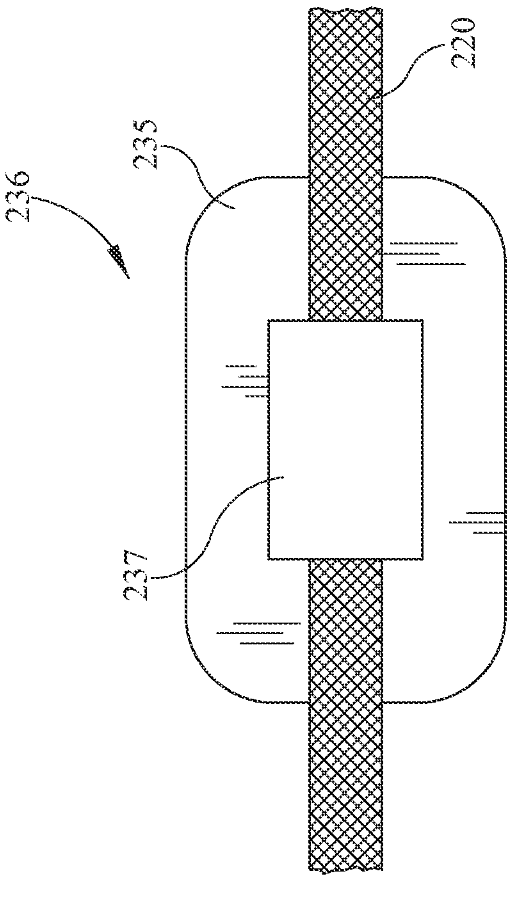
FIG. 28 is a partial perspective view of a strap for securing a patient's limb to a limb rest, the strap engaging a cushioning pad for engaging the limb of the patient to distribute the load of the strap.

Referring to FIG. 28, in some embodiments a movable pad 236 is positioned on a respective strap, such as strap 220, for example. The strap 220 is received through a sleeve 237 of the pad 236. The sleeve 237 is secured to a pad body 235. The caregiver can position the pad 236 between patient leg and strap 220. Referring to FIG. 29, in still other embodiments, a strap such as strap 220, for example, may be modified to include a number of foam pads 238 along the length of the strap so that the pads 238 are positioned between the strap and a patient's leg 240, but are conformable to follow the contour of the patient's leg 240.

Figure 31:
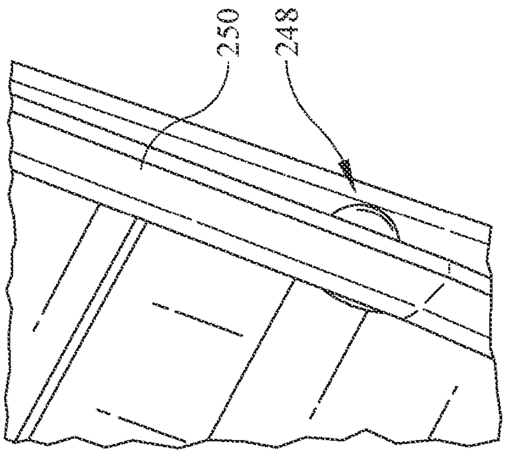
FIG. 31 is a partial perspective view of a portion of the limb rest of FIG. 30 to show details of a receiver.
Figure 30:
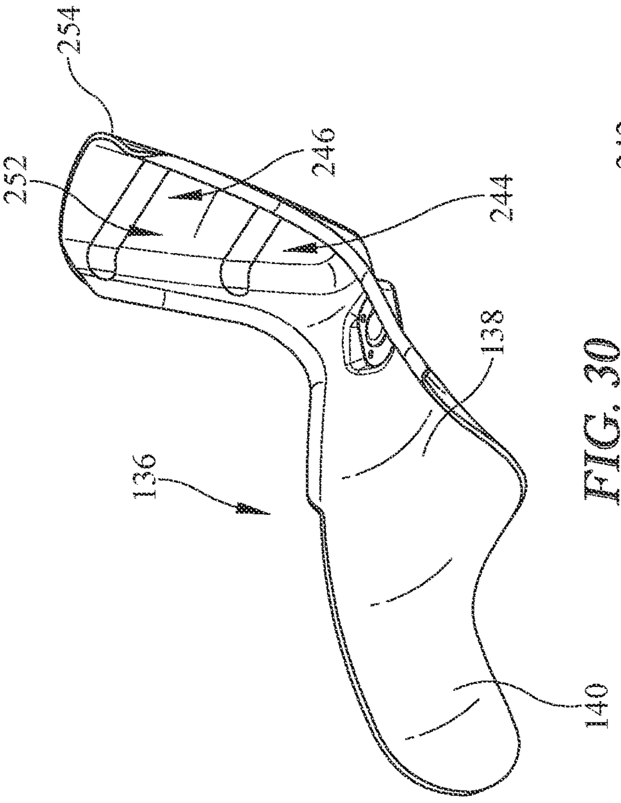
FIG. 30 is a perspective view of yet another embodiment of limb rest that includes a pair of receivers for receiving an securing a portion of a pad that is to be mounted on the limb rest to cushion a patient's limb.
Figure 32:
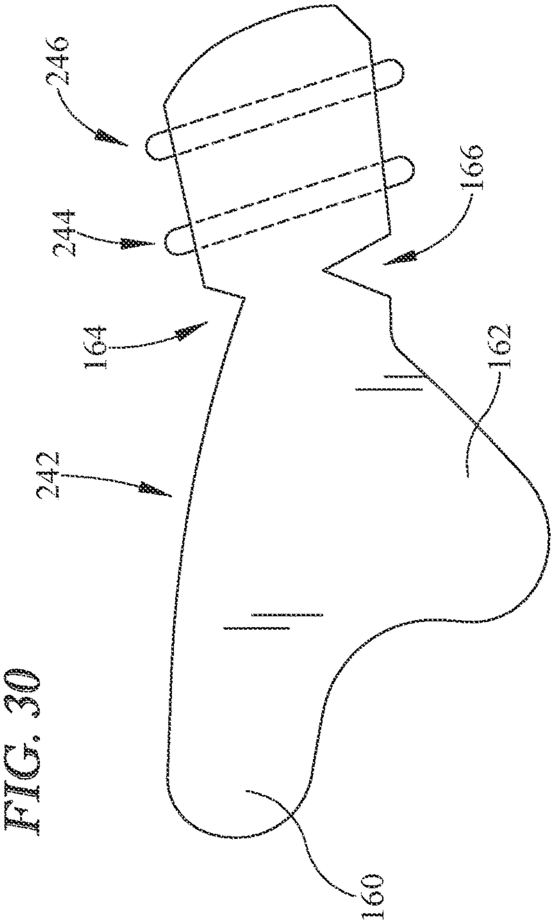
FIG. 32 is a plan view of a pad for use with the limb rest of FIG. 30.

In some embodiments, the shell 136 may be modified to include a pad positioned between the patient's body and the shell 136. For example, FIGS. 30-32 disclose a structure which utilizes a flat pattern pad 242 that is positionable in the shell 136. Referring to FIGS. 30 and 31, the snaps 244, 246 are integrated into the pad 242 which is not pictured in FIGS. 30 and 31. Holes 248 in the sidewall 250 of the shell 136 utilize integrated snap features to ensure the heel and foot sections of the pad 242 fill in the recessed area 252 of the shell 136. As the user presses the pad 242 into the shell 136, the snaps 244, 246 flex and snap into place. In some embodiments, the snap 246 may be omitted and the pad 242 may be modified to include a pocket that slides over the toe 254 of the shell 136 to retain the pad 242 on the shell 136. In other embodiments, the pad 242 may be modified by sewing the pad 242 into a three-dimensional shape to conform the pad to the contour of the shell 136. The modified three-dimensional pad may be retained by a pocket over the toe 254, our may have one or more of the snaps 244, 246 integrated into the pad structure to retain the three-dimensional pad to the shell 136. As shown in FIG. 32, the pad 242 includes relieve notches 164, 166 to assist with fitting the pad 242 into the shell 136. A flap 160 of the pad 242 is configured to overlie the fin section 140 of the shell 136 while the flap 162 is configured to overlie the calf section 138 of the shell 136.

Figure 33:
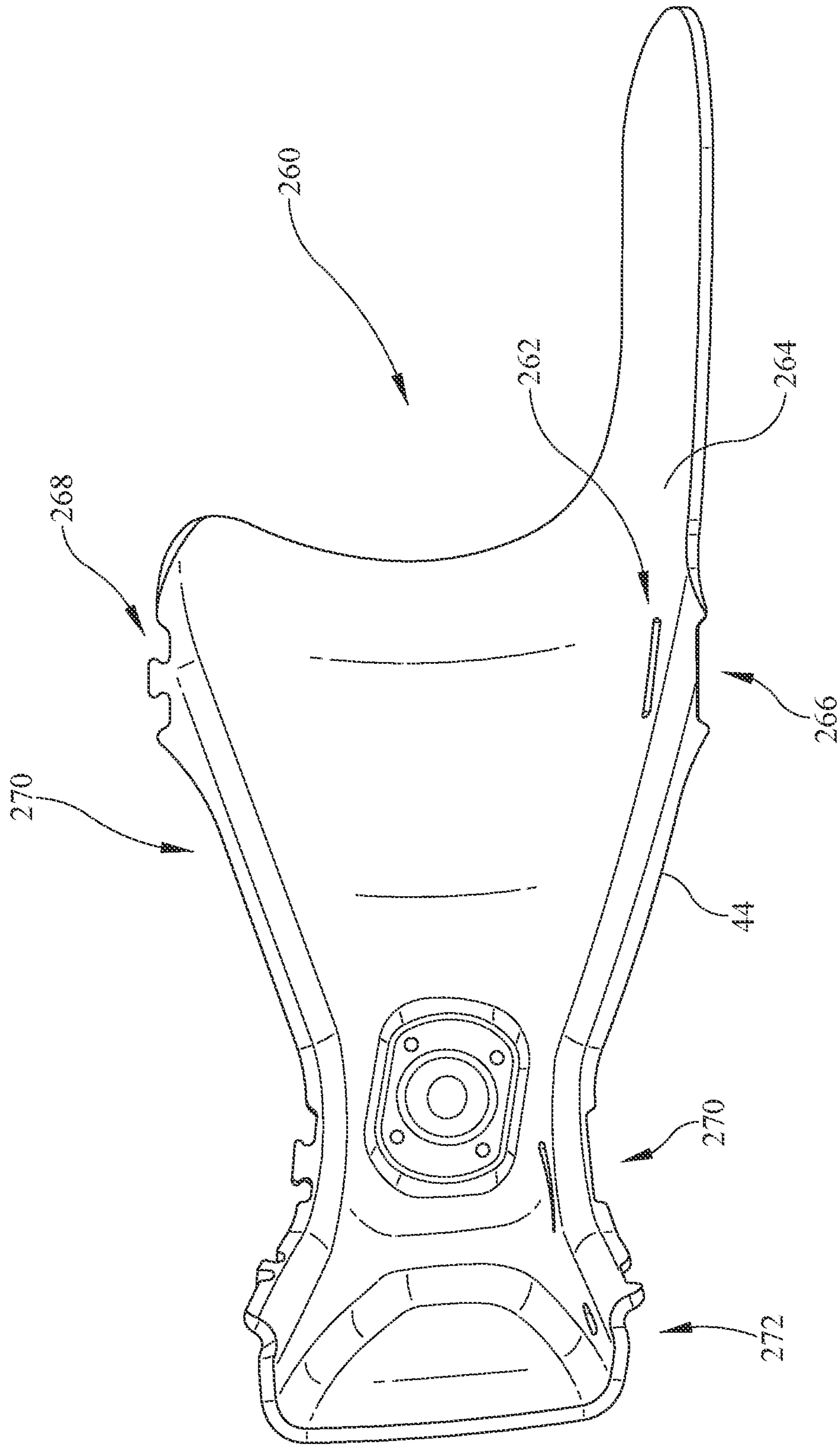
FIG. 33 is top plan view of a limb rest with elements formed in the limb rest to secure straps.

Referring now to FIG. 33, a shell 260 is shown. Shell 260 is similar to shell 136 discussed above, however shell 260 includes features formed in the respective flanges 44, 144 that are configured to help guide and retain both a pad, similar to pad 242, or to guide straps, similar to strap 220. For example, an aperture 262 is formed in a wall 264 of shell 260 adjacent a notch 266 that is formed in the flange 44. A protrusion 268 is formed on the inboard side 270 of the shell 260. The protrusion 268 is T-shaped and configured to receive a free end of the strap similar to that shown in FIG. 18. One side of the strap can be fixed at the aperture 262 and notch 266, with the free end being draped over a patient's limb positioned in the shell 260 and secured at protrusion 268. Similar structures are positioned at the heel region 270 and toe region 272 as shown in FIG. 33.

Figure 34:
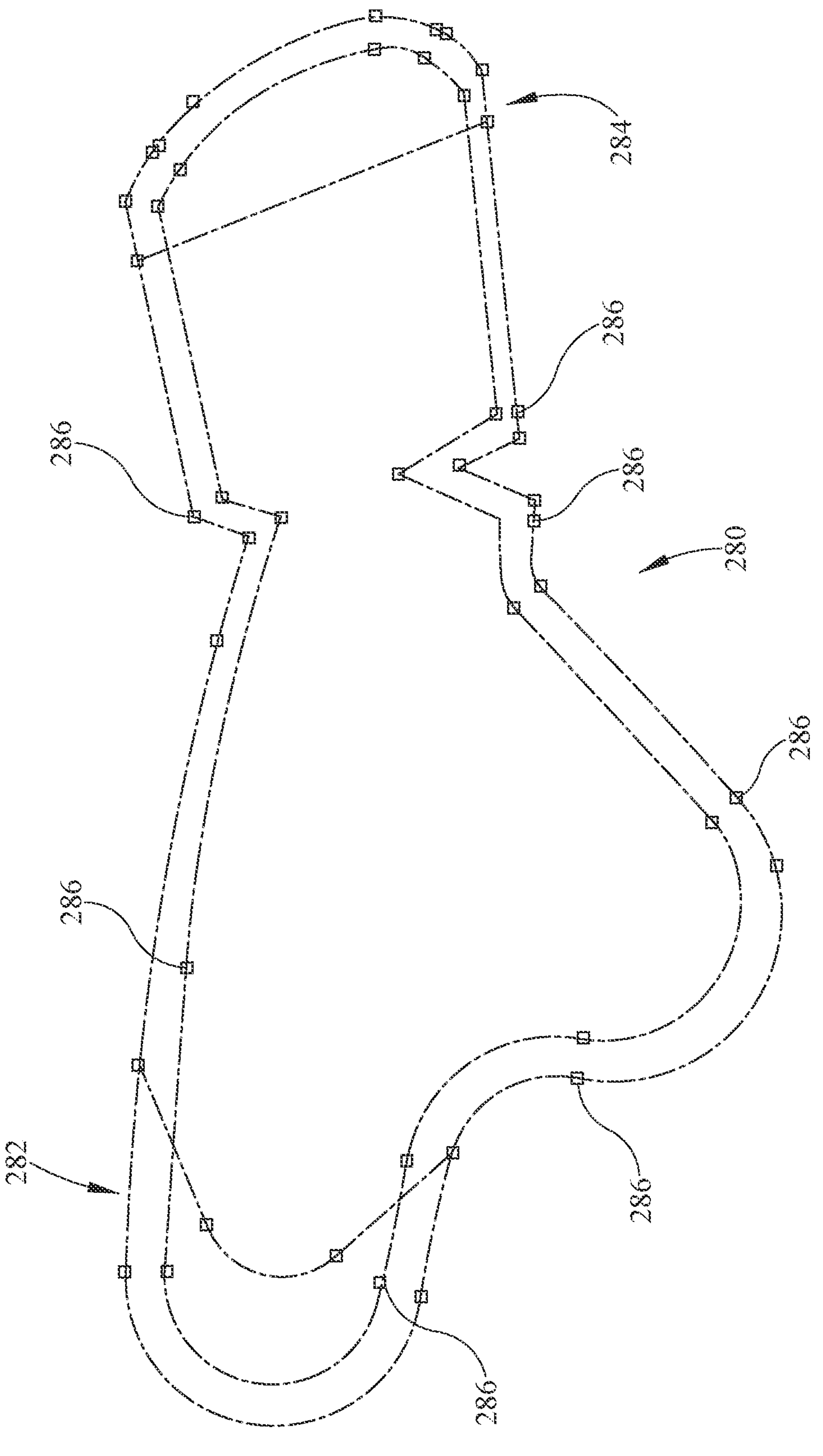
FIG. 34 is an embodiment of a pad for a limb rest, the pad including features that allow the pad to be secured to the limb rest by removable fasteners.
Figure 35:
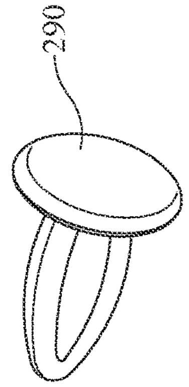
FIGS. 35-44 show various embodiments of removable fasteners for securing a pad to a limb rest.
Figure 36:
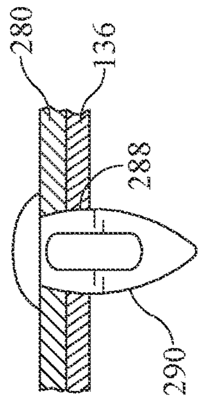
Figure 37:
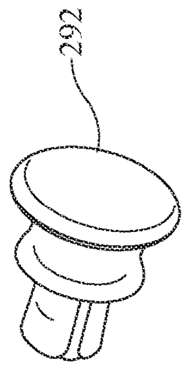
Figure 38:
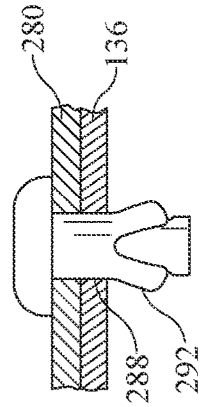
Figure 39:
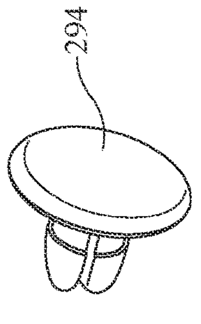
Figure 40:
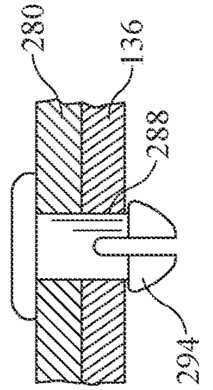
Figure 41:
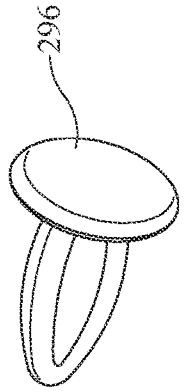
Figure 42:
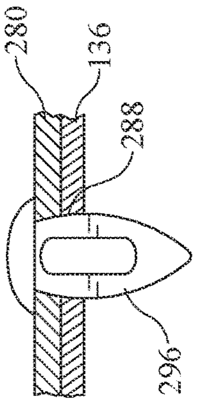
Figure 43:
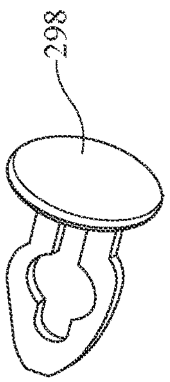
Figure 44:
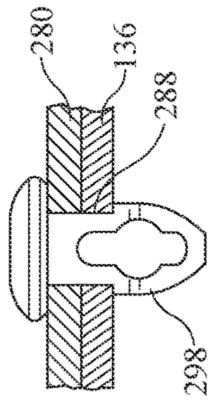

Referring now to FIG. 34, a blank for a pad 280 is shown to include a pocket 282 position two overlie a calf supporting portion of a shell, such as shell 136. Another pocket 284 is positioned to overlie the toe portion of a shell, such as shell 136. In addition to securing the pad 280 with the pockets 282, 284, the pad may be further secured in some embodiments by a plurality of removable rivets. The locations 286 noted on the pad 280 provide potential connecting points for the removable rivets. When the rivets are used, corresponding holes 288 are formed in the shell 136. The rivets are then secured through the pad 280 and the shell 136. Various embodiments of rivets are shown in the FIGS. 35-44. Several embodiments of rivets 290, 292, 294, 296, 298 are shown in the FIGS. 35-44.

Figure 45:
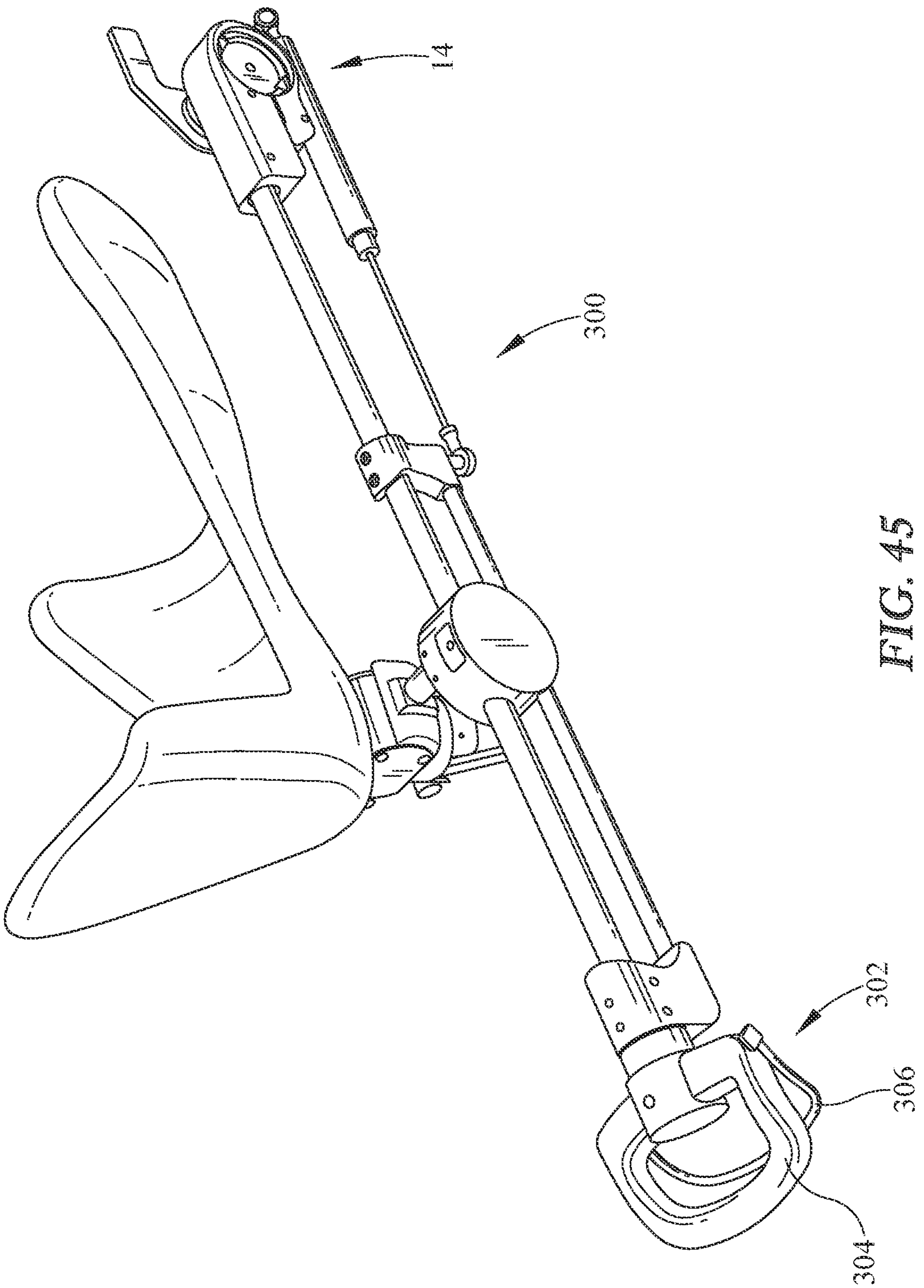
FIG. 45 is a perspective view of another embodiment of limb support having a different release handle from the embodiment of FIG. 1.
Figure 46:
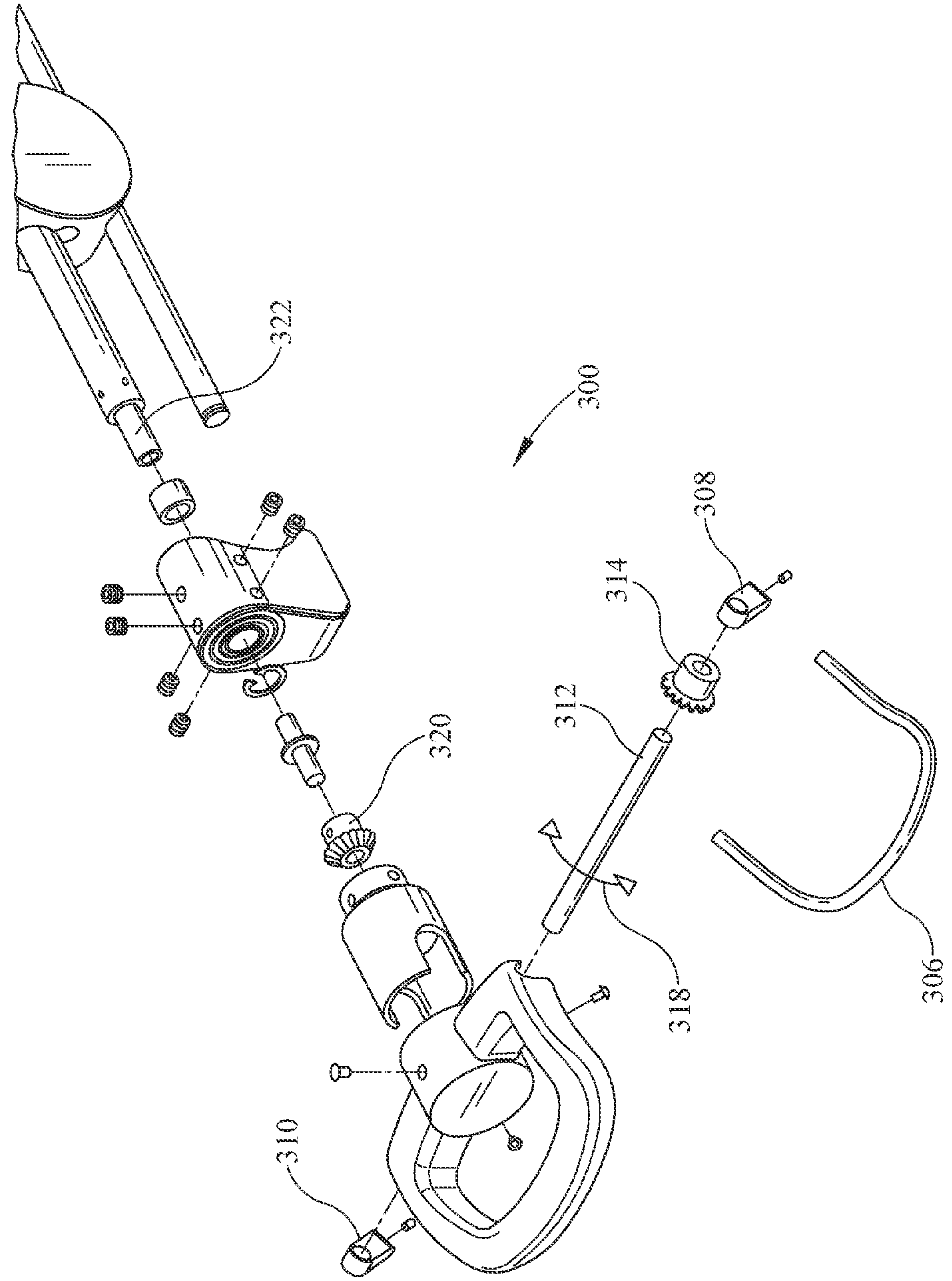
FIG. 46 is an exploded assembly view of the release handle embodiment of FIG. 45.

Referring now to FIG. 45, another embodiment of a handle 302 for releasing the multi-axis coupler 14 is shown to include a release trigger 306 and a grip 304. FIG. 46 shows that the release trigger 306 engages with a pair of couplers 308, 310 which are secured to a rod 312. A bevel gear 314 is supported on the rod 312 such that rotation of the rod 312 as indicated by arrow 318 causes the bevel gear 314 to rotate. The rod 312 has a D-shape which is received in a through hole of the bevel gear 314 to transfer rotation from the rod 312 to the bevel gear 314. The bevel gear 314 acts on a bevel gear 320 which is secured to an actuation rod 322 so that the rotation of bevel gear three and 14 is transferred through bevel gear 320 the actuation rod 322 to thereby release the multi-axis coupler 14.

Figure 47:
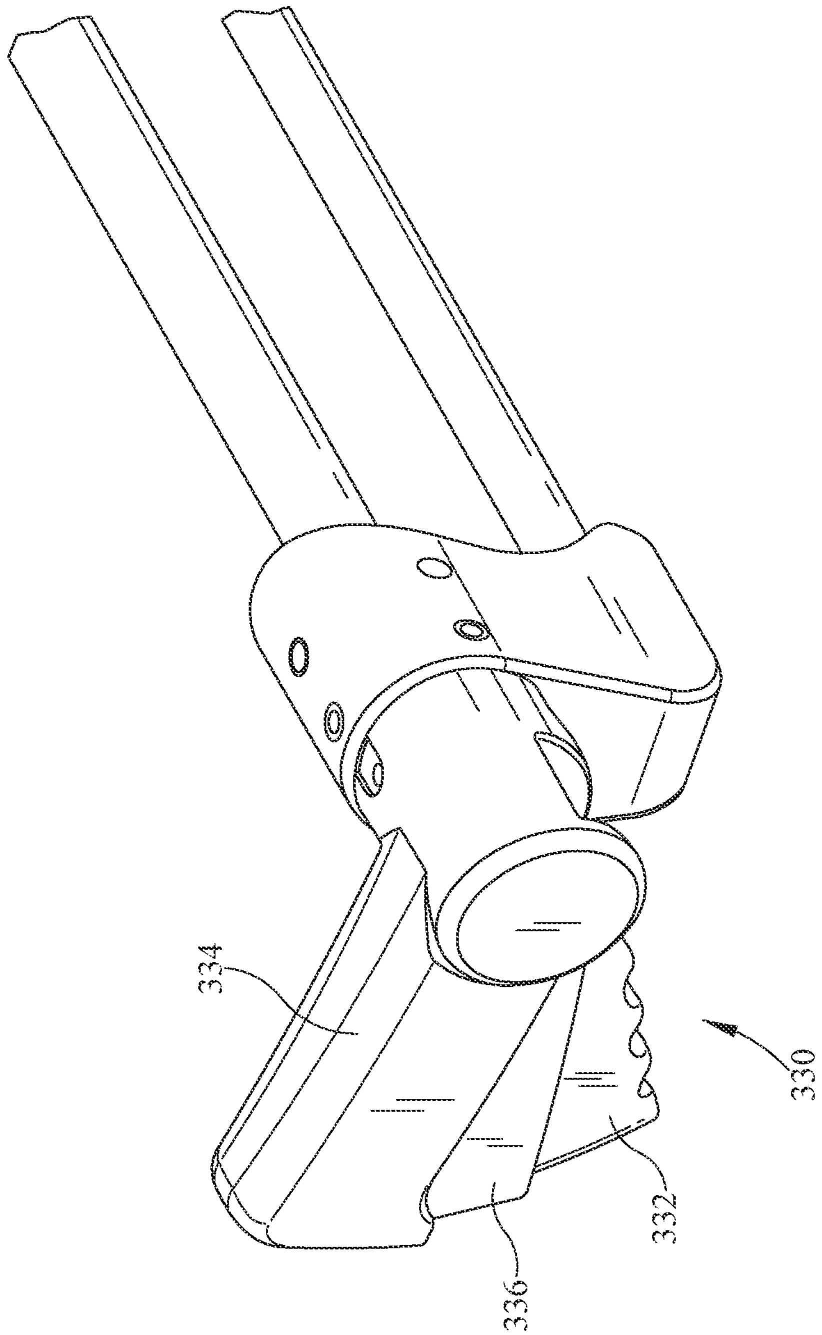
FIG. 47 is a perspective view of yet another embodiment of limb support having a different release handle from the embodiment of FIG. 1.
Figure 48:
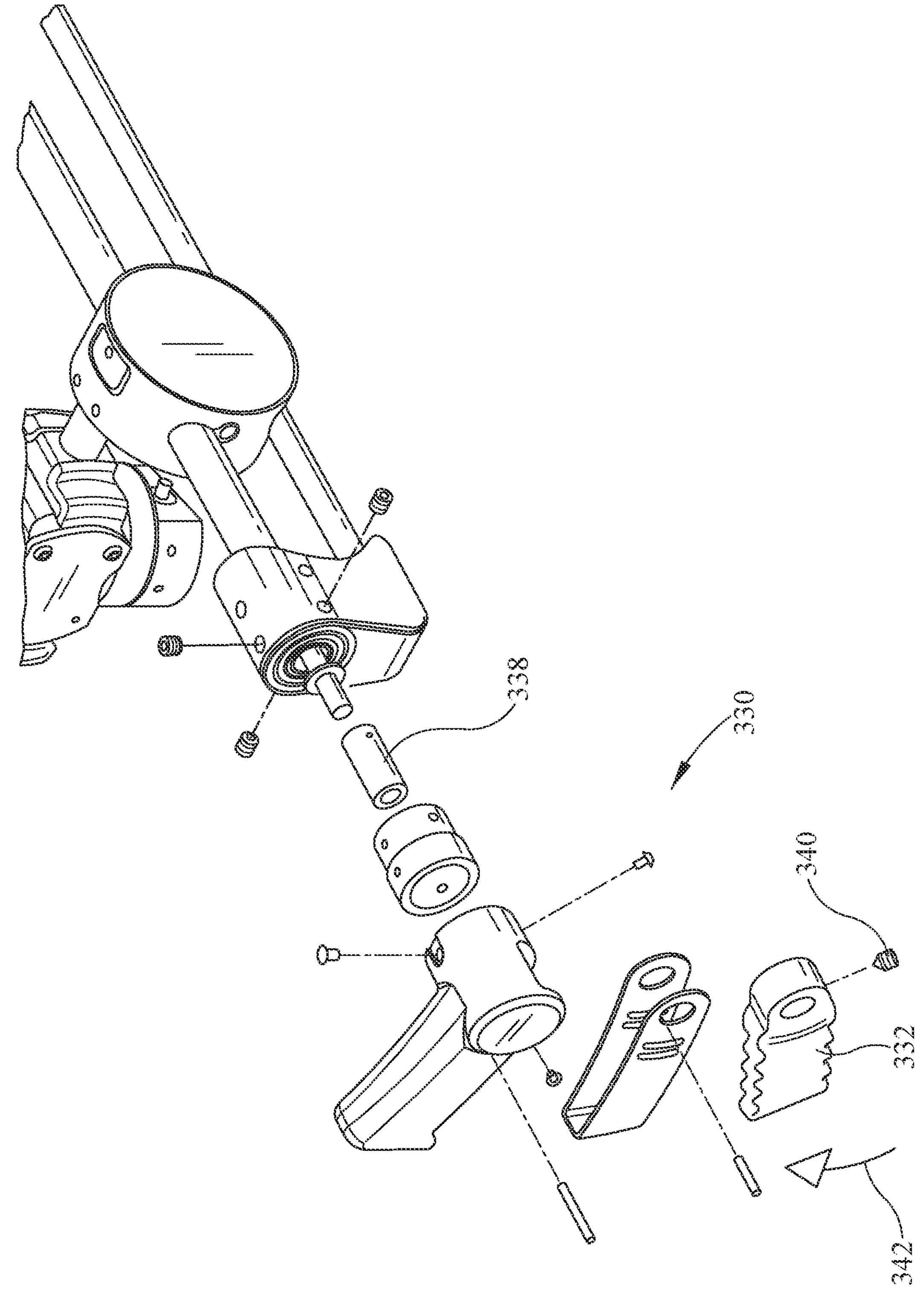
FIG. 48 is an exploded assembly view of the release handle embodiment of FIG. 47.

In yet another embodiment shown in FIG. 47, a handle 330 includes a release trigger 332 and a grip 334. A shield 336 is interposed between the release trigger 332 and the grip 334. As shown in FIG. 48, the release trigger 332 is secured to a couple or 338 by a set screw 340 so that rotation of the release trigger 332 in the direction of arrow 342, the multi-axis coupler 14 is released.

Figure 49:
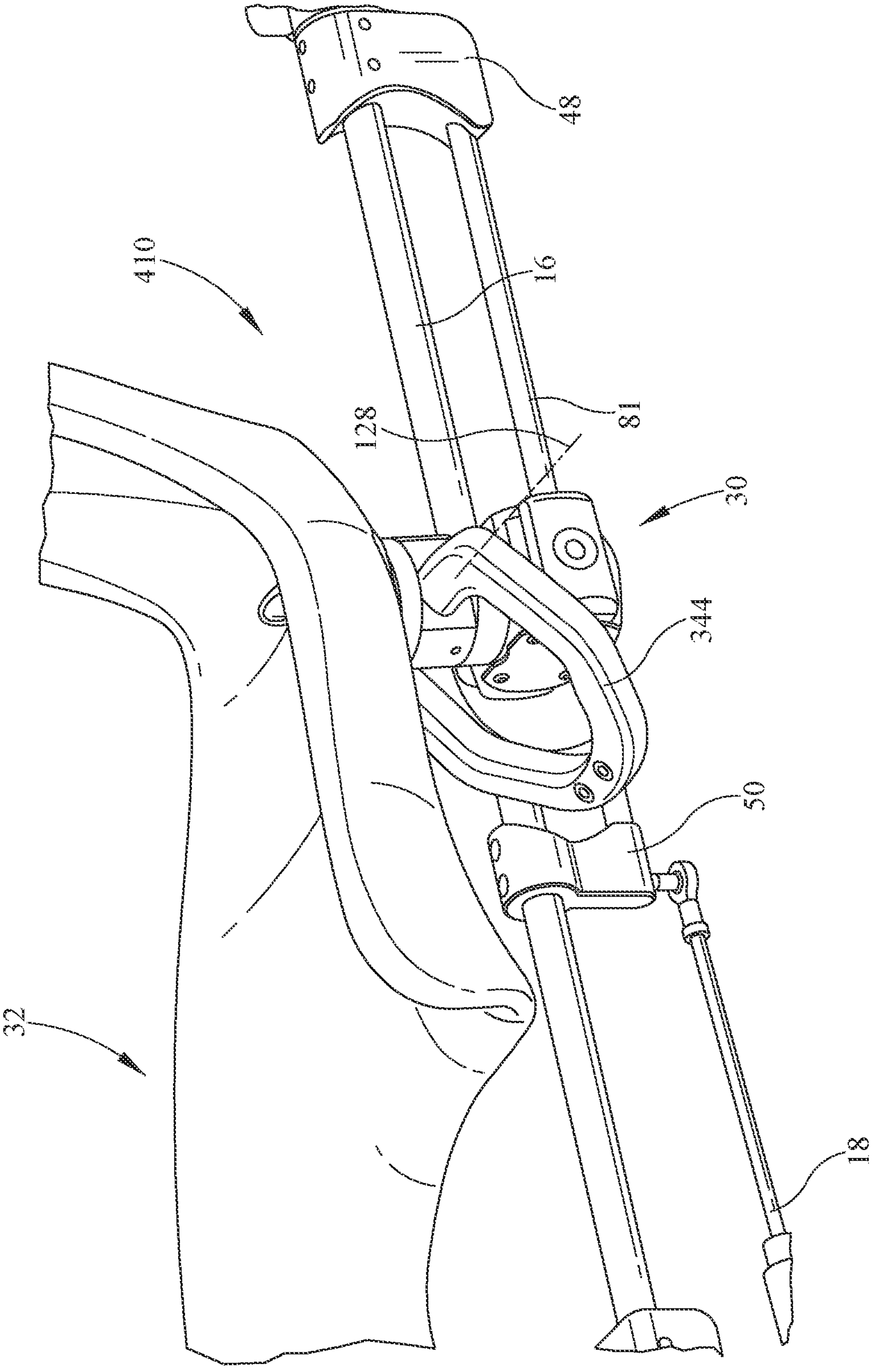
FIG. 49 is a perspective view of another embodiment of limb support having an embodiment of handle for coupler that is different from the embodiment of FIG. 1.
Figure 50:
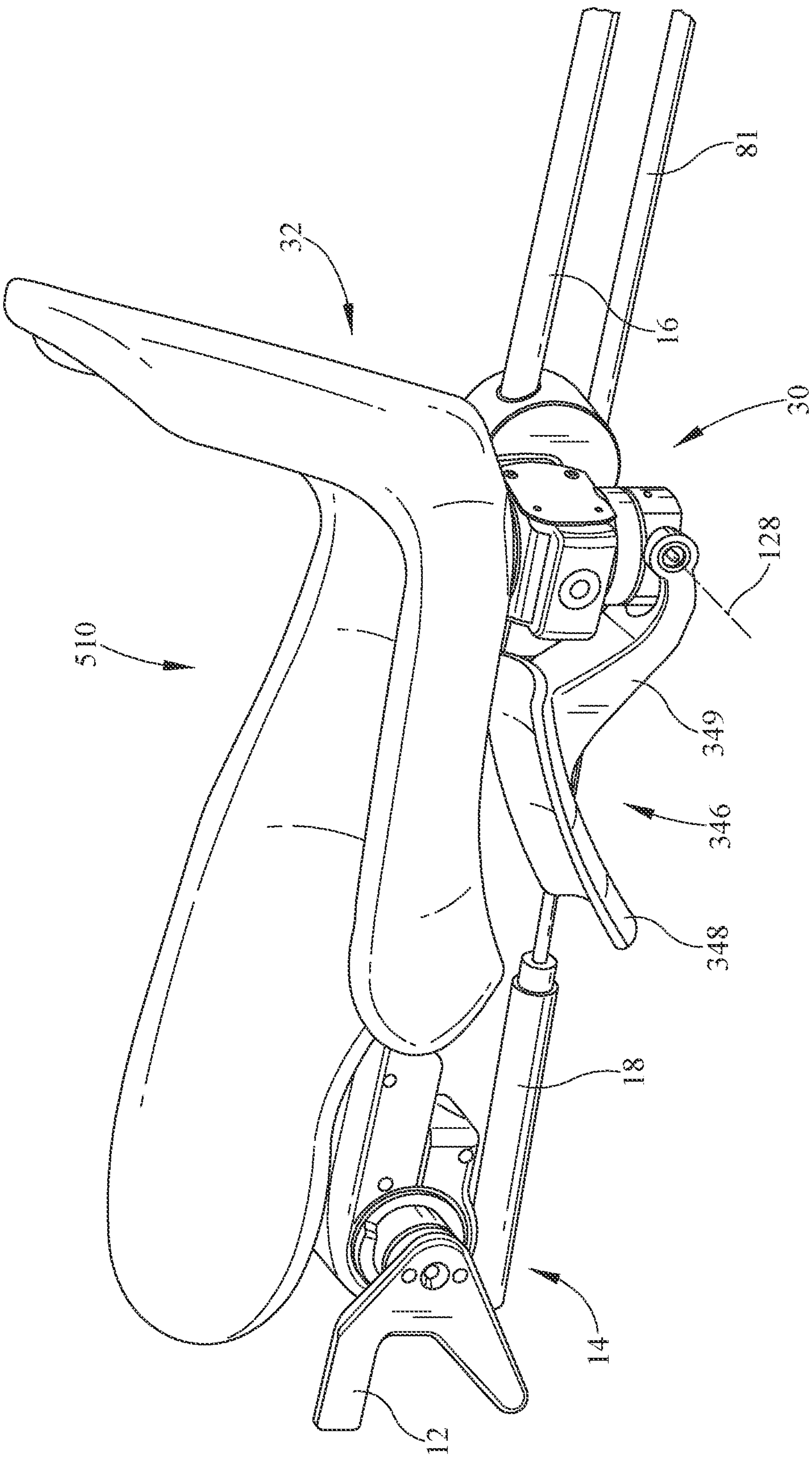
FIG. 50 is a perspective view of yet another embodiment of limb support having an embodiment of handle for coupler that is different from the embodiment of FIG. 1.
Figure 51:
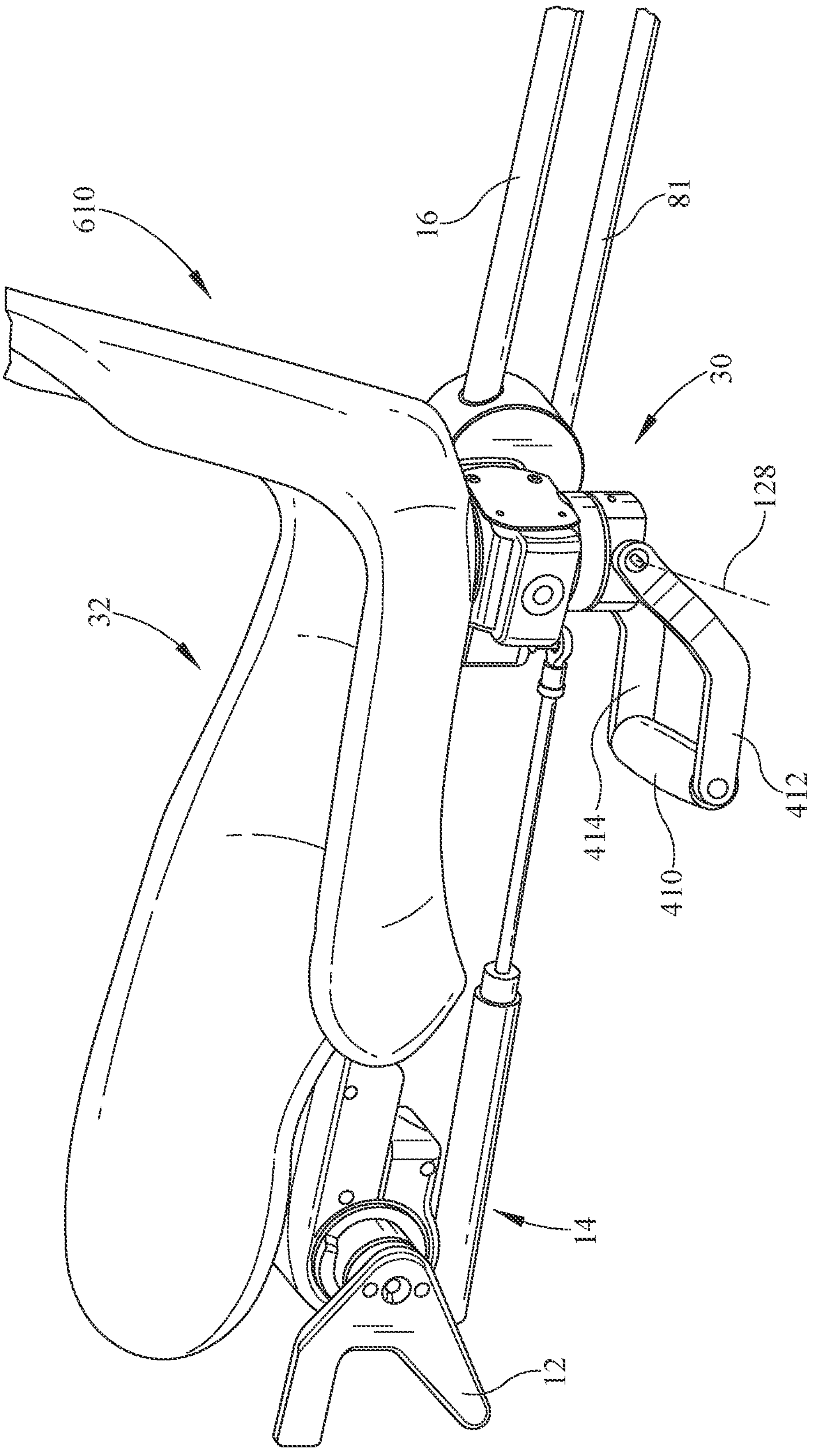
FIG. 51 is a perspective view of still yet another embodiment of limb support having an embodiment of handle for coupler that is different from the embodiment of FIG. 1.

FIGS. 49-51 illustrate various embodiments of release handles that may be used with a release, such as the release 36 of the embodiment of FIG. 1. FIG. 49 shows a limb support 410 that has a handle 344 that connects to both ends of a cam shaft, such as cam shaft 124. FIG. 50 shows an alternative arrangement of a limb support 510 where the coupler 30 is reversed and a handle assembly 346 includes a grip 348 secured to a lever arm 349. The lever arm 349 is attached to a cam shaft, such as cam shaft 124 and the grip 348 is positioned so that a user may place their thumb or palm on the shell of the limb rest 32 and their fingers on the grip 348 to use the shell as leverage in causing rotation of the cam shaft. FIG. 51 shows an arrangement of limb support 610 similar to the arrangement of FIG. 50, however the cam shaft is actuated by a handle 410 that is supported on two lever arms 412, 414 that each engage the cam shaft.

Figure 53:
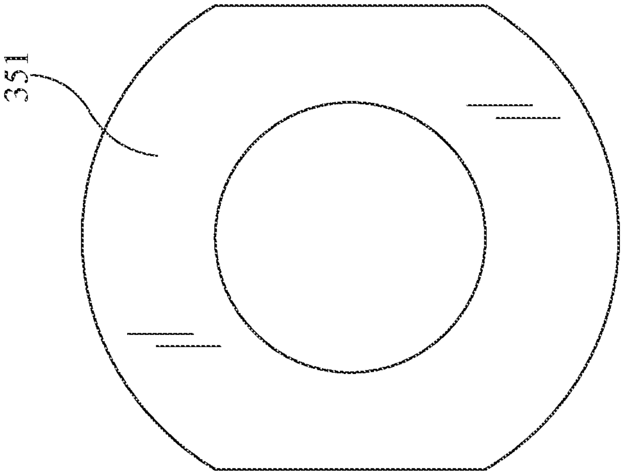
FIG. 53 is a cross-sectional view of yet another embodiment of spar for resisting rotation of the limb rest about the spar.
Figure 52:
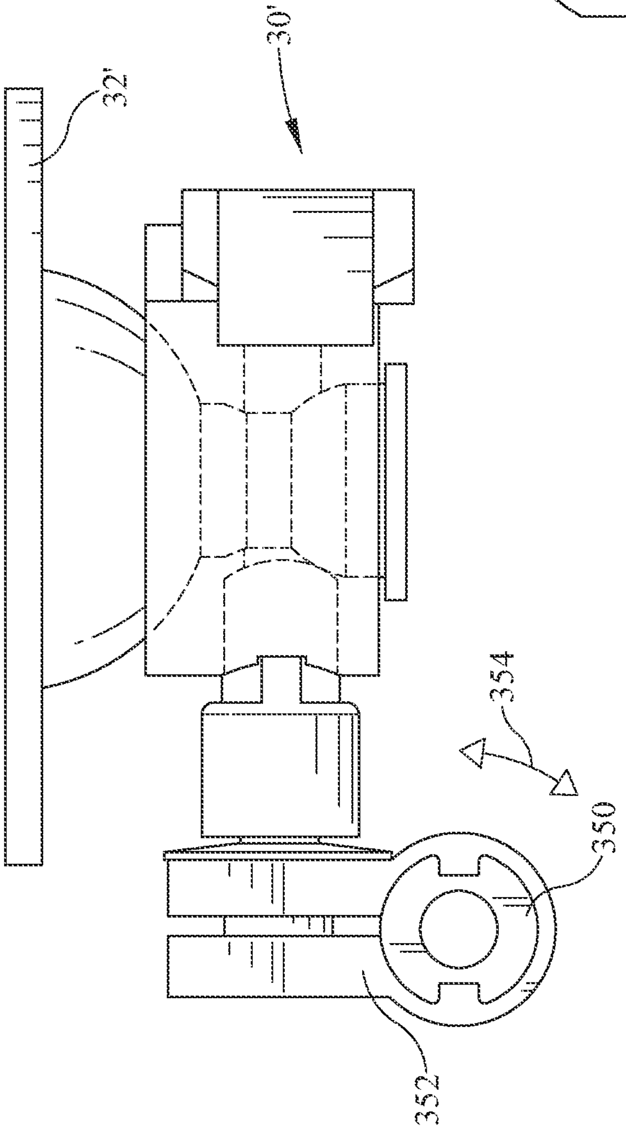
FIG. 52 is cross-sectional diagrammatic view of an embodiment of a spar for a limb support, the spar configured to resist rotation of the limb rest about the spar.

FIGS. 52 and 53 illustrate two embodiments of a non-round cross-section of a spar. The spar 350 shown in FIG. 52 provides for movement of a carriage 352, similar to carriage 80 to move, without the support of the lower rail 81 of the embodiment of FIG. 8. Thus, the spar 350 prevents the carriage 352 from rotating about the spar 350 in the direction of arrow 354. FIG. 53 also shows a non-round cross-section of a spar 351 that would be suitable for use to eliminate the need for the lower rail 81.

Figure 55:
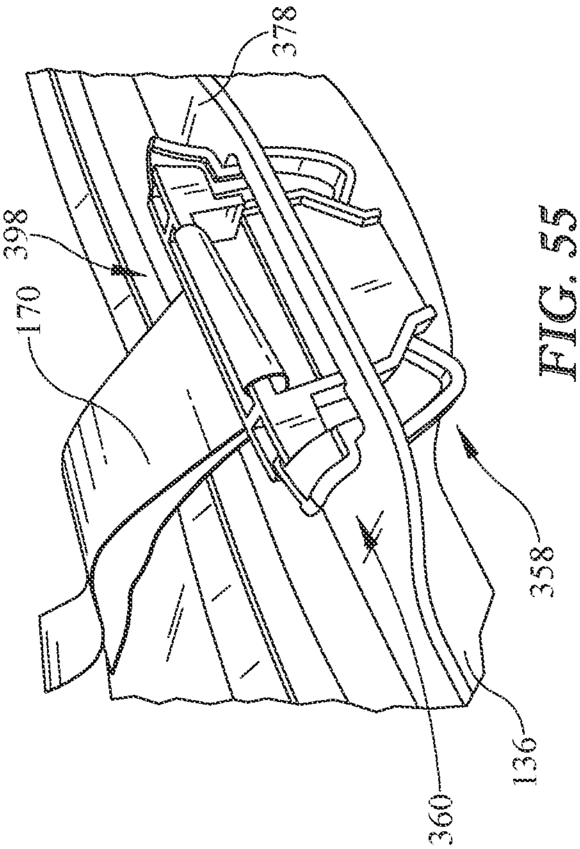
FIG. 55 is an enlarged view of a portion of the limb rest embodiment of FIG. 54 with a pad and a restraint positioned to secure a limb of a patient.
Figure 54:
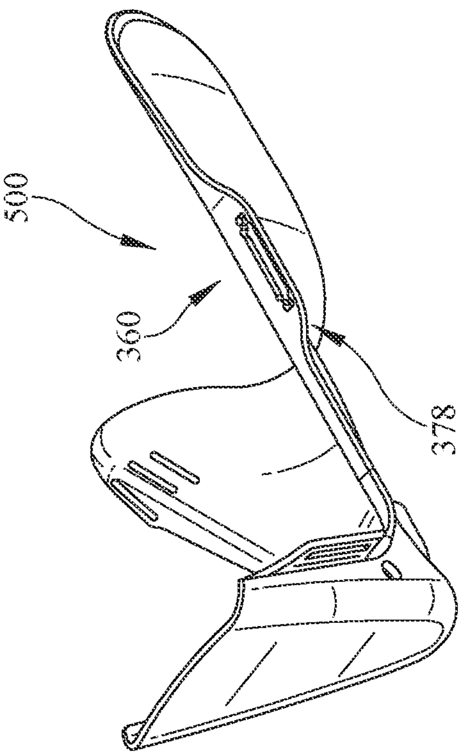
FIG. 54 is a perspective view of yet an embodiment of a limb rest that includes a receiver for securing buckle attached to a free end of a strap which forms a restraint to secure the strap in engagement with a patient's limb.
Figure 56:
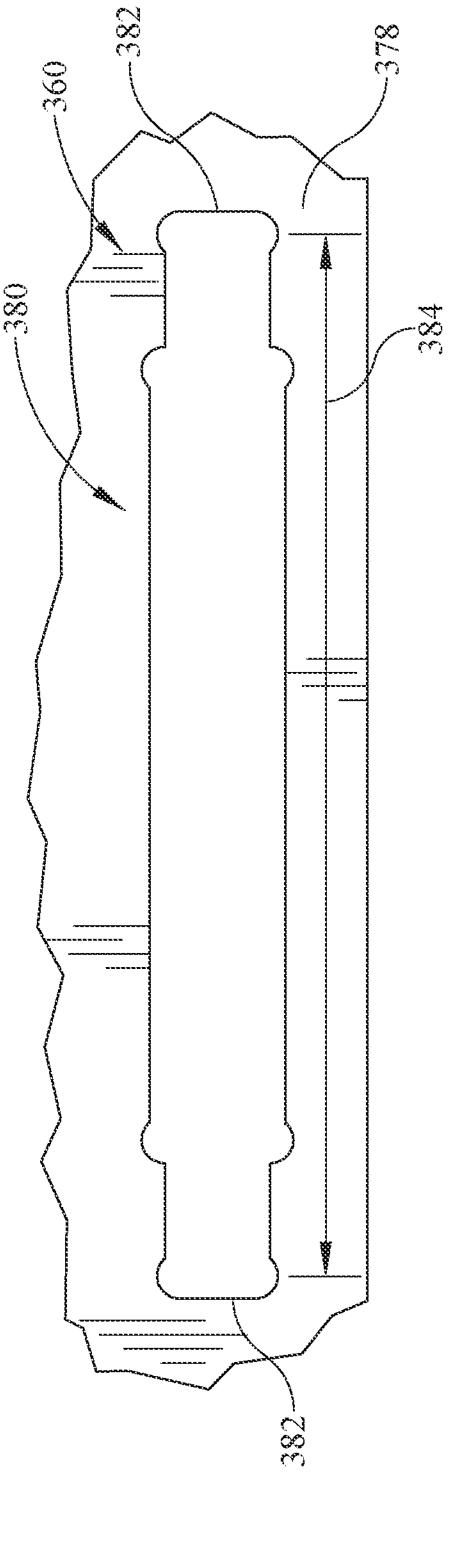
FIG. 56 is a top plan view of the receiver of the limb rest of FIG. 54.
Figure 57:
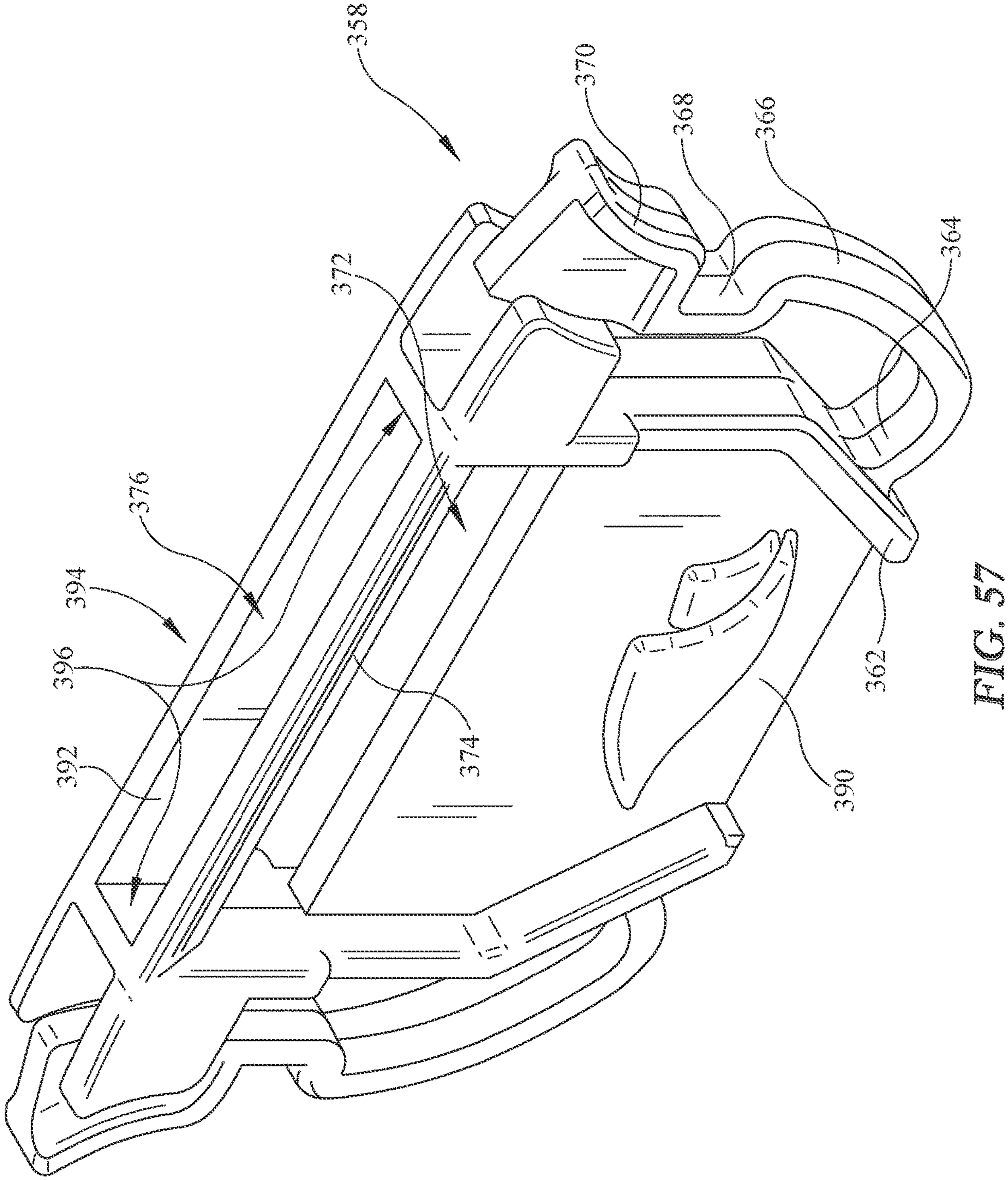
FIG. 57 is a perspective view of buckle of the restraint of FIG. 55.

Another embodiment of a coupler arrangement for securing the strap 170 to a shell 500 is shown in FIGS. 54-55. The strap 170 forms a tension lock 398 with a buckle 358, where the buckle 358 is inserted into a receiver 360 formed in the flange 378 on the inboard side of the shell 136. The buckle 358 includes resiliently pliable, curved arms 366 which are coupled to the frame 362 of the buckle 358 by a base 364 as shown in FIG. 57. The free end of each arm 366 includes a clasp 368, which engages a catch 382 in the receiver 360 to secure the buckle in the receiver 360, and a grip 370, which is deformable by a user to deflect the arm 366 towards the frame 362 of the buckle 358 to disengage the clasp 368 from the catch 382 in order to remove the buckle 358 from the receiver 360. The arms 366 are biased to urge the clasp 368 away from the frame 362 in order to engage the catch 382 with the receiver 360 when the buckle is inserted into the slot 380 of the receiver 360. The receiver 360 formed in the flange 378 on the side of the shell 136 as shown in FIG. 54.

Figure 58:
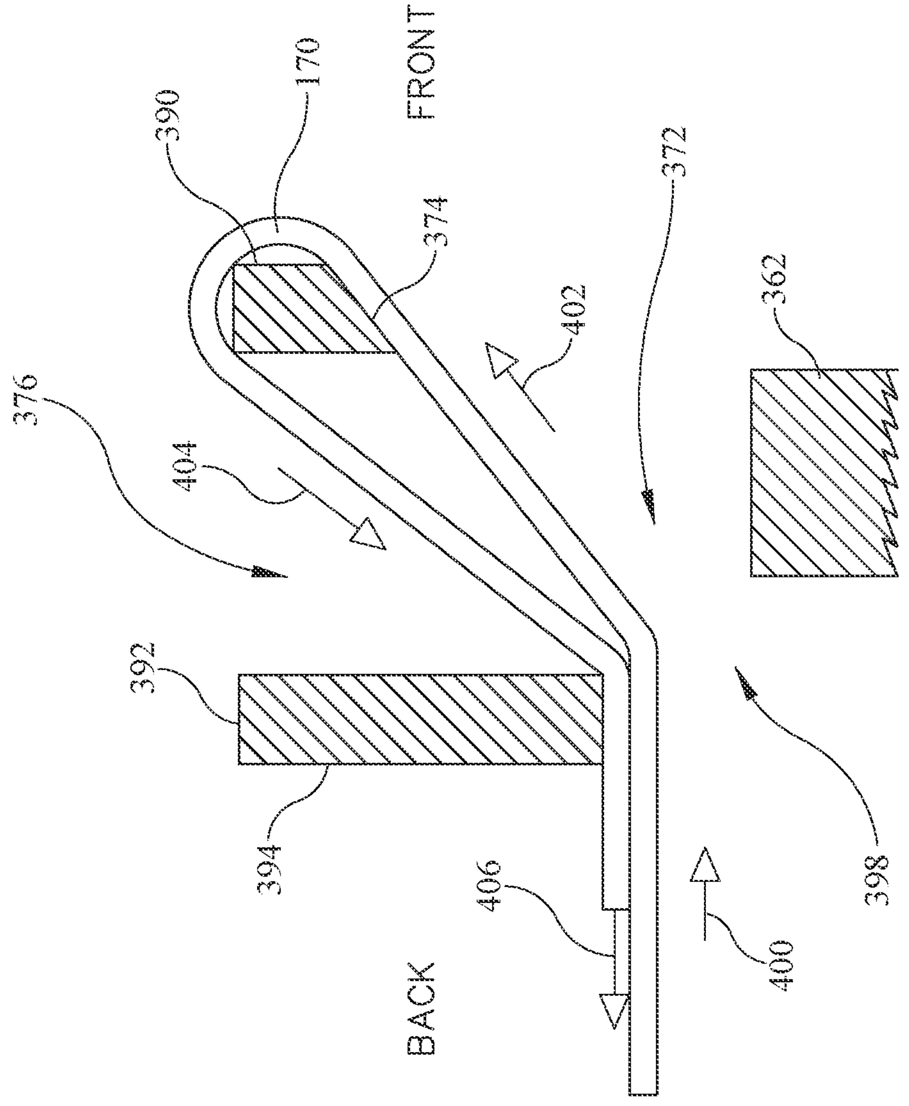
FIG. 58 is a cross-sectional view of a tension lock of the buckle of FIG. 55.

A cross-section of the upper portion of the buckle 358 is shown in FIG. 58 illustrates the strap 170 forming the tension lock 398 with the buckle 358. The tension lock 398 is formed by three features of the buckle 358: a slot 372, an angled surface 374, and a slot 376. The slot 372 is formed by distal sides 396 of the frame 362 so that the slot 372 communicates between a front surface 390 of the buckle 358 and a back surface 394 of the buckle 358. The angled surface 374 forms an acute, downward angle with the front surface 390 of the buckle. The slot 376 is formed by the distal sides 396 of a top surface 392 of the buckle 358 so that the slot 376 communicates between the top surface 392 of the buckle 358 and the slot 372. To form the tension lock 398, the strap 170 is inserted into the slot 372 from the back surface 394 of the buckle 358 and routed through to the front surface 390 of the buckle 358, as indicated by arrow 400. The strap 170 is then routed up and around the angled surface 374, as indicated by arrow 402, and down through the slot 376 from the top surface 392 of the buckle 358 and back into the slot 372, as indicated by arrow 404. The strap 170 is further routed out from the back surface 394 of the buckle 358 through the slot 372, as indicated by arrow 406. Tension on the free end of the strap 170, as indicated by arrow 406, will tighten the strap 170, and the angled surface 374 will maintain the tension lock 398.

Figure 60:
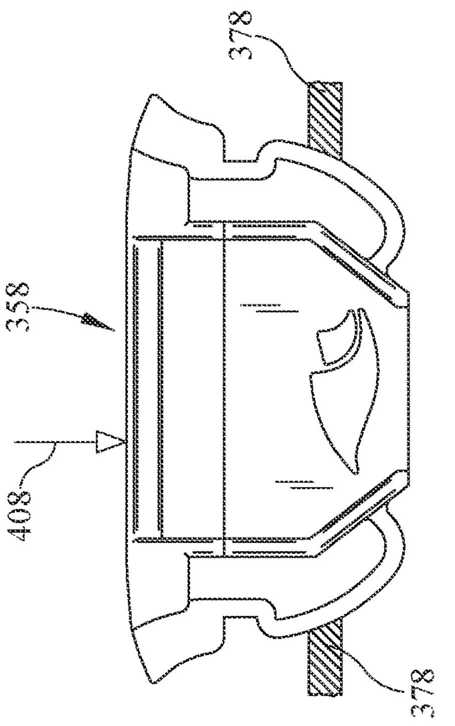
FIG. 60 cross-sectional view of the restraint of FIG. 55 showing a buckle of the restraint of FIG. 55 partially inserted into the receiver of the shell of FIG. 54.
Figure 59:
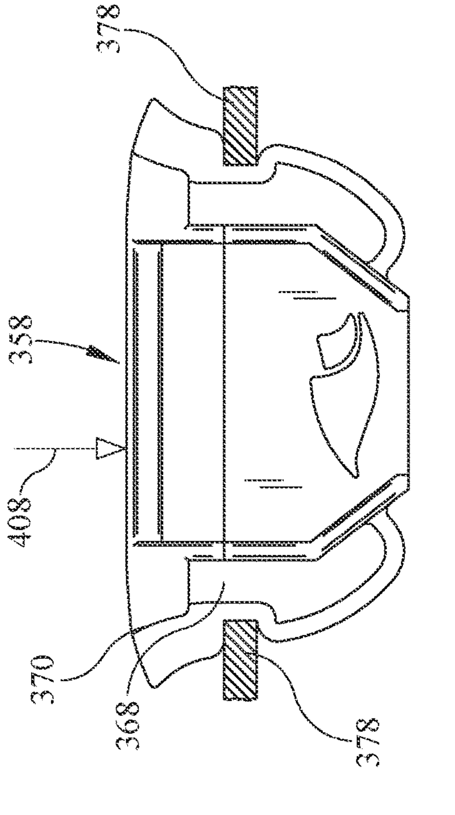
FIG. 59 is a cross-sectional view of the restraint of FIG. 55 showing a buckle of the restraint of FIG. 55 secured to the receiver of the shell of FIG. 54.
Figure 61:
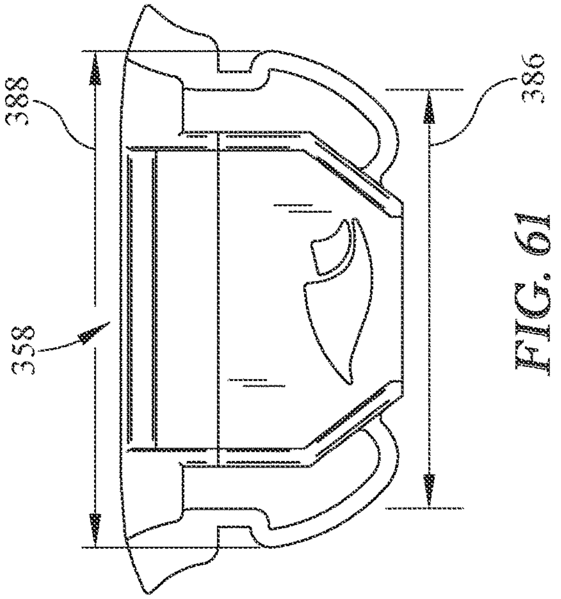
FIG. 61 is a plan view of the buckle of the restraint of FIG. 54 in a free state.

When the buckle 358 is not engaging the receiver 360, the buckle 358 is in a free position, as shown in FIG. 61. The buckle 358 has a bottom width 386 that is smaller than a middle width 388. The receiver 360 has a width 384 that is greater than the bottom width 386 of the buckle 358, but smaller than the middle width 388 of the buckle 358. When a user applies a downward force, as indicated by arrow 408, on the buckle 358, the buckle 358 will remain in a free position in the receiver 360, as a result of the bottom width 386 of the buckle 358 being smaller than the width 384 of the receiver 360, until the arms 366 of the buckle 358 make contact with the flange 378, as a result of the middle width 388 of the buckle 358 being larger than the width 384 of the receiver 360, causing the arms 366 to deform and putting the buckle 358 in a deflected position, as shown in FIG. 60. As the user continues to apply a downward force, indicated by arrow 408, on the buckle 358 into the receiver 360, the deflected arms 366 slide past the flange 378 and the clasp 368 engages with the flange 378 to secure the buckle 358 in place, resulting in an engaged position as shown in FIG. 59. To disengage the clasps 368 from the flange 378 in order to remove the buckle 358 from the receiver 360, the grips 370 of the arms 366 are squeezed by the user to bring the arms 366 closer to the frame 362 of the buckle 358. This puts the buckle 358 in a deflected position, causing its middle width 388 to be smaller than the width of the receiver 360, allowing the buckle 358 to be routed up and out of the receiver 360.

Figure 63:
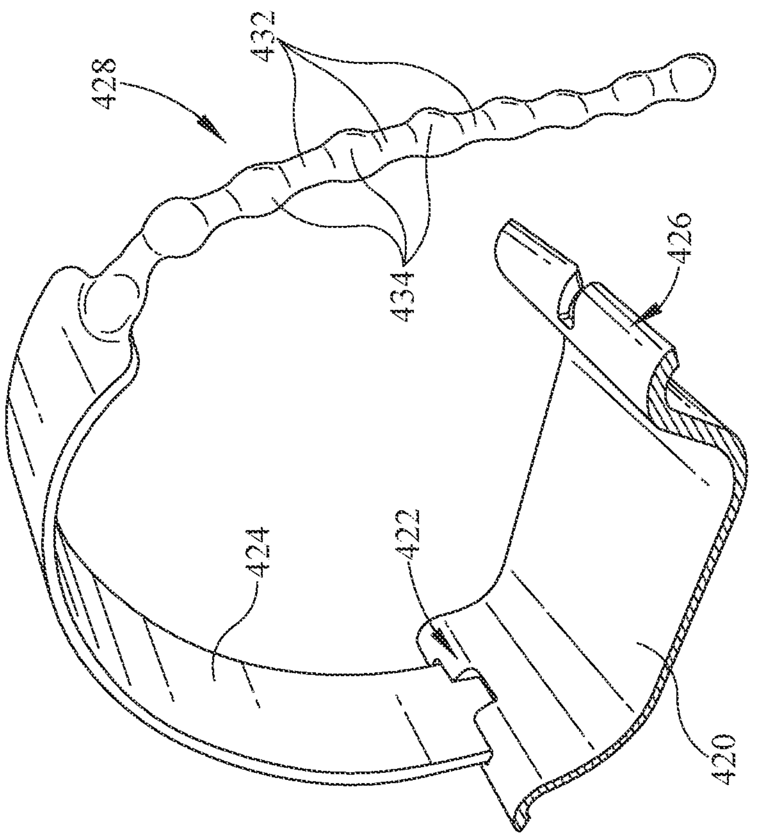
FIG. 63 is a perspective view similar to FIG. 62 with the restraint released.
Figure 62:
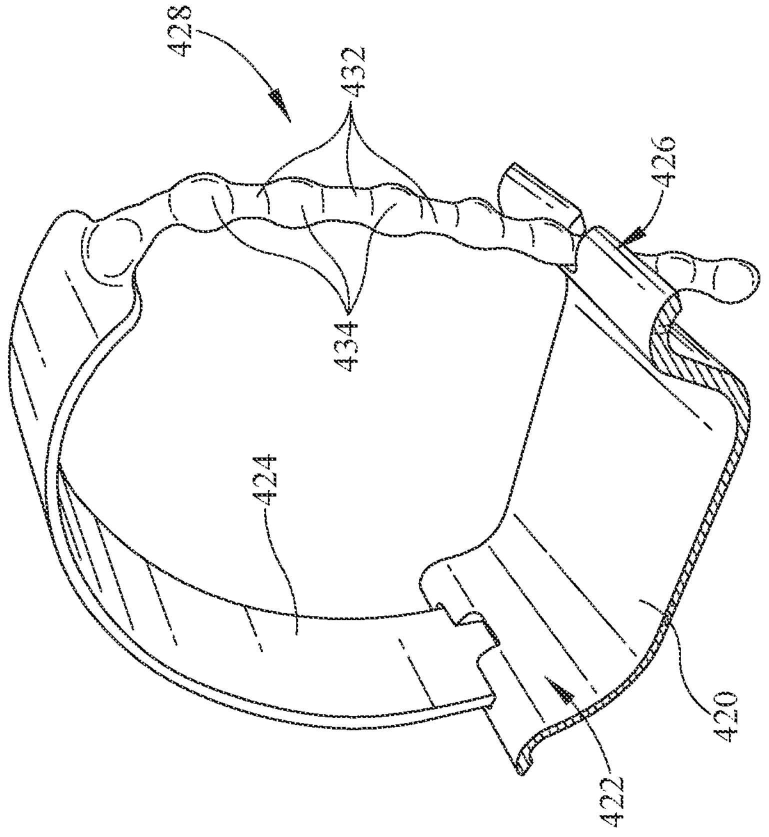
FIG. 62 is a perspective view of a portion of a limb rest that includes another embodiment of adjustable restraint, the restraint engaged with the limb rest to secure a patient's limb.

Referring now to FIGS. 62 and 63, another embodiment of strap/restraint that includes a main portion 424 that engages a slot 422 of a shell 420. A locking portion 428 includes alternating portions of depressions 432 and bulbous protuberances 434. The depressions 432 are configured to be received in a slot 426 formed in the shell 420 and the bulbous protuberances 434 engage with the shell 420 to secure the restraint when it is engaged with a patient's limb. To release the restraint, a user needs to merely pull the locking portion 428 out of engagement with the slot 426.

Figure 65:
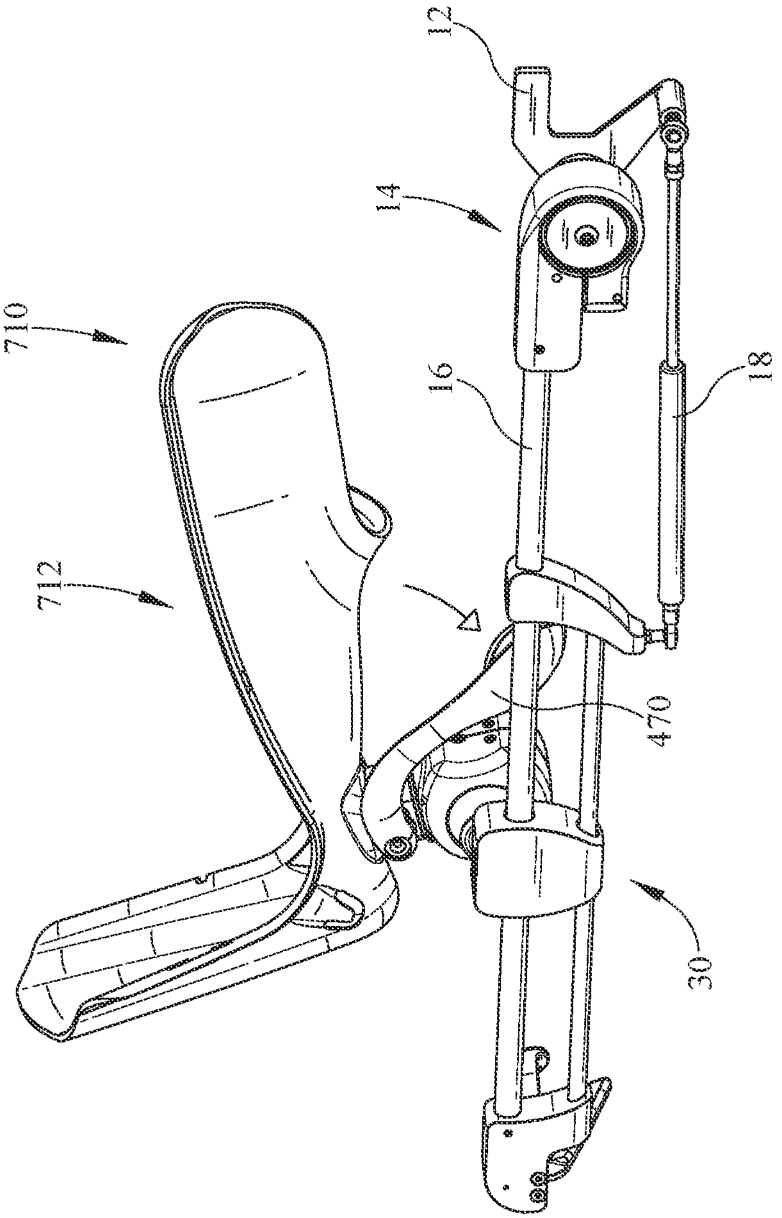
FIG. 65 is a perspective view of another embodiment of limb support having a limb rest that is configured to utilize the restraint of FIGS. 62 and 63, the limb support including another embodiment of a handle for the coupler, the handle in a positon that results in the coupler being locked.
Figure 67:
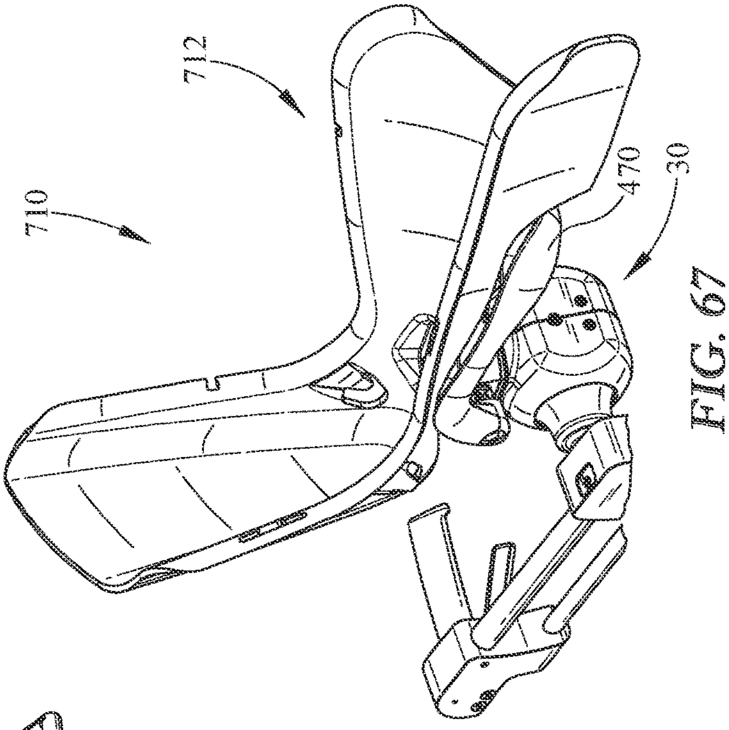
FIG. 67 is another perspective view of the limb support of FIG. 65.
Figure 66:
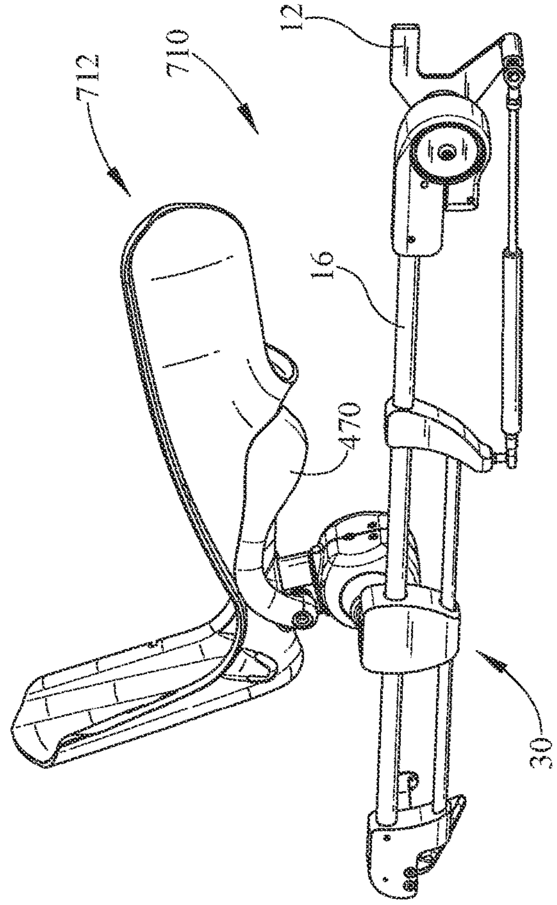
FIG. 66 is another perspective view of the limb support of FIG. 65, the handle of the coupler moved to a position to release the coupler.
Figure 68:
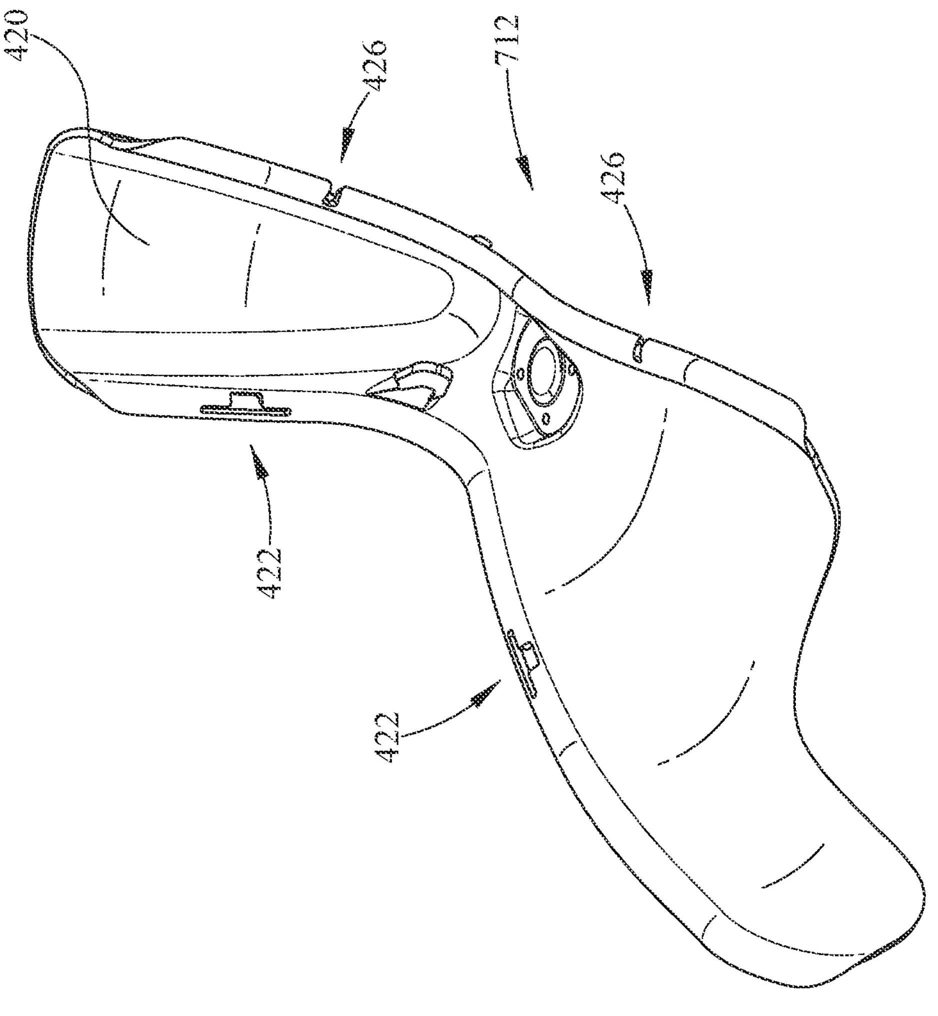
FIG. 68 is a perspective view of the limb rest of the limb support of FIGS. 65-67.
Figure 69:
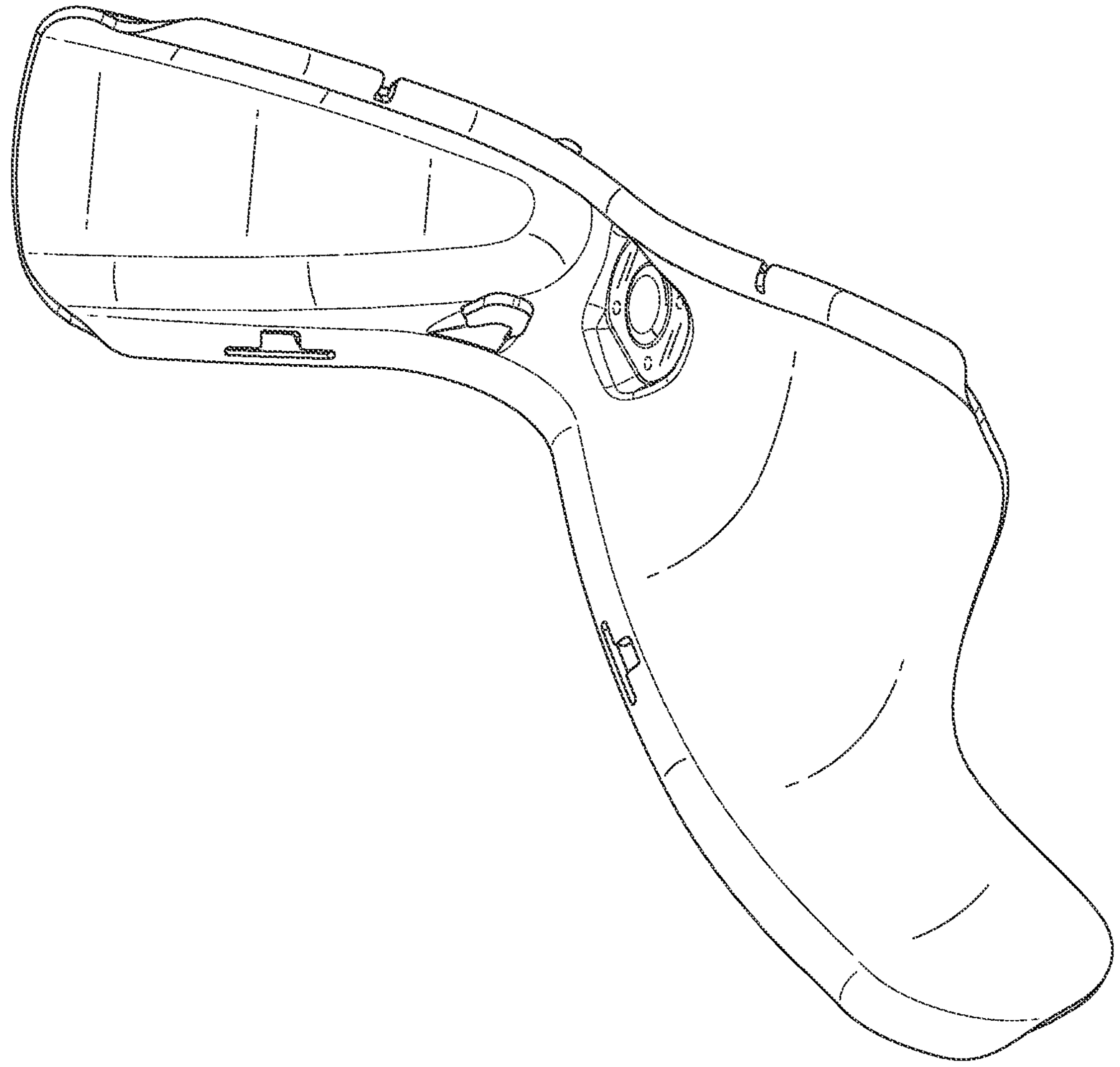
FIG. 69 is a top perspective view of a limb rest in accordance with the present design, as viewed from a top right corner thereof.
Figure 70:
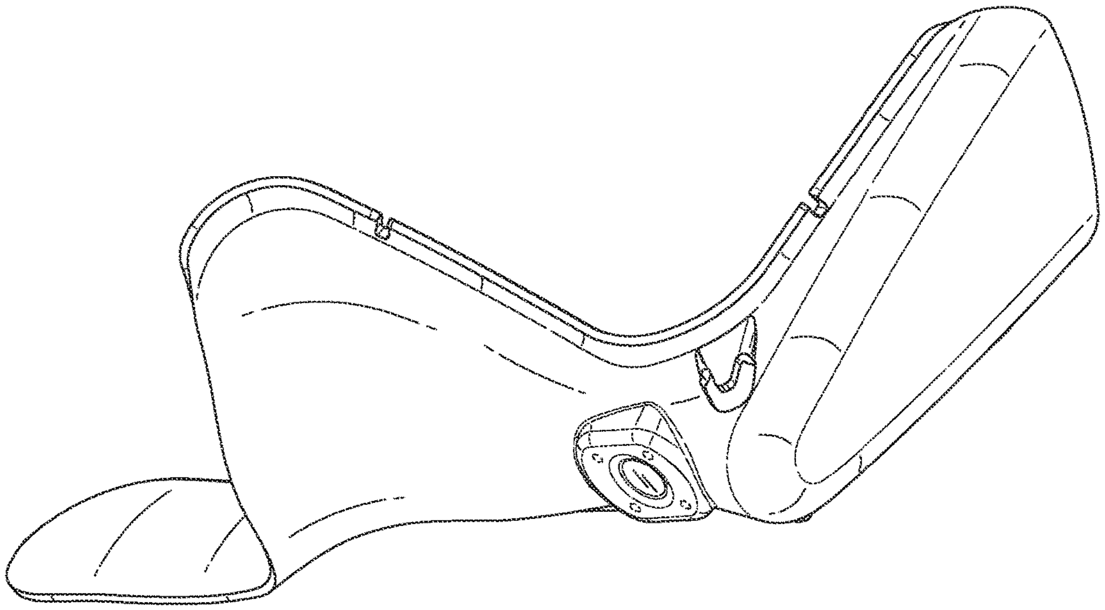
FIG. 70 is bottom perspective view of the limb rest of FIG. 69, as viewed from the bottom right corner thereof.
Figure 71:
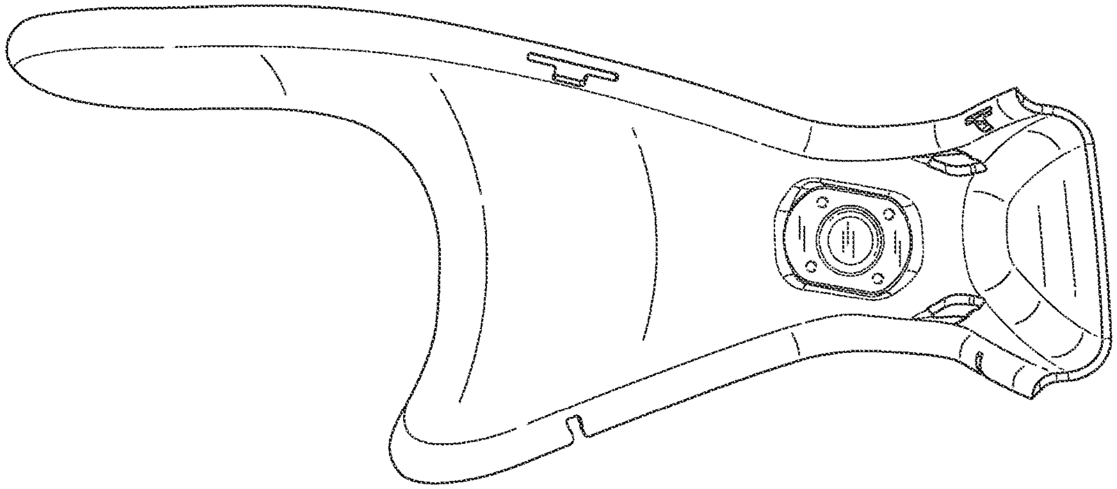
FIG. 71 is a top plan view of the limb rest of FIG. 69.
Figure 72:
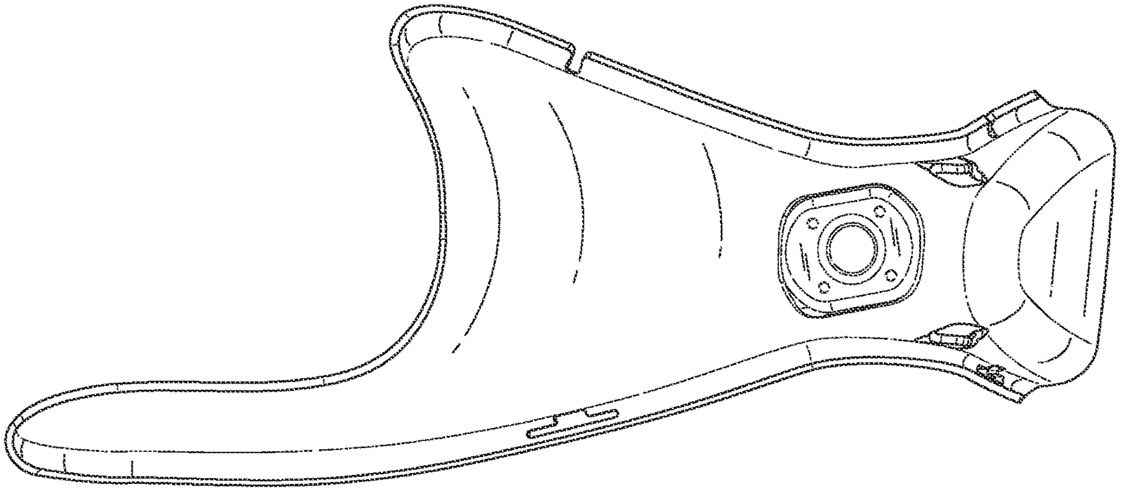
FIG. 72 is a bottom plan view of the limb rest of FIG. 69.
Figure 73:
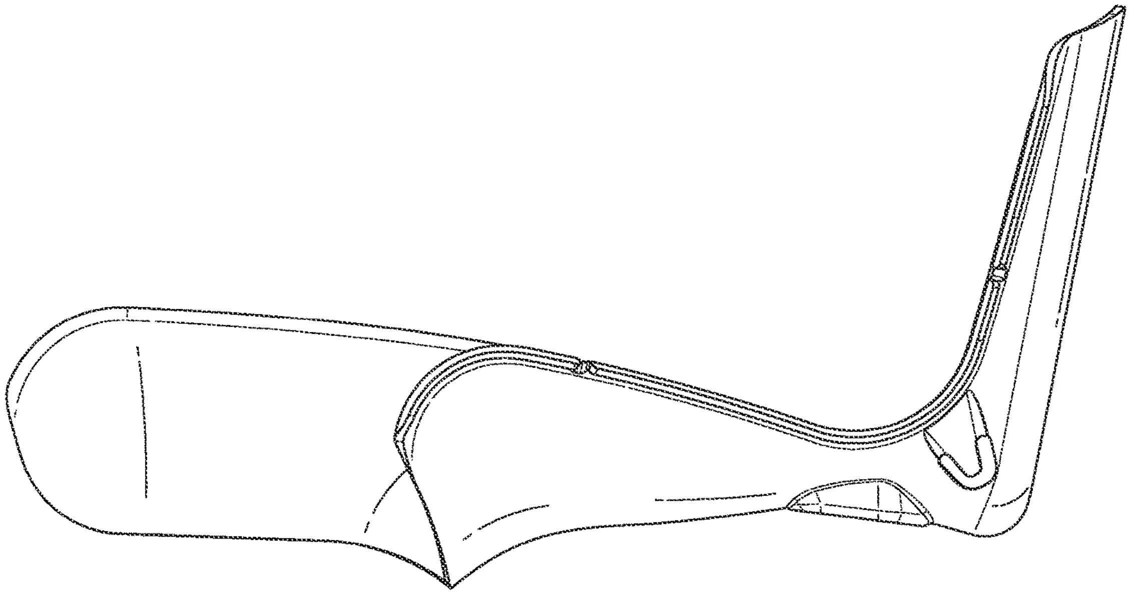
FIG. 73 is a right plan view of the limb rest of FIG. 69.
Figure 74:
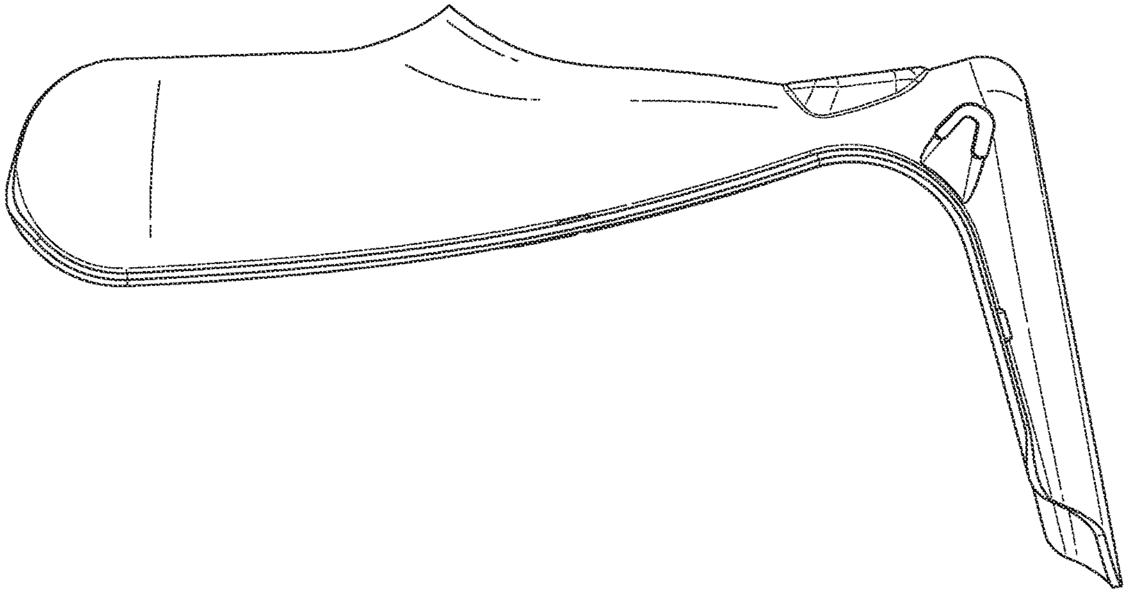
FIG. 74 is a left plan view of the limb rest of FIG. 69.
Figure 75:
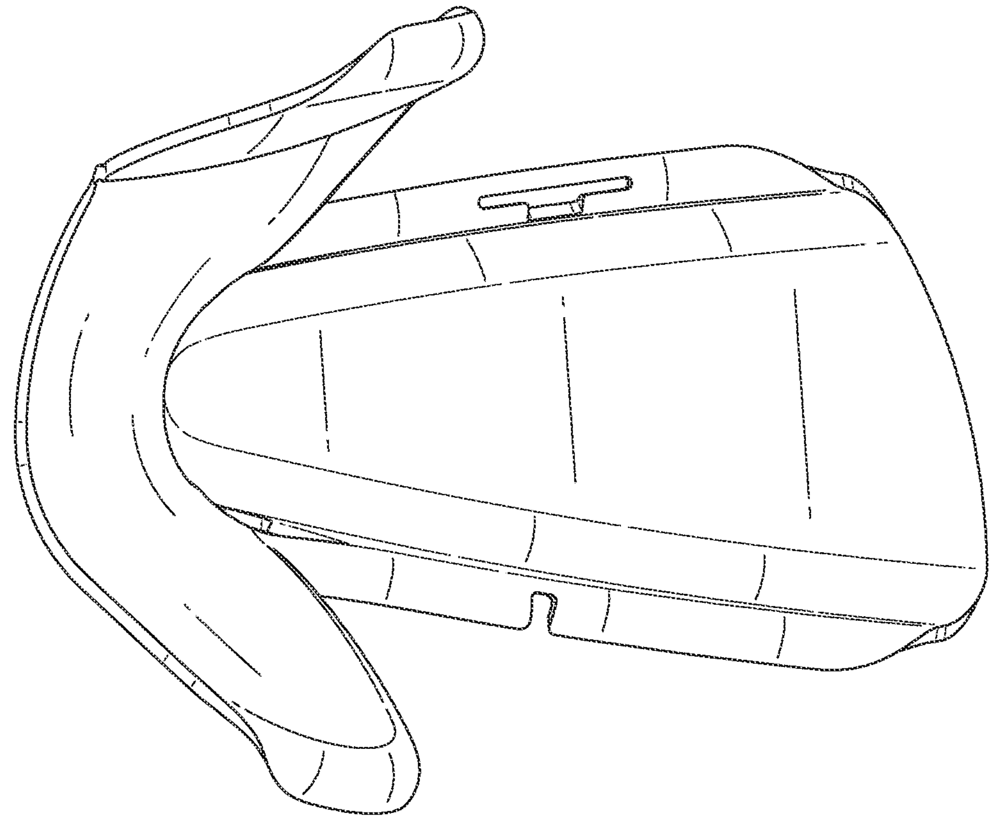
FIG. 75 is a front plan view of the limb rest of FIG. 69.
Figure 76:
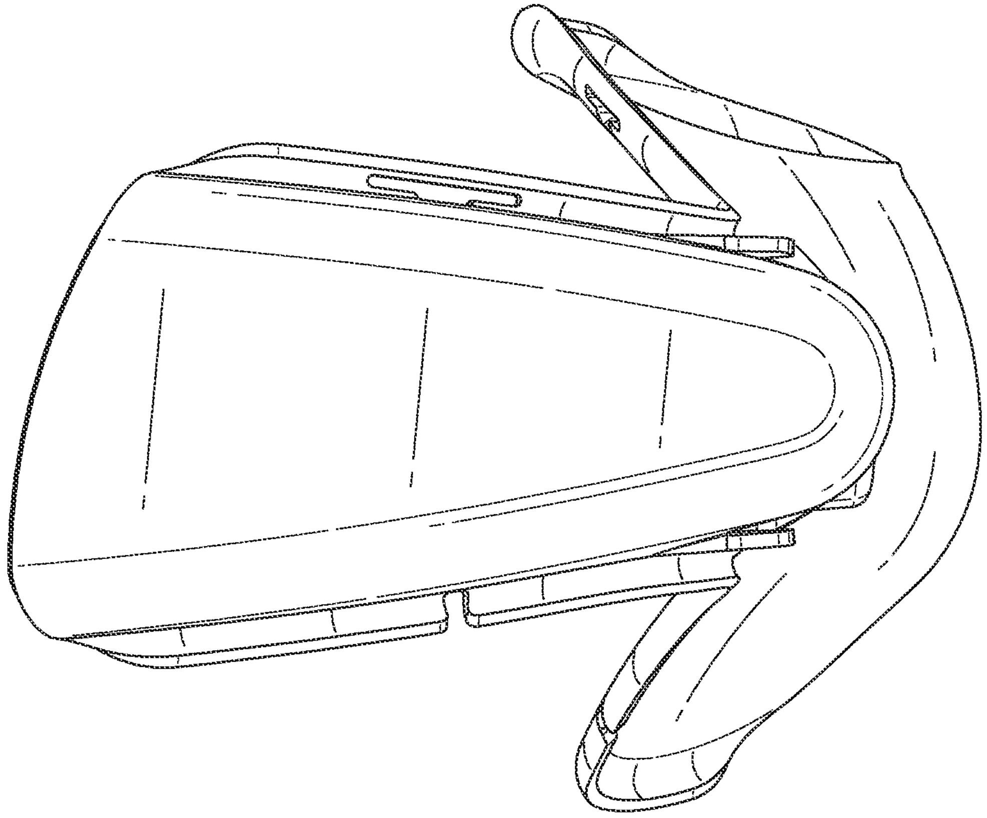
FIG. 76 is a back plan view of the limb rest of FIG. 69.
Figure 77:
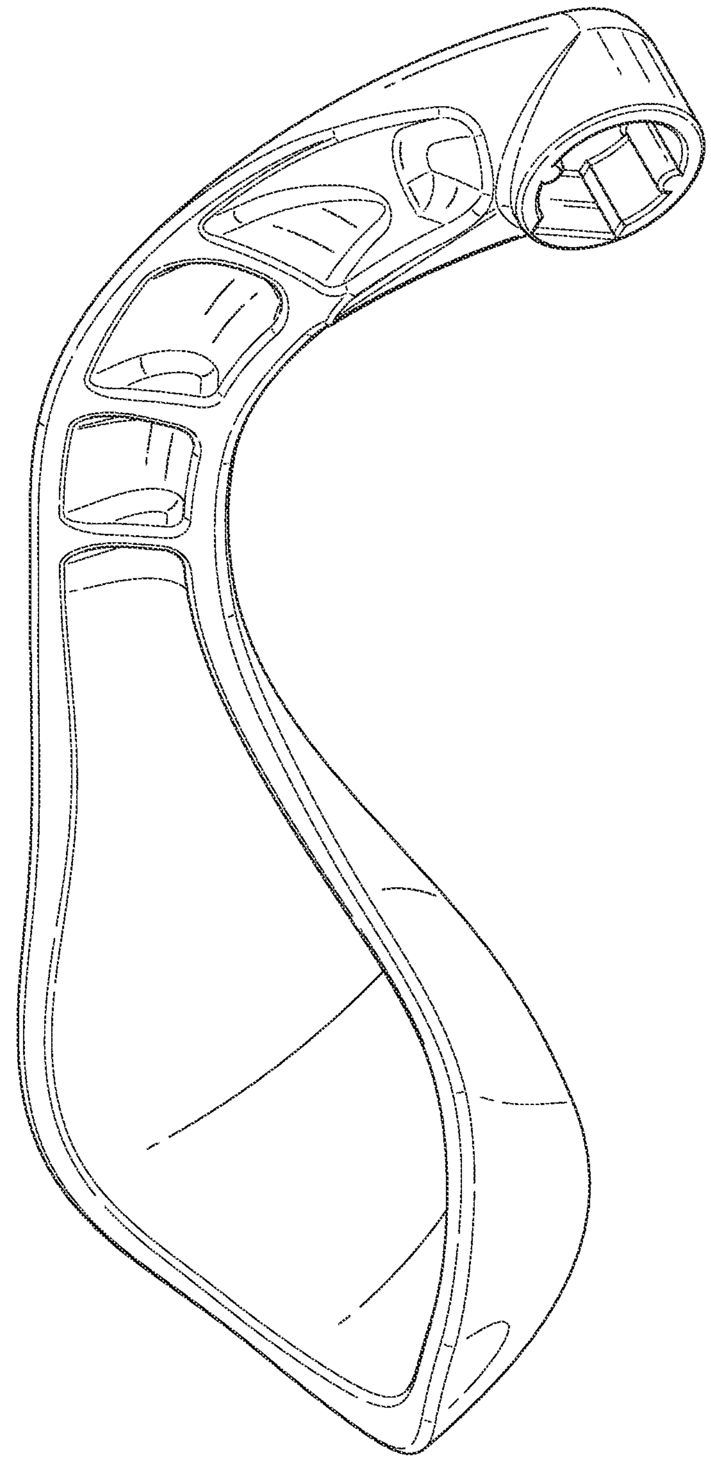
FIG. 77 is a back perspective view of a release handle in accordance with the present design, as viewed from a top right corner thereof.
Figure 78:
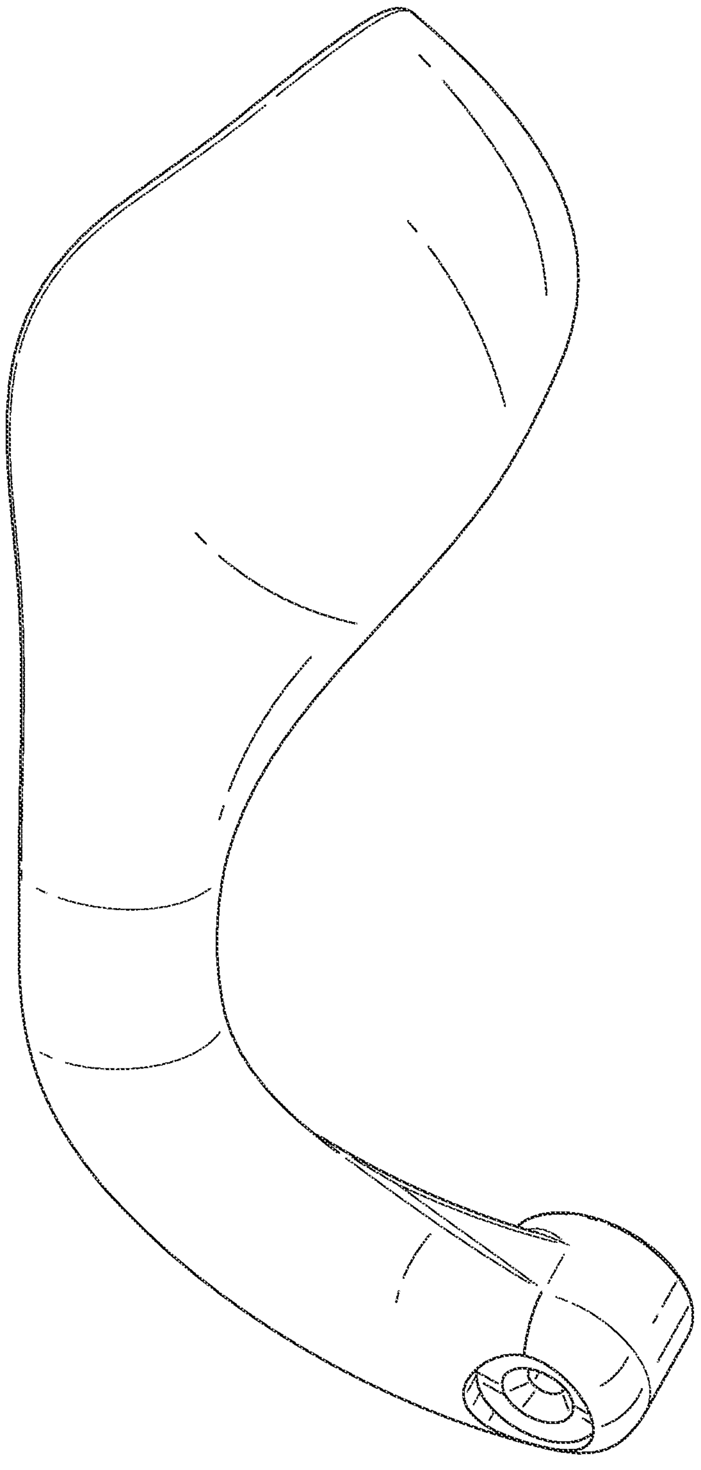
FIG. 78 is a front perspective view of the release handle of FIG. 77, as viewed from the right corner thereof.
Figure 79:
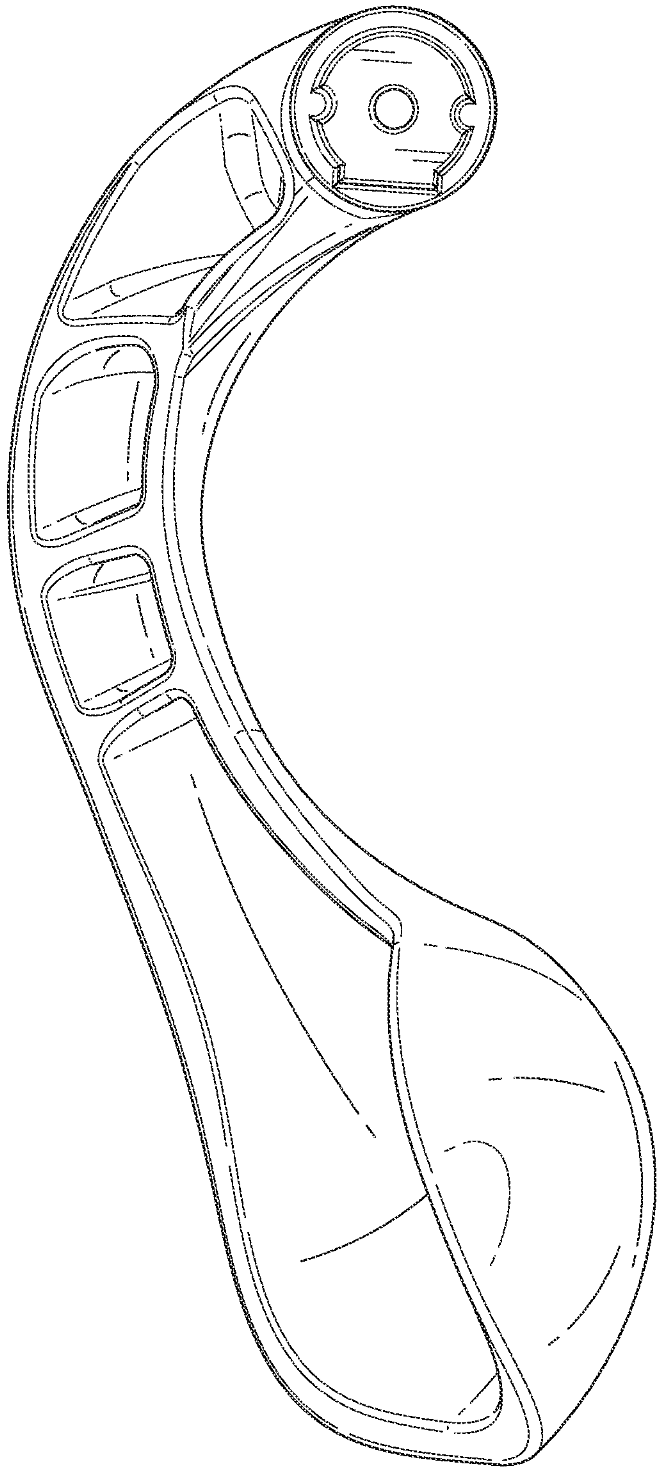
FIG. 79 is a back plan view of the limb rest of FIG. 77.
Figure 80:
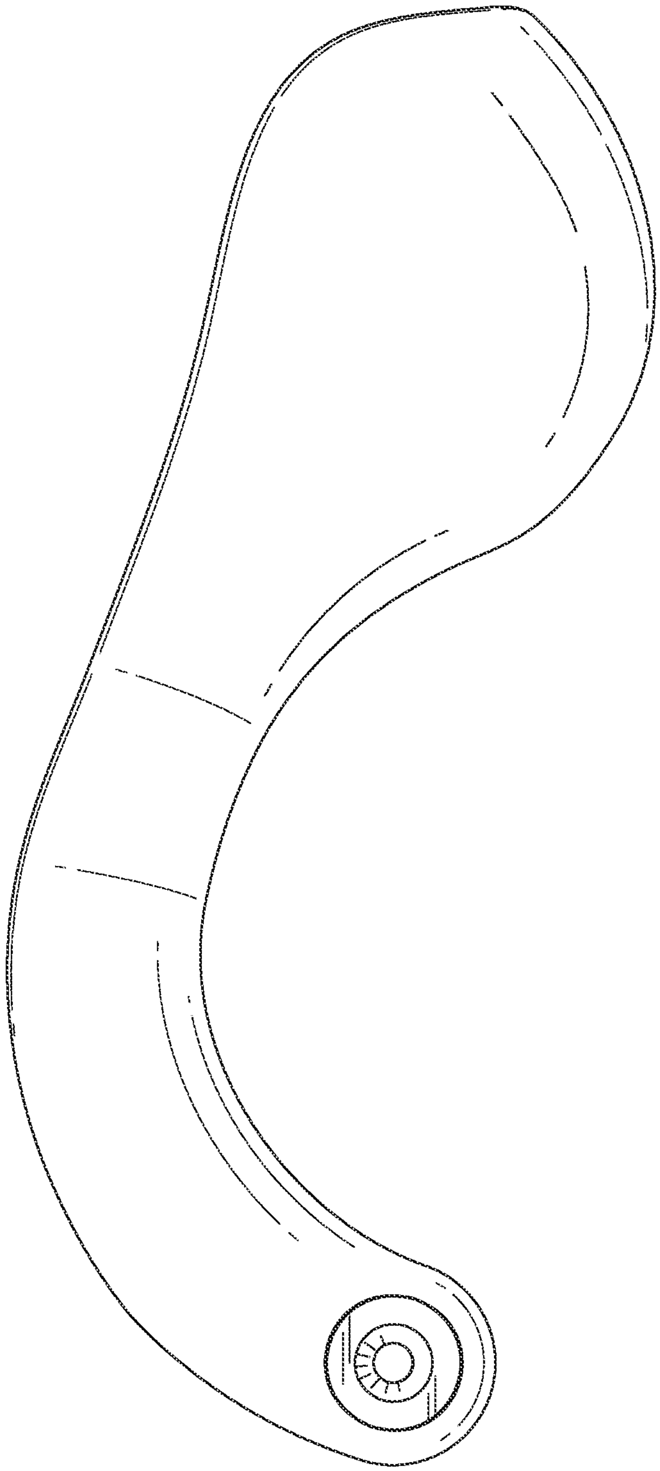
FIG. 80 is a front plan view of the limb rest of FIG. 77.
Figure 81:
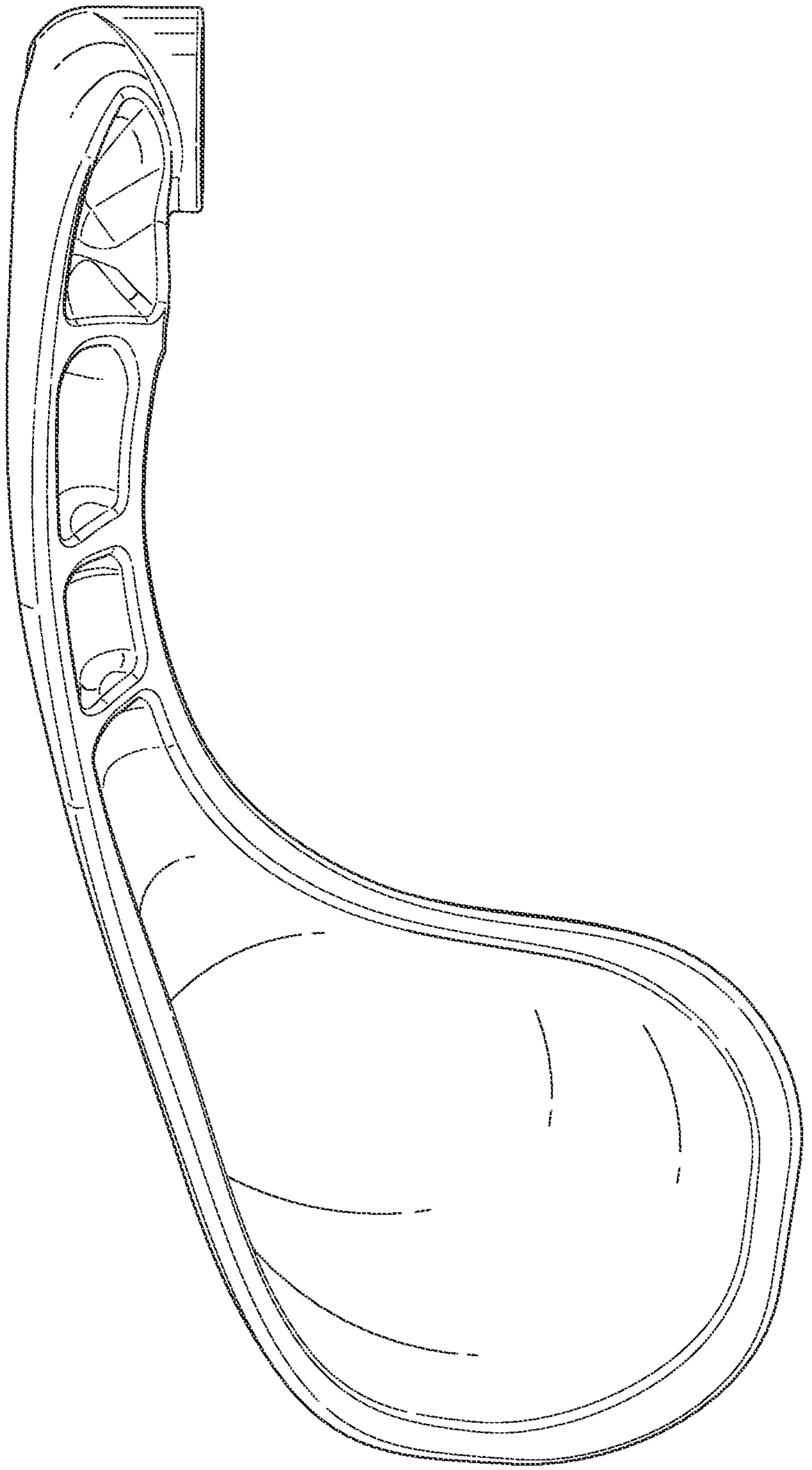
FIG. 81 is a bottom plan view of the limb rest of FIG. 77.
Figure 82:
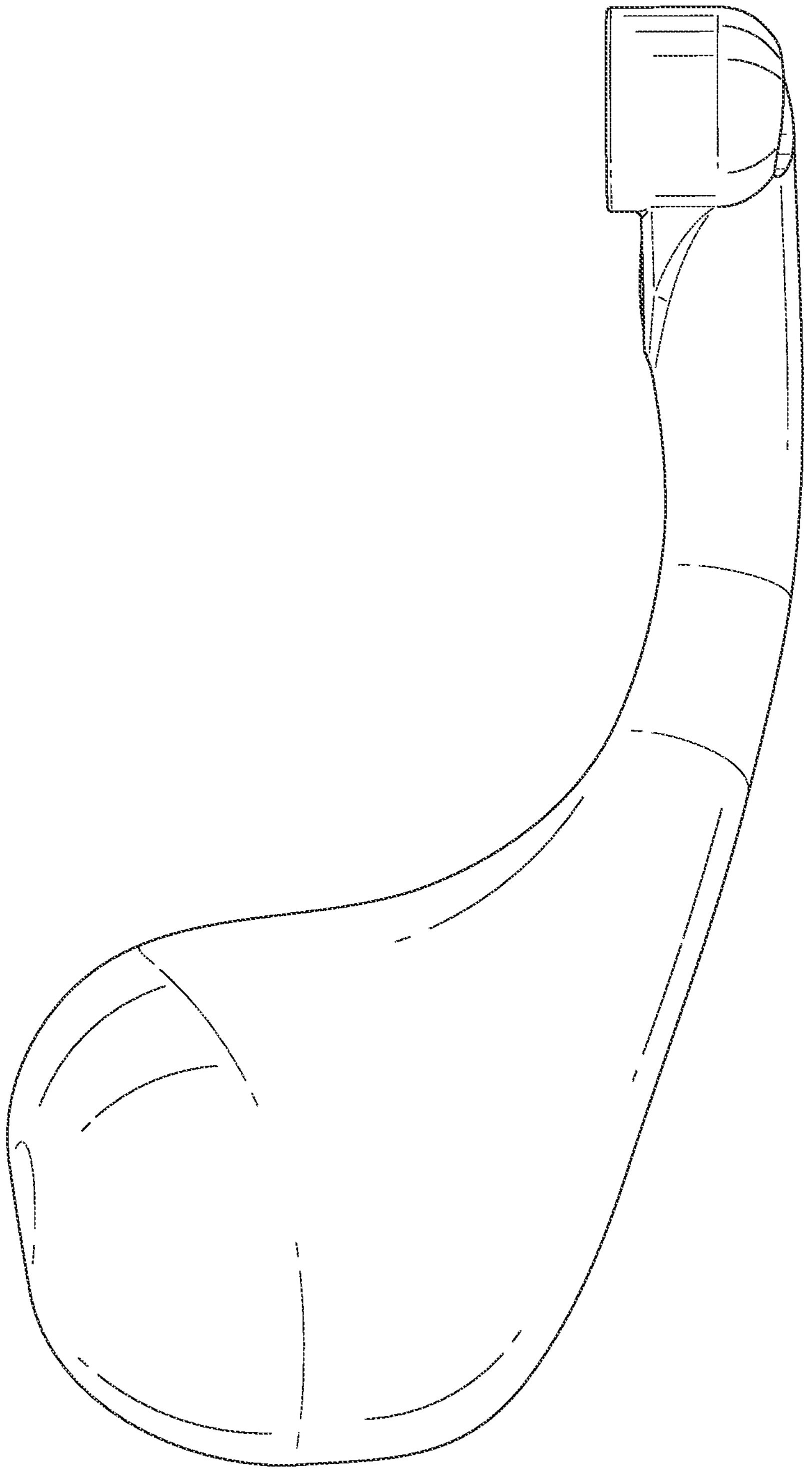
FIG. 82 is a top plan view of the limb rest of FIG. 77.
Figure 83:
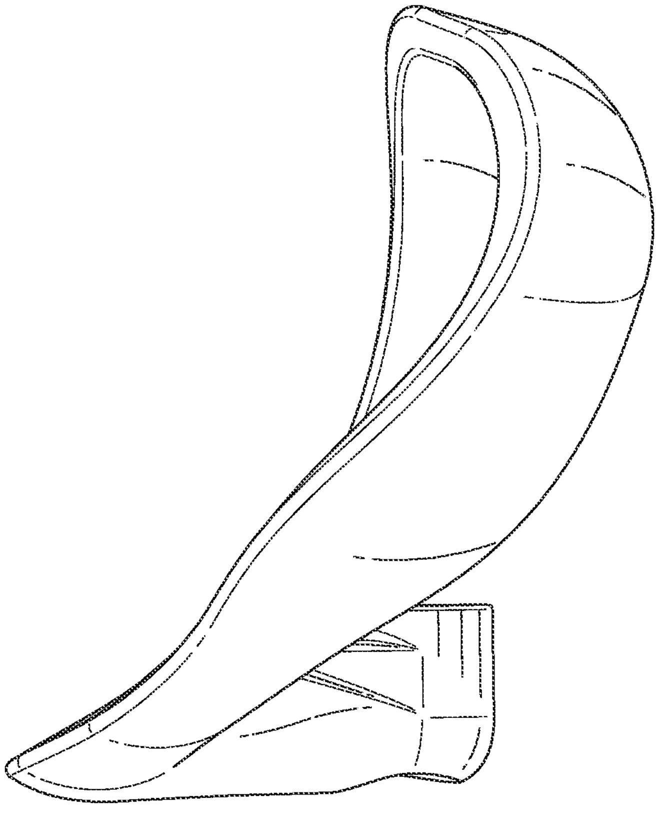
FIG. 83 is a right plan view of the limb rest of FIG. 77.
Figure 84:
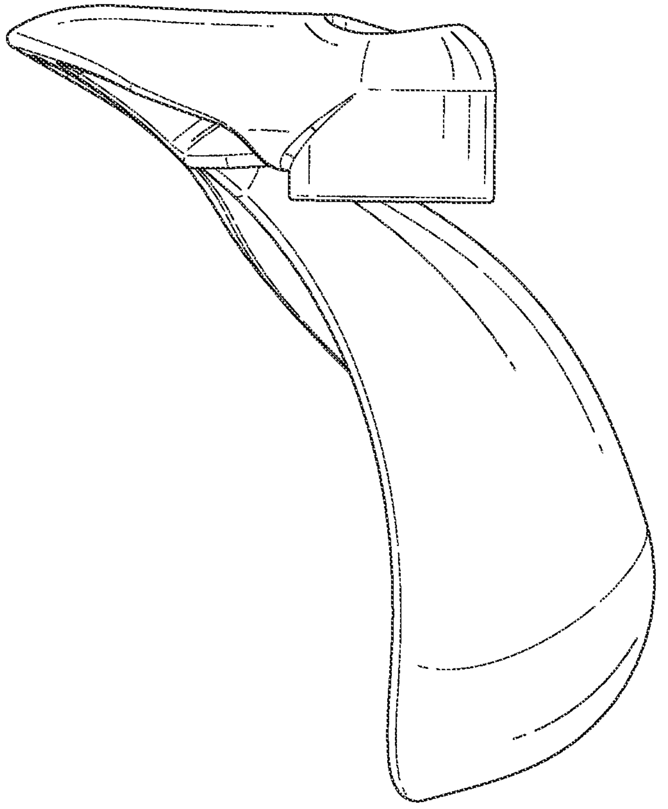
FIG. 84 is a left plan view of the limb rest of FIG. 77.
Figure 85:
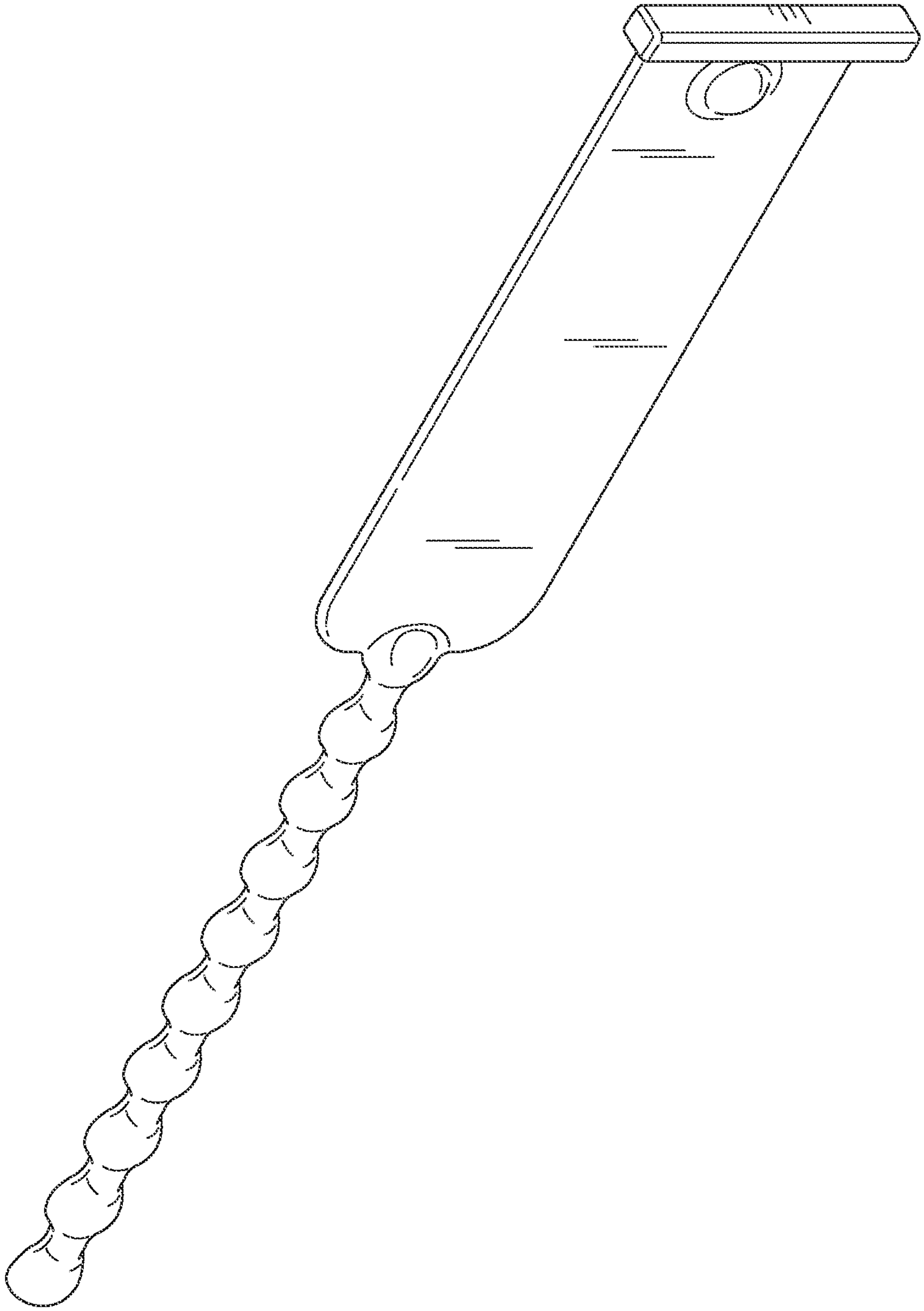
FIG. 85 is a front perspective view of a restraint in accordance with the present design, as viewed from the upper right corner thereof.
Figure 86:
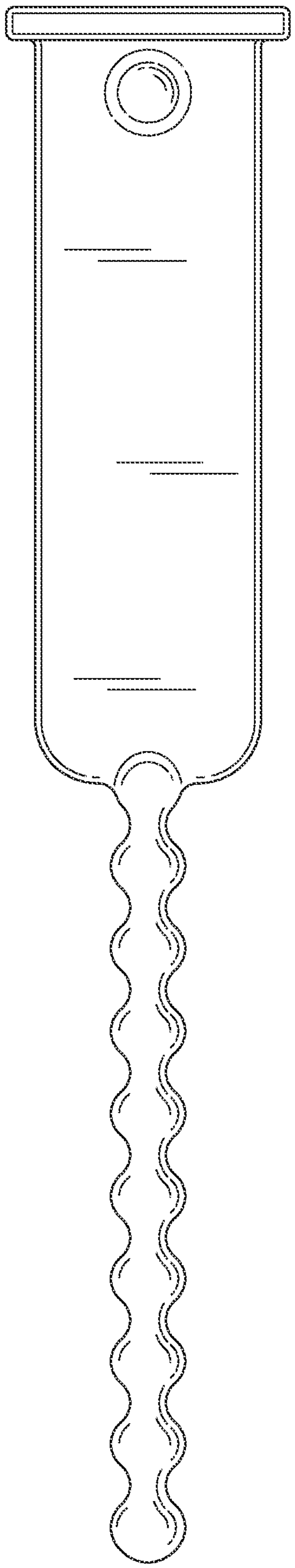
FIG. 86 is a front plan view of the restraint of FIG. 85.
Figure 87:
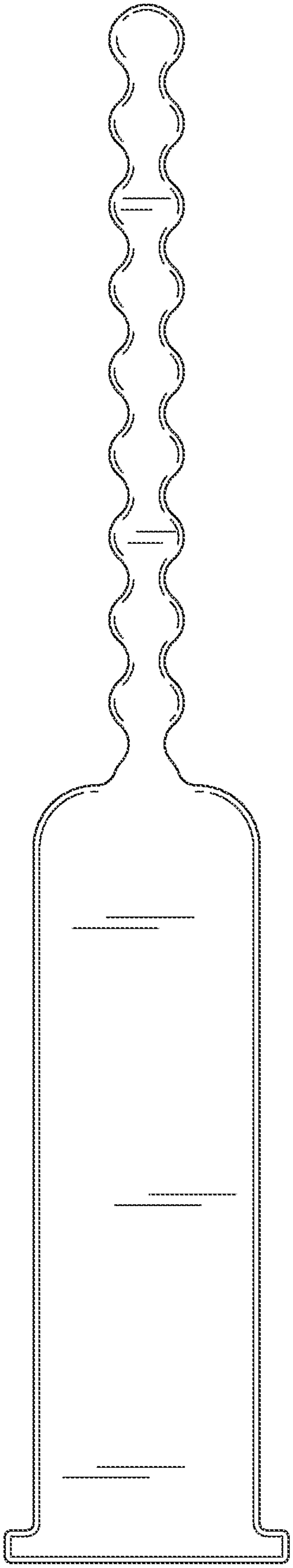
FIG. 87 is a back plan view of the restraint of FIG. 85.
Figure 88:
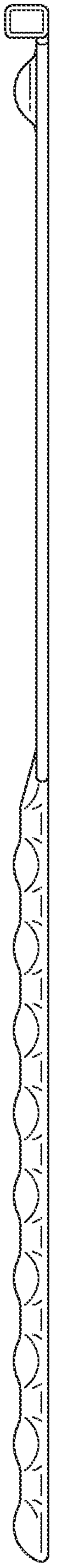
FIG. 88 is a bottom plan view of the restraint of FIG. 85.
Figure 89:
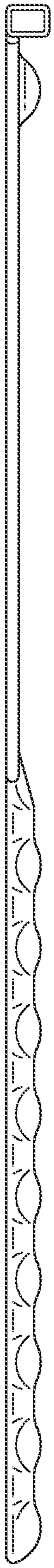
FIG. 89 is a top plan view of the restraint of FIG. 85.
Figure 91:
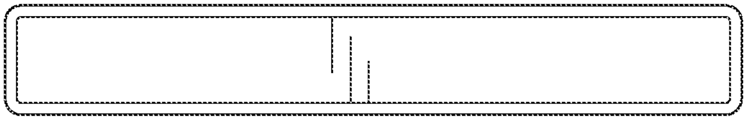
FIG. 91 is a right plan view of the restraint of FIG. 85.
Figure 90:
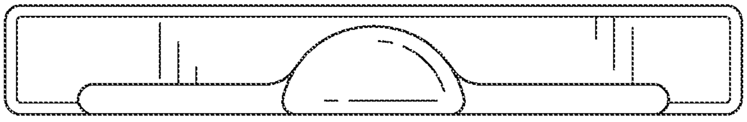
FIG. 90 is a left plan view of the restraint of FIG. 85.

Referring now to FIG. 65, a limb support 710 includes a shell 712 that has a structure similar to that disclosed in FIGS. 62 and 63 to allow a user to utilize the restraint of FIGS. 62 and 63. The limb support 710 includes a handle 470 that is coupled to the cam shaft 124 of the coupler 30. The handle 470 is shown in a locked position in FIG. 65. To actuate the handle 470, a user positions their thumb or palm on the shell 712 and slips their fingers around the handle 470. Squeezing their fingers with their thumb and/or palm braced against the shell 712, the handle 470 is moved between a locked position shown in FIG. 65 and a released position shown in FIGS. 66 and 67. The released position causes the coupler 30 to be released to allow the limb rest/shell 712 to move relative to the coupler 30 and the coupler 30 to move relative to the spar 16.

Referring to FIGS. 69-76, various views of a design of a limb rest/shell are shown. It should be understood that variations of the design as presented are within the scope of this disclosure and that other embodiments of the design with broader scope may be developed from the design shown. The presented views show several designs in combination, culminating in an overall design. For example, the shape of the cut-aways, slots, and through-holes may be considered to be individual designs. Similarly, the shape of portions of the limb rest where the cut-aways, slots, and through-holes may be considered an individual design even with the cut-aways, slots, and through-holes omitted. Still further, the position and orientation of a mounting structure shown in the design may be a separate design, or portions of the shell surrounding the mounting structure, with the mounting structure omitted may also be considered a separate design.

Similarly, the design of the handle shown in FIGS. 77-84 is a culmination of multiple design elements that may be claimed more broadly than the total design of the handle as shown. For example, the ribbing and curvature of the back of the handle may be omitted. In addition, the lug for mounting the handle may be omitted or claimed as an individual design with other portions of the handle shown as environment.

Still further, the design of the restraint shown in FIGS. 85-91 is a culmination of several design elements that may be claimed individually. For example the portion of the restraint having the bulbous protuberances may be considered a separate design. Still further, in some embodiments, it is contemplated that the bulbous protuberances may be completely spherical, in some embodiments.

Although certain illustrative embodiments have been described in detail above, variations and modifications exist within the scope and spirit of this disclosure as described and as defined in the following claims.

The invention claimed is:

1. A limb rest comprising:

a shell including:

a first slot formed in a surface at a first side of the shell, the first slot including a first open portion that is elongate, and a second open portion extending directly adjacent to and parallel along a portion of the first open portion to form a unitary opening, the first open portion and the second open portion both formed in the surface at the first side of the shell; and a second slot formed at a second side of the shell, the second slot aligned with the first slot along the length of the shell, the second slot formed to be open at an outboard edge of the second side of the shell; and a first restraint secured to the limb rest at the first and second slots, the limb rest configured to engage a limb of a patient.

2. The limb rest of claim 1, wherein the limb rest further comprises a pad supported on the shell.

3. The limb rest of claim 2, wherein the first restraint comprises a first end coupled to the shell by a first retaining device, the first retaining device being sized to prevent the first retaining device from passing through the first slot when the first restraint is engaged with the shell.

4. The limb rest of claim 3, wherein a second end of the first restraint is secured to the shell by a first bulbous protuberance formed in the first restraint, the first bulbous protuberance engaging the second slot of the shell.

5. The limb rest of claim 4, wherein the first restraint is formed to include a first plurality of bulbous protuberances formed along the length of the first restraint, the first plurality of bulbous protuberances including the first bulbous protuberance, each one of the first plurality of bulbous protuberances being engageable with the second slot to adjust the first restraint to secure the limb of the patient.

6. The limb rest of claim 5, wherein the shell is formed to include a toe section, a calf section, and a fin section.

7. The limb rest of claim 5, wherein the shell further comprises:

a third slot formed at the first side of the shell spaced apart from the first slot, the third slot including a first open portion that is elongate and a second open portion extending along a portion of the first open portion, the second open portion cooperating with the first open portion to form a unitary opening in the shell; and a fourth slot formed at the second side of the shell spaced apart from the second slot, the fourth slot aligned with the third slot along the length of the shell, the fourth slot formed to include an opening at an outboard edge of the second side of the shell; and a second restraint secured to the limb rest at the third and fourth slots, the limb rest configured to engage a limb of a patient.

8. The limb rest of claim 7, wherein the second restraint comprises a first end coupled to the shell by a second retaining device the second restraint being sized to prevent the second restraint from passing through the third slot when the second restraint is engaged with the shell.

9. The limb rest of claim 8, wherein a second end of the second restraint is secured to the shell by a second bulbous protuberance formed in the second restraint, the second bulbous protuberance engaging the fourth slot of the shell.

10. The limb rest of claim 9, wherein the second restraint is formed to include a second plurality of bulbous protuberances formed along the length of the second restraint, the second plurality of bulbous protuberances including the second bulbous protuberance, each one of the second bulbous protuberances being engageable with the fourth slot to adjust the restraint to secure the limb of the patient.

11. The limb rest of claim 10, further comprising a coupler supporting the shell, the coupler having a release that is actuable between a first position permitting movement of the coupler relative to a patient support and a second position preventing movement of the coupler relative to the patient support, a handle coupled to the release of the coupler, the handle positioned such that a user may simultaneously grip the handle and the limb rest, the handle movable relative to the limb rest such that movement of the handle relative to the shell activates the release to allow the limb rest position and orientation relative to the patient support to be adjusted.

12. The limb rest of claim 1, wherein the shell further comprises:

a third slot formed at the first side of the shell spaced apart from the first slot, the third slot including a first open portion that is elongate and a second open portion extending along a portion of the first open portion, the second open portion cooperating with the first open portion to form a unitary opening in the shell; and a fourth slot formed at the second side of the shell spaced apart from the second slot, the fourth slot aligned with the third slot along the length of the shell, the fourth slot formed to include an opening at an outboard edge of the second side of the shell; and a second restraint secured to the limb rest at the third and fourth slots, the limb rest configured to engage a limb of a patient.

13. The limb rest of claim 12, wherein the second restraint comprises a first end coupled to the shell by a second retaining device the second retaining device being sized to prevent the second retaining device from passing through the third slot when the second restraint is engaged with the shell.

14. The limb rest of claim 13, wherein a second end of the second restraint is secured to the shell by a bulbous protuberance formed in the second restraint, the bulbous protuberance engaging the fourth slot of the shell.

15. The limb rest of claim 14, wherein the second restraint is formed to include a plurality of bulbous protuberances formed along the length of the second restraint, the plurality of bulbous protuberances including the bulbous protuberance, each bulbous protuberance being engageable with the fourth slot to adjust the second restraint to secure the limb of the patient.

16. The limb rest of claim 15, further comprising a coupler supporting the shell, the coupler having a release that is actuable between a first position permitting movement of the coupler relative to a patient support and a second position preventing movement of the coupler relative to the patient support, a handle coupled to the release of the coupler, the handle positioned such that a user may simultaneously grip the handle and the limb rest, the handle movable relative to the limb rest such that movement of the handle relative to the shell to activates the release to allow the limb rest position and orientation relative to the patient support to be adjusted.

17. The limb rest of claim 1, wherein the first restraint comprises a first end coupled to the shell by a retaining device the retaining device being sized to prevent the retaining device from passing through the first slot when the restraint is engaged with the shell.

18. The limb rest of claim 17, wherein a second end of the first restraint is secured to the shell by a bulbous protuberance formed in the first restraint, the bulbous protuberance engaging the second slot of the shell.

19. The limb rest of claim 18, wherein the first restraint is formed to include a plurality of bulbous protuberances formed along the length of the first restraint, the plurality of bulbous protuberances including the bulbous protuberance, each bulbous protuberance being engageable with the second slot to adjust the first restraint to secure the limb of the patient.

20. The limb rest of claim 1, wherein the first restraint is formed to include a plurality of bulbous protuberances formed along the length of the first restraint, each bulbous protuberance being engageable with the second slot to adjust the first restraint to secure the limb of the patient.

* * * * *